US008015271B2

(12) United States Patent
McKeown et al.

(10) Patent No.: US 8,015,271 B2
(45) Date of Patent: Sep. 6, 2011

(54) METHOD AND SYSTEM OF PROVISIONING A DESIRED COMMUNICATION SERVICE FOR A USER ACROSS A NETWORK

(75) Inventors: Jean Christophe McKeown, Mandelieu (FR); Henri Chabrier, Biot (FR)

(73) Assignee: Accenture Global Services Limited, Dublin (IE)

( * ) Notice: Subject to any disclaimer, the term of this patent is extended or adjusted under 35 U.S.C. 154(b) by 1239 days.

(21) Appl. No.: 10/472,799

(22) PCT Filed: Mar. 26, 2002

(86) PCT No.: PCT/GB02/01461
§ 371 (c)(1),
(2), (4) Date: Jun. 21, 2004

(87) PCT Pub. No.: WO02/077808
PCT Pub. Date: Oct. 3, 2002

(65) Prior Publication Data
US 2005/0021766 A1    Jan. 27, 2005

(30) Foreign Application Priority Data

Mar. 26, 2001  (EP) .................................. 01480025
May 22, 2001  (EP) .................................. 01401351
Jul. 3, 2001  (EP) .................................. 01401767

(51) Int. Cl.
   *G06F 15/173* (2006.01)
(52) U.S. Cl. ...................................... 709/223; 709/226
(58) Field of Classification Search ........... 709/225–228
   See application file for complete search history.

(56) References Cited

U.S. PATENT DOCUMENTS

| 5,682,325 | A |   | 10/1997 | Lightfoot et al. ............. 709/229 |
| 5,687,212 | A |   | 11/1997 | Kinser, Jr. et al. .............. 379/10 |
| 5,774,689 | A |   | 6/1998  | Curtis et al. .................. 395/500 |
| 6,023,464 | A | * | 2/2000  | Woundy ........................ 370/352 |
| 6,049,826 | A | * | 4/2000  | Beser ............................ 709/222 |
| 6,081,506 | A | * | 6/2000  | Buyukkoc et al. ............ 370/235 |
| 6,094,676 | A |   | 7/2000  | Gray et al. |
| 6,101,535 | A |   | 8/2000  | Hussmann et al. |
| 6,101,539 | A |   | 8/2000  | Kennelly et al. |

(Continued)

FOREIGN PATENT DOCUMENTS

CA    2 216 762    10/2000

(Continued)

OTHER PUBLICATIONS

GB0511999.5 Search Report, Jul. 19, 2005.

(Continued)

*Primary Examiner* — Kevin Bates
(74) *Attorney, Agent, or Firm* — Fish & Richardson P.C.

(57) ABSTRACT

Disclosed is a provisioning tool and method for a communications network, particularly a broadband communications network which is arranged to provision a service for a user based on information available via another user connection; this facilitates provision. In a preferred embodiment, a user device address is obtained from a user IP address. Provisioning and other network tools with additional or alternative advantageous features are disclosed and the provisioning tools disclosed may communicate with a variety of other tools including planning and inventory applications and agents associated with equipment, all of which are also independently provided, enabling provision of a variety of novel services and features dealing with a spectrum of problems arising in a communications environment, particularly a broadband environment.

24 Claims, 58 Drawing Sheets

U.S. PATENT DOCUMENTS

| | | | |
|---|---|---|---|
| 6,173,324 B1 * | 1/2001 | D'Souza | 709/224 |
| 6,188,757 B1 * | 2/2001 | Malik | 379/207.02 |
| 6,233,449 B1 | 5/2001 | Glitho et al. | 455/423 |
| 6,269,330 B1 | 7/2001 | Cidon et al. | |
| 6,292,838 B1 * | 9/2001 | Nelson | 709/236 |
| 6,341,221 B1 * | 1/2002 | Huotari | 455/414.1 |
| 6,466,986 B1 * | 10/2002 | Sawyer et al. | 709/245 |
| 6,557,030 B1 | 4/2003 | Hoang | |
| 6,594,305 B1 | 7/2003 | Roeck et al. | |
| 6,601,020 B1 | 7/2003 | Myers | 702/186 |
| 6,636,505 B1 | 10/2003 | Wang et al. | |
| 6,725,267 B1 | 4/2004 | Hoang | |
| 6,728,232 B2 * | 4/2004 | Hasty et al. | 370/338 |
| 6,769,127 B1 * | 7/2004 | Bonomi et al. | 725/39 |
| 6,778,525 B1 * | 8/2004 | Baum et al. | 370/351 |
| 7,219,124 B2 * | 5/2007 | Cerami et al. | 709/203 |
| 7,554,967 B1 * | 6/2009 | Varadhan et al. | 370/352 |
| 2001/0019559 A1 * | 9/2001 | Handler et al. | 370/468 |
| 2001/0049737 A1 * | 12/2001 | Carolan et al. | 709/228 |
| 2002/0022969 A1 | 2/2002 | Berg et al. | 705/1 |
| 2002/0141544 A1 | 10/2002 | Brown et al. | |
| 2002/0194076 A1 | 12/2002 | Williams et al. | |
| 2002/0198840 A1 | 12/2002 | Banka et al. | |
| 2002/0199007 A1 | 12/2002 | Clayton et al. | |
| 2004/0261116 A1 | 12/2004 | Mckeown et al. | |
| 2006/0034185 A1 | 2/2006 | Patzschke et al. | |

FOREIGN PATENT DOCUMENTS

| | | |
|---|---|---|
| EP | 0310782 | 4/1989 |
| EP | 1139221 | 10/2001 |
| GB | 2350031 | 11/2000 |
| JP | 10051488 | 7/1996 |
| WO | WO 95/34866 | 12/1995 |
| WO | WO 97/50209 | 12/1997 |
| WO | WO 00/22534 | 4/2000 |
| WO | WO 00/74304 | 12/2000 |
| WO | WO 01/14988 | 3/2001 |
| WO | WO01/14988 A1 | 3/2001 |
| WO | WO 01/19080 | 3/2001 |
| WO | WO 01/41365 | 6/2001 |
| WO | WO 02/093804 | 11/2002 |
| WO | WO 02/095584 | 11/2002 |

OTHER PUBLICATIONS

GB0510679.4 Search Report, Jun. 14, 2005.
GB0422868.0 Search Report, Jun. 8, 2005.
"Network management basics", www.cisco.com/univercd/cc/td/doc/cisintwk/ito_doc/nmbasics.htm, Jun. 2, 2005.
T1 Glossary 2000 definition of provisioning, www.its.bldroc.gov/projects/devglossary/t1g2k.html, Jun. 9, 2005.
T1 Glossary 2000 definition of provisioning, www.its.bldroc.gov/projects/devglossary/t1g2k.html, Jun. 9, 2005.
GB0510679.4 Combined Search and Examination Report, Jun. 15, 2005.
Correspondence and claim chart from Attorney Michael J. Colitz, dated Jun. 12, 2007.
CIPO (Canada) examination & search report, May 21, 2009.
Broadband Cable Association of Pennsylvania (BCAP) Glossary, printed from <http://www.bcapa.com/about/glossary.php?page=e>.
Communication from Canadian Intellectual Property Office; Office Action dated Oct. 22, 2010 for Application No. 2,474,887 (3 pages).
Great Britain Search Report for GB 0511997.9, dated Jul. 19, 2005, 1 page.
"Broadband Cable Association of Pennsylvania" [online]. BCAP, 2011, [retrieved on Apr 8, 2011]. Retrieved from the Internet: <URL: www.bcapa.com/about/glossary.php?page=e>.

* cited by examiner

| | |
|---|---|
| Nagra Serial Number | 18 830 243 333 |
| Genettard Status | OK |
| IPPV Balan | N/A |
| Credit | 8672.2 € |
| Smartcard Version | DNASP007 |
| Smartcard Revision | Rev 709 |
| CA Version | 5.3.16 |
| CA Revision | 13.3 |
| Smartcard Expdate | 0000 |
| Smartcard Serial Number | 0712063 9524 43 |
| Set Top Box Serial Number | US 1031 2003 13 |

| | |
|---|---|
| SNR Estimate | 33.0 dB |
| Pre RS Error Rate | 0⁻¹⁰,5 E |
| Post RS Error Rate | 0⁻¹⁰,5 E |
| Lock Status | Locked |
| Last EAT | Mon 31 Aug. 1980 00:16.17 |
| Last CAT | Mon 31 Aug. 1980 00:16.17 |
| Channel Table | LOOKING FOR UPDATES |
| Number of Transport Streams | 1 |
| Number of Services | 21 |
| ACC-Combined | 348 |

CM Manager in distributed configuration  *Fig. 46*

| XML tag | Description | Value |
|---|---|---|
| <Connection> | Start tag for the Connection section | |
| <Type> | Sets the type of the connection | Fixed Value<br>Direct = Management<br>Switch = Switch<br>CableModem = Cable modem<br>DSLModem= DSL Modem |
| <Interface> | Sets the Interface used for the Management connection | Fixed Value<br>Eth0 = Management<br>Eth1= switch or Cable Modems |
| <IPAddress> | Sets the IP Address of the Switch | Fixed Value |
| <Community> | Sets the community of the Switch | Public<br>Private |
| <PortOid> | Sets the Port Object Identification | |
| <TypeOid> | Sets the type of the UpOid and the DownOid | Fixed Value – Integer |
| <UpOid> | Sets 1 if the port of the switch is opened | 1 |
| <DownOid> | Sets 2 if the port of the switch is closed | 2 |
| <AgentPort> | Sets the Port for the connection with the ISEA Agent | What ever port number on the switch as long as it is only used to connect the ISEA to the switch |
| <ManagementPort> | Sets the Port used for the connection with the Management | What ever port number on the switch as long as it is only used to connect to the management network. It must be unique and different that the Agent Port |
| </Connection> | End tag for the Connection section | |

*Fig. 49*

| XML tag | Description | Value |
|---|---|---|
| <Connection> | Start tag for the Connection section | |
| <Type> | Sets the type of the connection | Fixed Value<br>Direct = Management<br>Switch = Switch<br>CableModem = Cable modem<br>DSLModem = DSL Modem |
| <Interface> | Sets the port of the switch where the cable modem is connected (Caveat to not use the switch port) | Fixed Value<br>1 to 8<br>1 to 24 |
| <Location> | Sets the Location of the Cable Modem connection to the switch | Fixed value |
| <IPAddress> | Sets the IP Address of the Cable Modem. The cable modem must be provisioned | Fixed value |
| <MACAddress> | Sets the MAC Address of the Cable Modem. The cable modem must be provisioned | Fixed value |
| <Community> | Sets the community of the Cable Modem | Public<br>Private |
| <CommandToKill> | Deprovision the Cable Modem | dhcpcd -k #interface# |
| <CommandToLaunch> | Provision the Cable Modem | dhcpcd -d -t #timeout# #interface# |
| <WaitedResponse> | Returns the message: "dhcpcd: your IP address" | Fixed value |
| <Timeout> | Sets the connection Time out in seconds | 45 |
| </Connection> | End tag for the Connection section | |

*Fig. 50*

| XML tag | Description | Value |
|---|---|---|
| <?xml version="1.0"... ?> | Xml file header | Fixed Value |
| <SchedulerManager> | Start tag for the File Name | Fixed value |
| <!-- Common Part --> | Commentary | |
| <DebugName> | Sets the Scheduler Manager Name used for the Debug mode | SchedulerManager |
| <DebugLevel> | Sets the debug level used by the application to log debugging info. | Info = all Agent activities<br>Warning = abnormal activities<br>Error = Error activities<br>Critical = Agent is down |
| <AlarmWriter> | Sets a file as a default Alarm Writer | FlatFile |
| <AlarmWriter> | Sets a mail account as a default Alarm Writer | Mail |
| <AlarmHandler> | Start tag for the Alarm handler section | |
| <DebugName> | Sets the Alarm Handler Name used for the Debug mode | AlarmHandler |
| <DebugLevel> | Sets the debug level used by the application to log debugging info. | Info = all Agent activities<br>Warning = abnormal activities<br>Error = Error activities<br>Critical = Agent is down |

*Fig. 51a*

| XML tag | Description | Value |
|---|---|---|
| <SleepTime> | Sets the time interval during which the alarm is not activated in milliseconds | 5000 |
| <AlarmWriter> | Start tag for the Alarm Writer section | |
| <Type> | Sets the type of the file Alarm Writer | FlatFile |
| <Path> | Sets the file path | test.alarms |
| </AlarmWriter> | End tag for the file Alarm Writer section | |
| <AlarmWriter> | Start tag for the mail Alarm Writer section | |
| <Type> | Sets the type of the Alarm Writer | Mail |
| <From> | Sets the alarm IP Address as defined in the Xmail Configuration | Fixed Value alarm@hostname.domain |
| <To> | Sets the destination IP Address as defined in the Xmail Configuration | Fixed Value alarm@hostname.domain |
| <Host> | Sets the Agent IP Address | Fixed value |
| <Port> | Sets the port used for the mail | Fixed Value - 25 |
| </AlarmWriter> | End tag for the Alarm Writer section | |
| </AlarmHandler> | End tag for the Alarm Handler section | |

Fig. 51b

| XML tag | Description | Value |
|---|---|---|
| <Protocol> | Start tag for the Protocol section | |
| <Name> | Sets the Name of the Protocol | Fixed value - DHCP |
| <CommandToKill> | Sets the command used to kill the protocol | Fixed value /sbin/dhcpcd -k #interface# |
| <CommandToLaunch> | Sets the command used to launch the protocol | Fixed value /sbin/dhcpcd -d -t #timeout# #interface# |
| <WaitedResponse> | Returns a message: "dhcpcd: your IP address =" | Fixed Value |
| </Protocol> | End tag for the Protocol section | |

Fig. 52

| XML tag | Description | Value |
|---|---|---|
| <Scenario> | Start tag for the Scenario section | |
| <Name> | Sets the Name of the Scenario | Test |
| <Location> | Start tag for the location section | |
| <Code> | Sets the location code of the Cable modem | Fixed value Same as defined in the IBSAAgent.xml file |
| <Action> | Start tag for the Action section | |
| <ServiceName> | Sets the Name of the Service, as defined in the Service section | Provisioning |
| <Timeout> | Sets the global time out of the specific Action in milliseconds | 10000 |
| <HSDCode> | Sets the alarm Class (i.e. HSD_0_x00000) | x = Service code:<br>0 = Management<br>1 = Internet Access<br>2 = Provisioning<br>3 = Mail (ISP)<br>4 = Security<br>5 = Performance |
| </Action> | End tag for the Scenario section | |
| <Action> | Start tag for the Action section | |
| <ServiceName> | Sets the Name of the Service, as defined in the Service section | InternetAccess |
| <Timeout> | Sets the global time out of the specific Action in milliseconds | 50000 |

*Fig. 53a*

| XML tag | Description | Value |
|---|---|---|
| <HSDCode> | Sets the alarm Class (i.e. HSD_0_x00000) | x = Service code:<br>0 = Management<br>1 = Internet Access<br>2 = Provisioning<br>3 = Mail (ISP)<br>4 = Security<br>5 = Performance |
| </Action> | End tag for the Action section | |
| <Action> | Start tag for the Action section | |
| <ServiceName> | Sets the Name of the Service, as defined in the Service section | ISP |
| <Timeout> | Sets the global time out of the specific Action in milliseconds | 10000 |
| <HSDCode> | Sets the alarm Class (i.e. HSD_0_x00000) | x = Service code:<br>0 = Management<br>1 = Internet Access<br>2 = Provisioning<br>3 = Mail (ISP)<br>4 = Security<br>5 = Performance |
| <AlarmLocation> | Sets the Location of the Alarm (Hub) | Fixed Value |
| </Action> | End tag for the Action section | |
| <Action> | Start tag for the Action section | |
| <ServiceName> | Sets the Name of the Service, as defined in the Service section | Security |
| <Timeout> | Sets the global time out of the specific Action in milliseconds | 10000 |

*Fig. 53b*

| XML tag | Description | Value |
|---|---|---|
| <HSDCode> | Sets the alarm Class (i.e. HSD_0_x00000) | x = Service code:<br>0 = Management<br>1 = Internet Access<br>2 = Provisioning<br>3 = Mail (ISP)<br>4 = Security<br>5 = Performance |
| <AlarmLocation> | Sets the Location of the Alarm (Hub) | Fixed Value |
| </Action> | End tag for the Action section | |
| </Location> | End tag for the Location section | |
| </Scenario> | End tag for the Scenario section | |

*Fig. 54*

METHOD AND SYSTEM OF PROVISIONING A DESIRED COMMUNICATION SERVICE FOR A USER ACROSS A NETWORK

The invention relates to communications, particularly but not exclusively broadband communications. One facet of the present invention relates to provisioning of services in a communications network and finds particular, but not exclusive, application in a broadband network environment or other environment where services are provisioned. The provisioning of services will now be discussed in more detail.

Provisioning is a fundamental step in establishing a connection with a user. The user is normally provided with a user device, a non-limiting but illustrative example of which includes a Personal Computer (PC) and an access device. For example, in a broadband network, a cable modem or Digital Subscriber Line (DSL) modem is normally provided as an access device to connect the user device to the broadband network. With a conventional dial up network, any user with a suitable modem and is able to dial into a service (although some service may request a password following connection whereas others may allow open or guest access). Similarly, with Internet services, any user with access to the Internet can access a desired web address, although some sites may require passwords. In both cases, however, it is not necessary for the service to have details of the user equipment in advance of connection. In contrast, broadband services must be specifically provisioned for a given user. In order to provision services for a broadband connection, it is necessary for the provisioning application to have a unique "physical" identifier of the user with whom the service is being provisioned. In the case of a cable modem connection in particular, this may be referred to variously as physical address or identifier, hardware address or Media Access Control (MAC) address. This may be achieved by, for example, a user manually reading an identifier of a hardware product (for example cable modem) printed on the packaging and communicating this, for example by telephone, to the service provider. This manual provisioning method obviously has drawbacks; it is labour intensive and renders rapid provisioning of new services cumbersome.

In the case of a DSL connection, the DSL modem does not have a MAC address nor a permanent IP address but the PVC ID used for the connection between a DSL modem and a Broadband Access Router (BRAS) is used to identify the user; provisioning is carried out by managing the software PVC between the BRAS and DSL modem. Class of service and Quality of service are managed through the settings of the PVC. When connecting the PC to the modem and booting the system, the actual PVC ID is transmitted across the network and can be used for user association. Thus, in the case of a DSL connection, although the relevant "physical address" which identifies the DSL modem is in fact that of an ATM virtual connection, pursuant to the invention it has been appreciated that this can be regarded as a physical or hardware address for the purpose of provisioning and treated in a similar manner to a cable modem MAC address. As used in this specification, the term "hardware address" or "physical address" is intended to encompass a PVC ID in the case of a DSL connection. The terms may encompass another address or identifier which uniquely characterises a connection to a specific access device in other contexts. The terms are intended to distinguish from higher level identifiers, such as an IP address or email address, which is not directly associated with a particular access device.

It is also possible to provide web-based applications for provisioning for a cable modem whereby a user enters a MAC address (as defined below) or physical device identifier into an interactive website; this reduces labour at the provisioning end but still requires a user to provide a (normally lengthy) physical identifier correctly. In prior art systems, the access device generally connects substantially transparently and the physical address (MAC address) of the user device (PC) is normally used to define the connection.

It has been proposed to provide specific application software to read the hardware address details and communicate these to a provisioning service provider and the provision of high-level application software at the user end may facilitate automatic provisioning of services. It does, however, of course require specialist software at the user end, which must be provided, adding to costs and complexity, and which may not always be present so may need to be installed by a user.

Aspects of the invention are set out in the independent claims to which reference should be made. Preferred features are set out in the dependent claims. Representative and further aspects are discussed below.

According to a first aspect, there is provided a method of provisioning a desired communications service for a user across a network, the method comprising obtaining information for a desired communications service to be provisioned based on information associated with an existing connection for the user and provisioning the desired communications service based on the information obtained.

This may facilitate provision by making use of an existing connection as a source of information on which to base provisioning of a new connection.

According to a preferred embodiment, there is provided a method of provisioning a service in a broadband network to a user device having an internetwork protocol address, the method comprising:

obtaining an internetwork protocol address of a user device for whom a service is to be provisioned;

sending a configuration protocol query message to a configuration related address server, the message containing the internetwork protocol address of the user device;

waiting for a response message from the server;

extracting a hardware address related to the user device from the response message;

provisioning a network connection with the user device based on the hardware address obtained from the response message.

There is herein described an improved and simplified method of facilitating provisioning in communications networks, particularly broadband networks. Preferably a user may be able to purchase an access device, such as a cable or DSL modem, "off the shelf" and services may be provisioned for the access device without the service provider having pre-provisioned the access device or supplied specialist software.

There is described herein a method of provisioning a communications service for a user, the method comprising obtaining a hardware address for an access device, for example a cable modem MAC address or PVC ID in the case of a DSL connection, based on a communications protocol address, such as an Internet Protocol address, of a user device, for example a PC, and provisioning a service based on the hardware address obtained. The hardware address can be obtained using a low level protocol, for instance DHCP lease query.

Also described is the use of a communications protocol address, such as an Internet Protocol (IP) address, of a user device to obtain a physical address of an access device for use in provisioning a service for the user via the access device.

Further, there is also described herein a method of provisioning a service for a network access device comprising receiving a request from a user for a service which request does not include the physical address of the access device and provisioning a service based on obtaining the physical address of the access device using a communications protocol address, such as an Internet Protocol (IP) address, for the user.

A provisioning application is also described, which comprises means for receiving a communications protocol address, such as an Internet Protocol (IP) address, of a user device; means for discovering the physical address of an access device associated with the user device based on the communications protocol address and means for provisioning a service for the access device based on the discovered physical address.

The methods and apparatus described above preferably operate without requesting the user to supply a physical address for the access device and without requiring the user to install software specific to the service provider.

It has been appreciated that it is possible to obtain or verify the physical device address of a user device such as a PC by a "brute force" trawl through IP servers in an IP environment. However, such a method is not particularly efficient in terms of resources and a more elegant method has been developed; this can drastically reduce time taken to obtain a physical address corresponding to an IP address.

There is further herein described a method of provisioning a service in a communications network for a user having an communications protocol address, such as an IP address, the method comprising:

obtaining a communications protocol address of a user for whom a service is to be provisioned;

sending a DHCP lease query message to a DHCP server, the message containing the communications protocol address of the user;

waiting for a DHCP response packet from the server;

extracting a hardware address, such as the MAC address or the PVC ID, of the user from the DHCP response packet;

provisioning a network connection with the user based on the hardware address obtained from the DHCP response packet.

By way of additional background, it is noted that the method described above makes use of the well established Dynamic Host Configuration Protocol (DHCP), details of which can be found in RFC 2131 of the Internet Community dated March 1997, the contents of which are incorporated herein by reference. The method also makes use of the draft DHCP Lease Query message protocol, details of which may be found on the ietf.org website and are summarised below. As those skilled in the art will appreciate, DHCP is an established low-level protocol for managing IP connections. DHCP presupposes that services have been previously provisioned for the user with whom a connection exists and does not directly concern itself with provisioning.

Those skilled in the art will appreciate that provisioning of services is normally a distinct process from low level communication between access concentrators and DHCP is not normally considered directly relevant to provisioning applications. In particular, the DHCP lease query has been designed for access concentrators within a network to rebuild address information gleaned from their access relay function after rebooting or replacement. However, it has been appreciated that features of DHCP can in fact also be used to simplify provisioning. A user for whom a service is to be provisioned will often have a pre-existing IP address. Using DHCP Lease Query, the hardware parameters associated with that address can be identified from the DHCP server without the need for specialist application software at the user end nor for manual provision of the hardware identifier and this information can be used to provision a new service. Thus, surprisingly, DHCP lease query can be used in a provisioning context to facilitate automatic provisioning.

It is particularly advantageous that an address allocated in an internetworking environment, such as the Internet environment, can be used to obtain a hardware address. Within a network, the arrangement is usually that the network has at least one server, such as a DHCP server, which controls allocation of a block of internetworking protocol addresses (eg IP scope), which can be used across the internetworking environment, to individual hardware devices connected within the network. The mapping between internetworking protocol addresses and hardware addresses is then only known within the network doing the allocation and the DHCP lease query is only a low level communication designed for use by access concentrators in a network to rebuild data for use in carrying traffic. Increasingly, however, there is a demand for open access services in which networks carry services provided by off-net service providers but that means provisioning has to be done for new access devices, or new services to be provided to existing access devices, by off-net service providers. Here a further problem arises since an off-net service provider doesn't have access at all to the DHCP server.

This further problem may be solved using a facility of internetworking protocols known as tunnelling. In tunnelling, a datagram is encapsulated in a protocol from a higher or the same level and passed across the transport system to an endpoint where it is decapsulated. There are various forms of tunnelling, including Virtual Local Area Network (VLAN) encapsulation and source network address routing but a form that is likely to be particularly appropriate is Point-to-Point Protocol (PPP), for example PPP over Ethernet (PPPoE). This is described in an Internet Engineering Task Force (IETF) Draft available at the IETF web site (ietf.org). Increasingly, networks such as broadband networks will support tunnelling and this is exploited in the apparatus and methods herein described.

The user access device IP address may be obtained by means of an existing internetworking connection such as a TCP/IP connection. For example, most conveniently a user may be required or requested to visit a website in order to obtain a new service and the user's access device IP address may be captured from this website for use in formulating a DHCP lease query for a provisioning application. Other TCP/IP transactions may be used to obtain an IP address for the user access device.

There is also herein described use of a DHCP lease query message to obtain a physical hardware identifier of a user device for use in a provisioning application to provision a broadband service for the user.

Further, there is also described a provisioning application having means, preferably a provisioning module, for provisioning a broadband service based on an access device physical address characterised by means, preferably a query module, for obtaining the user hardware identifier based on a DHCP lease query message submitted to a DHCP server and containing an IP address related to the access device. The access device may be a cable modem or DSL modem and the physical address may be a MAC address or PVC ID.

There is also herein described a computer program or computer program product, preferably stored on a computer readable medium, for performing any method described herein, preferably containing instructions for:

generating a DHCP query message containing an identifier related to an access device;

obtaining from a response to said message a hardware identifier of the access device;

provisioning a service for the access device based on the hardware identifier obtained.

Whilst the use of DHCP lease query may provide a particularly preferred, efficient and elegant implementation, other mechanisms may alternatively be used which allow an access device physical address to be returned using an internetworking address (or other pre-existing identifier related to the user of the access device) and preferably without requiring specialised software on the user machine.

Prior art provisioning methods generally provision services based on physical addresses (MAC addresses) of user devices such as PCs. Further, there is also herein described a method of provisioning a service for a user having a user device connected to a broadband network via a broadband access device, the user device and the broadband access device each having a respective physical address, the method comprising provisioning a service based on the physical address of the access device.

This allows the user to replace a user device, for example to connect multiple PCs without having to re-provision each device, which can be a cumbersome process, particularly with prior art provisioning methods. It also reduces the risk of fraudulent access as the service is made to the nearest point to the broadband network, namely the access device. Thus, if the access device is swapped, the service will need to be re-provisioned.

A significant advantage of the methods and apparatus described above is that they may facilitate more rapid expansion of services as users may purchase suitable access devices from retail outlets without requiring pre-provisioning or specialist skills to install the devices.

It has been further appreciated that because the novel provisioning application described can autonomously propagate services, it is desirable to integrate this with or tie the provisioning application to a capacity management application.

Thus preferably the provisioning method or provisioning application includes the step of or means for communicating with a capacity management application and such a method or application may be independently provided.

The method may include checking for available capacity prior to provisioning a service and/or reporting provisioning of a service to a capacity management application after provisioning.

Conventionally, provisioning and capacity planning are distinct and this reflects conventional provisioning processes; problems have hitherto not been appreciated. However, this method may enable provisioning to be controlled at a higher level before problems arise; thus this solves a surprising and hitherto unappreciated problem which studies reveal might arise were efficiency of existing provisioning processes improved. The benefits of this method may be realised even with conventional provisioning processes.

The system described herein further extends to a capacity management application having means for communicating with a provisioning application. The capacity management application will normally have means for storing data relating to network capacity and user interface for communicating the stored data with a user. The capacity management application will normally provide a graphical interface and may include conventional statistical and graphing tools for displaying information concerning present, historical or predicted network capacity. The details of the capacity planning application are not critical and may be based on existing network planning applications. According to the inventive development, the application has means for communicating (preferably dynamically/in real time) with a provisioning application. Thus a provisioning application can report provisioning of new services and thus advise that capacity will be reduced before this would normally be featured in capacity planning considerations (for example before an actual increase in traffic can be detected). Particularly in the case of rapid roll out of services, this may lead to a significant increase in reliability of predictions. Alternatively or in addition, the capacity management application may feed information back to the provisioning application and may inhibit provisioning if capacity is unavailable, or may limit the capacity that can be provisioned. Again this may be advantageous particularly in the case of rapid roll out as it may reduce the risk of a service being provisioned and leading to network overload or the service being unsatisfactory to a user.

Preferably a network management tool comprises means for displaying at least one of performance, no of modems on a given node, quality of service, duration of connection, uptime, identifiers of faulty modems. Preferably a network management tool has means for communicating with an agent associated with a network component for receiving information from the agent. Preferably the network management tool comprises means for displaying information based on network usage at the level of network segments, preferably wherein a network segment corresponds to a card of a universal broadcast router or cable modem termination system. Preferably an agent is provided to report usage at the segment level. Preferably the management tool has means for displaying an indication of subscriber types as well as traffic information. A network management tool having any of the preferred features disclosed herein may be independently provided.

The invention further provides provisioning tools, planning tools, user interfaces, methods, inventory tools, agents for devices, data packets, computer programs, computer program products, apparatus, systems, and computer implemented methods. Features and preferred features of each category may be applied to other categories unless otherwise stated. References to tools are intended to encompass without limitation applications or applets, software modules, combinations of hardware and software and to include both stand-alone modules, modules or code integrated into larger applications and modules which may stand alone and/or be provided as part of a suite of components. In most cases, these tools may be embodied as computer programs and computer program products and may be supplied as data packets or signals, but may include either general purpose or dedicated hardware.

A further aspect provides a provisioning tool for a broadband network comprising means for discovering information concerning a service to be provisioned based on information associated with an existing connection.

A further aspect provides a provisioning tool for provisioning a broadband service over at least one specified hardware connection, the provisioning tool comprising a module for performing an activation action and an activation script processor for processing an activation script defining a workflow sequence including at least one activation action.

Conventionally the workflow sequence would be implicit in the operation of any activation module for a particular hardware connection. However, pursuant to the invention, it has been appreciated that similar steps may be performed for different hardware connections and changes may be made dependent on the network configuration. By providing a module for performing an activation action and an activation script, definition of the necessary steps for a variety of hardware connections (cable, dsl modems of varying types, MPLS and VPN connections) may be accommodated more easily without requiring complex dedicated programming for each type of hardware; basic actions may be defined and then these may be put together using a script.

Preferably the script is user viewable and/or editable. In a highly preferred embodiment, the activation script is executed in a structured document, particularly a markup language such as SGML or most preferably XML (extensible markup language)—XML provides a readily editable and readily processed compact language having sufficient flexibility to implement an activation script. The provisioning tool may provide means for storing a plurality of activation scripts for mutually distinct hardware connections and means for selecting an executing an appropriate script for a hardware connection in response to an activation request.

Preferably the provisioning tool has means for receiving an identifier of a client device and means for selecting an activation script based on the identifier. The identifier may include an identifier of equipment type for at least some components in the network, preferably for all components. The equipment type information preferably includes manufacturer and model information—this enables different procedures for different versions of the same type of device (e.g. switch, cable modem) to be accommodated. This is particularly beneficial when scripts govern workflow as the workflow for a variety of similar devices from different manufacturers may be similar or identical but the precise activation actions may differ. Multiple devices may be catered for efficiently by essentially duplicating activation scripts but providing device specific activation modules as needed.

The identifier may be user input or may be based on information gained from a discovery process. Preferably each activation action comprises a low-level action, i.e. without complex flow control and action flow control is defined by the script. Preferably each action corresponds to a defined step or unit of time. Preferably actions correspond to verbs of the activation scripts.

Preferably the provisioning tool has means for recording transactions (with a device to be provisioned such as a modem) during activation of a service. Preferably transactions are recorded so that individual transactions can be replayed, viewed or analysed. Pursuant to the invention, it has been appreciated that this can provide a surprisingly useful insight into any network problems as compared to the conventional approach of logging internal success or error reports and may enable configuration scripts to be optimised. This feature is particularly useful when provided in conjunction with the scripting of actions but may be provided independently.

A further aspect provides a provisioning tool for a broadband network comprising means for executing a sequence of actions to activate a broadband service via a client device, the provisioning tool having means for recording transactions with the client device.

The provisioning tool may have means for receiving stored data indicative of a network configuration and client data identifying the client device to be provisioned and means for determining a sequence of actions based on the stored data and client data. This may simplify a process, as compared to a conventional process in which a user specifies network components to be configured.

A further aspect provides a provisioning tool for a broadband network comprising means for receiving stored configuration data indicative of a network configuration and client data identifying the client to be provisioned and means for determining a sequence of actions based on the stored configuration data and client data. The client data may be determined from a user interface.

The provisioning tool preferably has a graphical user interface for displaying a representation of at least a part of the network. The client data may be determined based on a user input from the graphical user interface. More preferably the provisioning tool has means for receiving an input command based on the graphical user interface and determining at least one provisioning action in response thereto based on the stored configuration data. In a preferred application, the input command may include a drag and drop command. Preferably the provisioning tool is arranged to interpret a user action based on the graphical interface and the configuration data. Advantageously the provisioning tool has means for storing at least one rule or configuration script for use in determining at least one provisioning action. The storage of rules may facilitate generation of complex sequences of action based on simple user inputs.

In a preferred embodiment, the invention provides a provisioning tool for a broadband network comprising means for storing a representation of network configuration, means for storing rules governing activation actions, a (preferably graphical) user interface for providing a user with a representation of a network configuration, means for receiving a user input to provision a service for a client, means for processing the input based on the stored representation of the network configuration and the stored rules to generate a sequence of at least one activation action. The provisioning tool typically has means for performing at least one activation action.

A further aspect provides a provisioning tool for a broadband network comprising means for storing network configuration information including information concerning network topology and information concerning configuration actions, a drag and drop graphical user interface for receiving a user command to provision a service and means for generating an activation sequence containing at least one activation action based on the received command and the stored network configuration information.

The provisioning tool may have means for communicating with an agent associated with a client device to communicate configuration information therewith. By providing an agent on the client device, greater flexibility may be achieved and enhanced functionality may be achieved as compared to communicating directly with the client device. The agent may be independently provided.

A further aspect provides an agent for a client device in a broadband network, the agent having means for communicating configuration information for the client device to a remote network configuration or management tool, advantageously from a provisioning tool.

The provisioning tool may have means for communicating with a network inventory tool for receiving network configuration information. The network inventory tool preferably has means for discovering network configuration information based on communicating with network components. The network inventory tool may (additionally, or less preferably alternatively) have means for receiving information describing network configuration via a user interface. It is a preferred feature of the provisioning tool aspects that the network configuration information includes an identifier of equipment type for at least some components in the network, preferably for all components. The equipment type information preferably includes manufacturer and model information. This greatly enhances the flexibility of the method as actions specific for a particular type of component may be correctly generated in an automated fashion. This is particularly advantageous in combination with aspects which provide for selection of activation actions. Preferably the network inventory tool has means for storing information concerning (a) equipment type identifiers for network components type and (b) interconnections between network components. Thus, as well as a user being able to view network topology and see which components may be affected by a proposed action, the configuration actions may be tailored to specific hardware equipment type. The inventory tool may be integrated with the provisioning tool or may be provided independently. The provisioning tool and inventory tool advantageously communicate by sharing a database.

A further aspect provides a network inventory tool for a broadband network comprising means for storing network configuration information including first information including an equipment type identifier for each of a plurality of network components and second information identifying interconnections between network components.

The inventory tool may be arranged to discover network configuration information by interrogating network components. The inventory tool is preferably arranged to communicate the network configuration information to at least one other tool, optionally by storing the information in a commonly accessible database. The inventory tool is preferably arranged to communicate with an agent operating on a network component to discover information about the network component. This may simplify operation of the inventory tool and/or increase the amount of information that the tool can discover and/or facilitate operation with a variety of types of hardware. Agents may be configured to operate on specific network components. The agents may be independently provided.

A further aspect provides an agent for a network component of a broadband network, the agent comprising means for passing equipment status or identification information concerning the network component to a remote network component, preferably a network inventory tool.

The agent may further comprise means for receiving a configuration instruction, optionally from a provisioning or configuration or management tool. At least a portion of the operation of the agent is preferably configurable by means of a script, preferably an XML script.

The provisioning tool and/or inventory tool may operate in conjunction with a planning tool.

A further aspect provides a planning tool comprising a user interface for communicating information relating to network capacity or a planned service with a user, the planning tool characterised by means for communicating with a provisioning tool and/or inventory tool network or service configuration information.

In a preferred implementation, the planning tool may provide means for defining one or more planned services based on at least one of: location; customer profile; quality of service; network availability; availability of other services.

The provisioning tool is preferably arranged to operate in conjunction with a customer front end for communicating user information. The user information may include authentication information. The user information may include an indication or selection of one or more desired services. The provisioning tool may include means for re-provisioning a service based on information received from a user and/or may include means for communicating available services to a user, preferably by means of a customer front end tool.

A further aspect provides a customer front end tool for a client device in a broadband network, the customer front end tool having means for receiving user information and communicating the user information to a remote provisioning tool.

This may facilitate configuration. The customer front end tool may include means for communicating an identifier of the client device to the provisioning tool. The customer front end tool may operate over an internet connection and the internet connection may be used by the provisioning tool in identifying the client device. The customer front end may be arranged to enable a user to enter user authentication information in the event that a client device configuration is changed, for example in the event that one device (e.g. a cable modem) is swapped for another and/or the device is physically connected at a new location. Particularly in combination with the automatic discovery procedure mentioned, this may greatly facilitate use of a service for a user who modifies equipment as, rather than having to undergo a new manual provisioning step each time a change is made to the location of equipment or equipment hardware, the user need simply supply authentication information and the previous service can be re-provisioned to operate with the new configuration.

A further advantage of the provisioning techniques and tools is that, because provisioning is straightforward and in preferred embodiments can be performed without end user interaction, new or modified services can be delivered. In particular, a service may be dynamically altered by re-provisioning, or new services made available periodically. This may facilitate content delivery and may increase uptake of new services.

A further aspect provides a provisioning tool for provisioning a service in a broadband communications network having means for provisioning a service characterised by means for storing information relating to a service parameter which varies with time and means for altering a characteristic of the service based on the stored information.

Preferably the means for altering is arranged to re-provision the service.

A further aspect provides a method of providing a service in a broadband communication network comprising storing information relating to a service parameter which varies with time and periodically re-configuring the service based on the stored information.

A further aspect provides use of a provisioning function to effect delivery of a communication service having at least one time-varying service characteristic based on periodic re-provisioning of the service.

The time varying characteristic may include one or more of bandwidth, quality of service, access to specified services. The time varying characteristic may include variation at least once a week and preferably at least once a day. The characteristic may be varied in response to usage or based on information from a source such as a congestion detector or a billing system, in addition to or instead of in response to stored data of a time characteristic.

Additionally or alternatively, a service having a time-varying characteristic may be implemented based on reconfiguring a network component, preferably by communicating with an agent provided on the network component, particularly wherein the network component comprises a user access device.

The invention may provide a method of providing a communication service to a user via a user access device, the method comprising dynamically remotely re-configuring the user access device to modify a characteristic of the service delivered.

By dynamically is preferably meant online and/or while the service is available substantially uninterrupted and/or in response to a real time input, and most preferably without operator intervention.

Services may be provided to a plurality of users and the method may include selectively re-configuring an individual user access device to modify selectively a characteristic of service for the individual user.

Modification may be in response to stored information relating to a time varying characteristic, as aforementioned. Additionally or alternatively, modification may be in response to usage or billing system information—for example a service may be downgraded for a user who is behind with payments or who has previously exceeded a usage quota.

Another advantageous use of data captured during provisioning may be in service assurance. It can be important in offering a communications service that the ongoing quality of service provided to customers can be monitored. New customers will generally have an expectation of an acceptable quality of service and may indeed have a service level agreement with a service provider. Existing customers will not expect the quality of service to become degraded because other customers have been newly provisioned.

By sharing data, for instance by sharing a data model and access to the same data storage, a provisioning application, working in conjunction with a service assurance application, can offer a particularly efficient use of data for diagnostics. Service assurance products may for instance receive alarm signals or data arising in use of a network to provide an identified service. Since a provisioning application may gather subscriber-related address data in relation to services provisioned, the service assurance product can be enabled to relate alarm data not just to services but also to relevant service subscribers.

Further advantages of the methods and apparatus herein described lie in the fact that a service provider has the physical address of a user's access device. For instance, the service provider can also provide a measure of fraud management in that, if fraud is detected in association with an access device, the service provider can suspend or de-activate the device in relation to a service, or can downgrade the level of service to that device.

Also, prior to service provision, the service provider can identify cases where a user's situation is simply not able to support a service. For instance, where a user wants to subscribe to a Video on Demand (VoD) service over Digital Subscriber Lines (DSL), the service provider can check whether the user's access device is physically close enough to a Digital Subscriber Line Access Multiplexer (DSLAM) to have sufficient bandwidth.

Further incorporated herein are methods which correspond to the apparatus and vice versa and to computer programs and computer program products for implementing such methods. Preferred and optional features of the methods and apparatus disclosed may be applied to all other methods and apparatus unless otherwise stated or apparent from the context.

BRIEF DESCRIPTION OF DRAWINGS

The provisioning of services in a communications network will now be described further, by way of example only, with reference to the accompanying drawings in which:

FIG. 12 is a schematic diagram of an example of a Set-Top Box Manager screen display according to one embodiment of the systems and methods herein described;

FIG. 16 is a schematic diagram of an 'Install' Results List Panel screen display according to one embodiment of the systems and methods herein described;

FIG. 17 is a schematic diagram of a 'Forward Path' Results List Panel screen display according to one embodiment of the systems and methods herein described;

FIG. 18 is a schematic diagram of a 'Reverse Path' Results List Panel screen display according to one embodiment of the systems and methods herein described;

Figure 39:
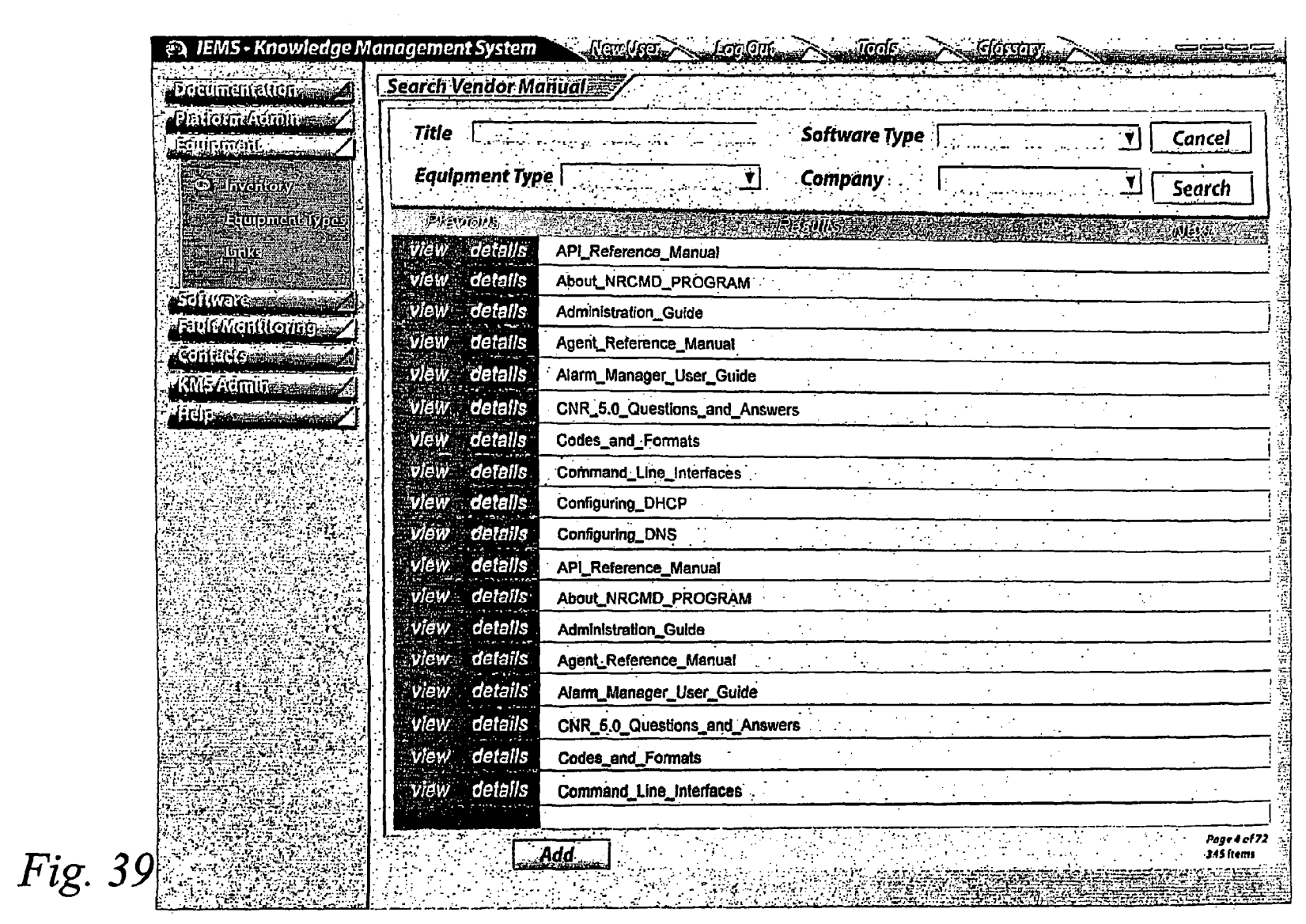

FIG. 39 shows a screen view available to a user of the knowledge management system;

Figure 40:
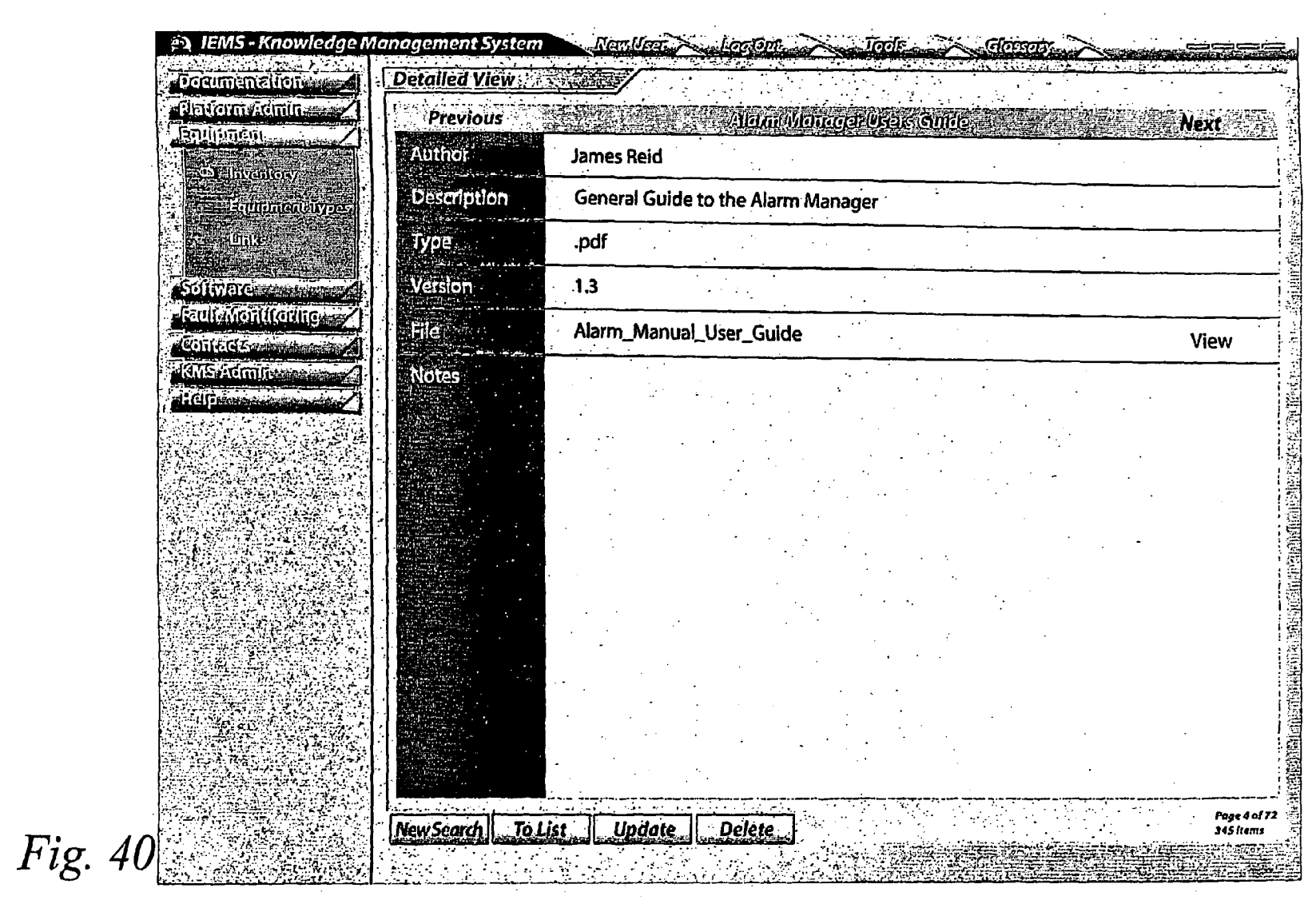

FIG. 40 shows a further screen view available to a user of the knowledge management system;

FIG. 49 is an XML section of command script for the switch configuration for use with a preferred ISEA according to one embodiment of the systems and methods described herein;

FIG. 50 is an XML section of command script for a cable modem configuration for use with a preferred ISEA according to one embodiment of the systems and methods described herein;

FIG. 51 is an XML section of command script for a scheduler manager configuration for use with a preferred ISEA according to one embodiment of the systems and methods described herein;

FIG. 52 is an XML section of command script for a DHCP protocol configuration for use with a preferred ISEA according to one embodiment of the systems and methods described herein;

FIG. 53 is an XML section of command script for use with a preferred ISEA to configure a scenario named 'Test' for one location, containing three services; provisioning, internet access, mail (ISP) according to one embodiment of the systems and methods described herein;

FIG. 54 is a continuation of the XML section of command script of FIG. 53 according to one embodiment of the systems and methods described herein;

DETAILED DESCRIPTION OF PREFERRED EMBODIMENTS

Discovery of Device Details for Use in Provisioning

Figure 1:
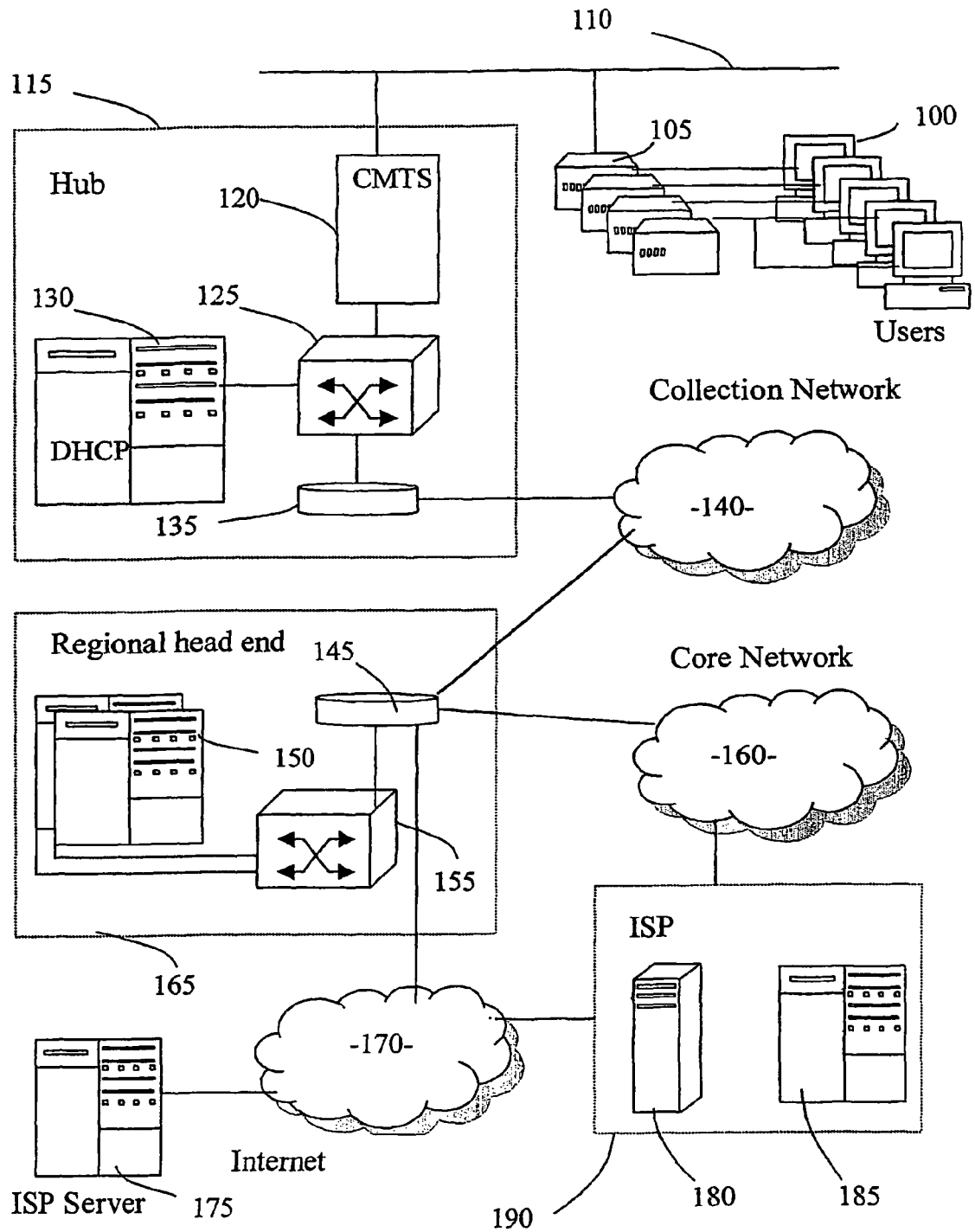
FIG. 1 is a schematic diagram of a network environment for provisioning apparatus in accordance with one example of the system and methods herein described.

Referring to FIG. 1, a network environment in which provisioning apparatus might be used is a cable network providing broadband services. User terminals 100 such as PCs are connected to a cable network via modems 105. A cable modem termination system 120 connects the modems 105 to an access concentrator 125 which in turn is connected at or via a hub 115 of the network to a DHCP server 130.

The network hub 115 is connected over a collection network 140 to a regional head end 165 for the network and an Internet Service Provider (ISP) platform 190 is connected to the regional head end 165 by a core network 160. The ISP platform 190 also has access to the Internet 170 and may provide services from an Internet-based server 175 and/or from a server 185 within its own platform 190.

Importantly, in an open access environment, there may be service provider platforms 190 which only have connection to the cable network via the Internet 170.

In a known provisioning arrangement, when a new access device 105 is added to the cable network, at a hardware address in the network, the DHCP server 130 will allocate it an Internet Protocol (IP) address. The DHCP server 130 maintains a record of the allocated IP addresses mapped against the hardware addresses.

If a user now wishes to subscribe to a new service, using the same access device 105, the relevant service provider needs to know the hardware address in order to provision the new service to that user and the hardware address can be obtained from the DHCP server 130 using a DHCP lease query message, as long as the user's access device IP address is known.

One way of enabling service provisioning can be done in response to a user's request over the Internet. In FIG. 1, the user may use their user equipment 100, connected to an access device 105, to access an interactive Web interface of the service provider's, installed on an Internet host 175. The Web interface will automatically pick up an IP address for the user's access device 105 which the service provider can use in querying the DHCP server 130 from their ISP platform 190.

Figure 2:
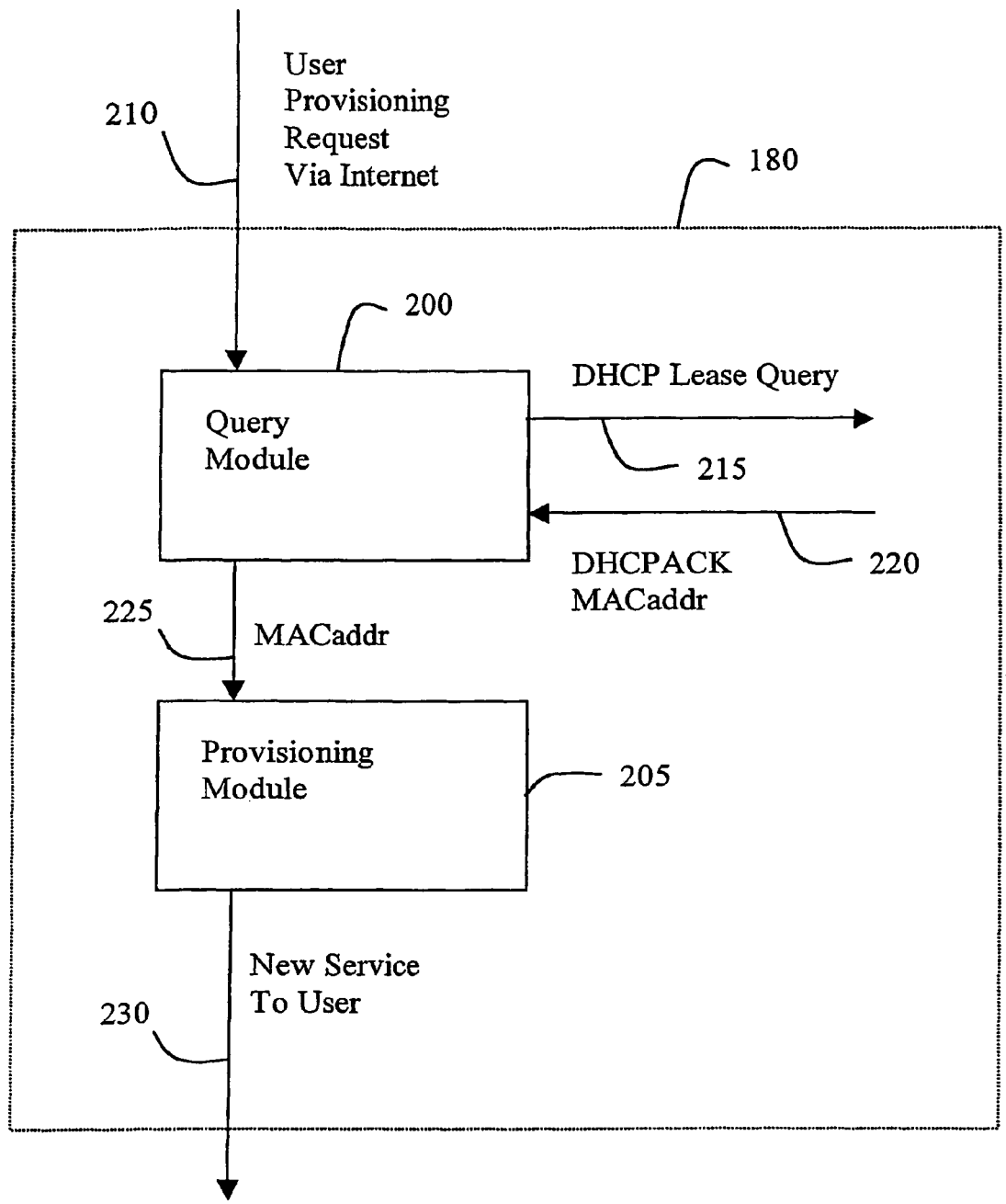
FIG. 2 is a schematic diagram of message flow in provisioning apparatus carrying out provisioning according to one example of the systems and methods herein described.

Referring to FIG. 2, in more detail, the ISP platform 190 comprises a provisioning server 180 which supports a provisioning module 205 and a query module 200. When the user interacts with the Web interface to request a new service, the query module receives (Step 210) an IP address associated with the user's access device 105 from the Web interface, for instance in the form "000.nnn.mmm.111". The query module 200 formulates a DHCPLEASEQUERY message containing the IP address and sends it (Step 215) to the DHCP server 22 which returns (Step 220) a DHCPACK response packet from which the user's hardware address (MACaddr) is extracted by the query module 200 and passed (Step 225) to the provisioning module 205. The provisioning module, having a hardware address for the user's access device, can then perform provisioning in a conventional manner.

An exemplary method of operation will now be summarised.

(A) A user visits a website hosted on an ISP server 175 and requests a new service. This request contains the user's IP address and identifies the service requested. The request is communicated to the service provider's Web interface which communicates the request or a portion thereof to a provisioning application on a provisioning server 180. The Web interface may be a part of the provisioning application, it may be separate but run on the same server, or it may run on a separate server altogether.

(B) The provisioning application receives the request (Step 210), performs validation as required and formulates a DHCPLEASEQUERY message containing the IP address to send (Step 215) to an appropriate DHCP server 130. In FIG. 2, the query is formulated by a specific query module 200, but this may be integrated seamlessly into the provisioning application.

(C) The DHCP server 130 receives the message and returns (Step 220) the appropriate MAC address. If the DHCP server does not support DHCPLEASEQUERY or does not have the information then either no response will be sent or a null response, according to the circumstances and the DHCP protocol.

(D) The provisioning application processes the response packet, if any, and extracts a MAC address, if possible. In the event that the provisioning application cannot obtain a response from any DHCP server, then it must revert to other methods of obtaining a MAC address, for example by requesting the user to supply it. Even if it is available, the user may be requested to verify the information obtained.

(E) Provisioning is carried out as required, using the MAC address obtained to enable provision of the new service to the user (Step 230) via the relevant access device; the remainder of the provisioning process may correspond to or be based on a known provisioning process.

The DHCP Lease Query protocol will be available to those skilled in the art and so is not described in detail.

A list of drafts of the Internet Society may be found at the IETF web site (ietf.org). However, the following may assist in understanding the background and explaining the novel use made of this low level query, which was intended for use by access concentrators such as routers and not previously contemplated for use in provisioning applications.

Background to DHCPLEASEQUERY

The DHCPLEASEQUERY message is a new DHCP message type transmitted from a DHCP relay agent to a DHCP server. It is intended that a DHCPLEASEQUERY-aware relay agent would send the DHCPLEASEQUERY message when it needed to know the location of an IP endpoint. The DHCPLEASEQUERY-aware DHCP server would reply with a DHCPKNOWN or DHCPUNKNOWN message. The DHCPKNOWN response to a DHCPLEASEQUERY message would allow the relay agent to determine the IP endpoint location, and the remaining duration of the IP address lease.

Query by IP Address:

The system and methods herein descried may make use of this feature, which will be summarised briefly. (Words in capital letters are keywords which can be interpreted as described in the IETF's RFC 2119.)

For this query, the client passes an IP address to the DHCP server which returns any information that it has on the most recent client to use that IP address. Any server which supports the DHCPLEASEQUERY message MUST support query by IP address. If an IP address appears in the "ciaddr" field, then the query MUST be by IP address regardless of the contents of the MAC address or client-id option (if any).

Definition of MAC Address

In the context of a DHCP packet, a MAC (Media Access Control) address consists of the fields: hardware type "htype", hardware length "hlen", and client hardware address "chaddr".

Sending the DHCPLEASEQUERY Message

Although it is envisaged in the draft protocol that a DHCPLEASEQUERY message would typically be sent by an access concentrator, in fact, in this embodiment, the message will be sent (or caused to be sent) by a provisioning application. The DHCPLEASEQUERY message uses the DHCP message format as described in [RFC 2131], and uses message number TBD in the DHCP Message Type option (option 53). The DHCPLEASEQUERY message has the following pertinent message contents:

The giaddr MUST be set to the IP address of the requester (i.e. the server running the provisioning application). The giaddr is independent of the ciaddr to be searched; it is simply the return address of for the DHCPKNOWN or DHCPUNKNOWN message from the DHCP server.

The Parameter Request List SHOULD be set to the options of interest to the requestor.

The Reservation bit in the "flags" field of the DHCP packet (see [RFC 2131]) is used to specify if the response should include information encoded into reservations.

Specifically for Query by IP Address:

The values of htype, hlen, and chaddr MUST be set to 0.

The ciaddr MUST be set to the IP address of the lease to be queried.

The client-id option (option 61) MUST NOT appear in the packet.

Processing the Response

If the DHCP server has information about the most recent device associated with the IP address specified in the ciaddr, then the DHCP server MUST encode the physical address of that device in the htype, hlen, and chaddr fields. Otherwise, the values of htype, hlen, and chaddr MUST be set to 0 in the DHCPKNOWN packet.

Thus, to extract the physical address, the provisioning application need simply read the htype, hlen and chaddr fields in a response packet. In the case of a cable modem, the MAC address is obtained and, in the case of a DSL modem, the PVC ID is obtained.

Figure 3:
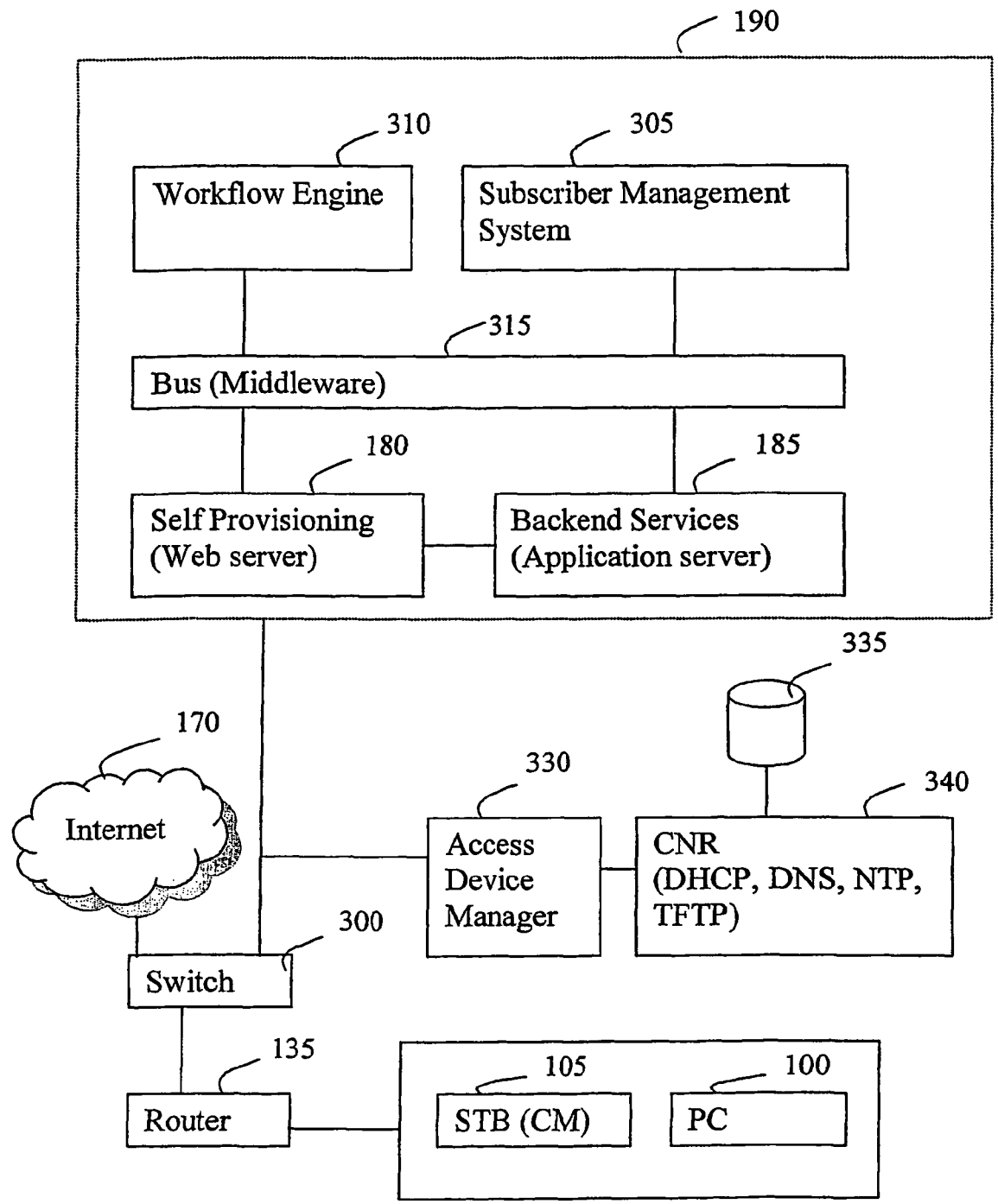
FIG. 3 is a schematic diagram of an architecture for a service management system using the provisioning apparatus of FIGS. 1 and 2.
Figure 4:
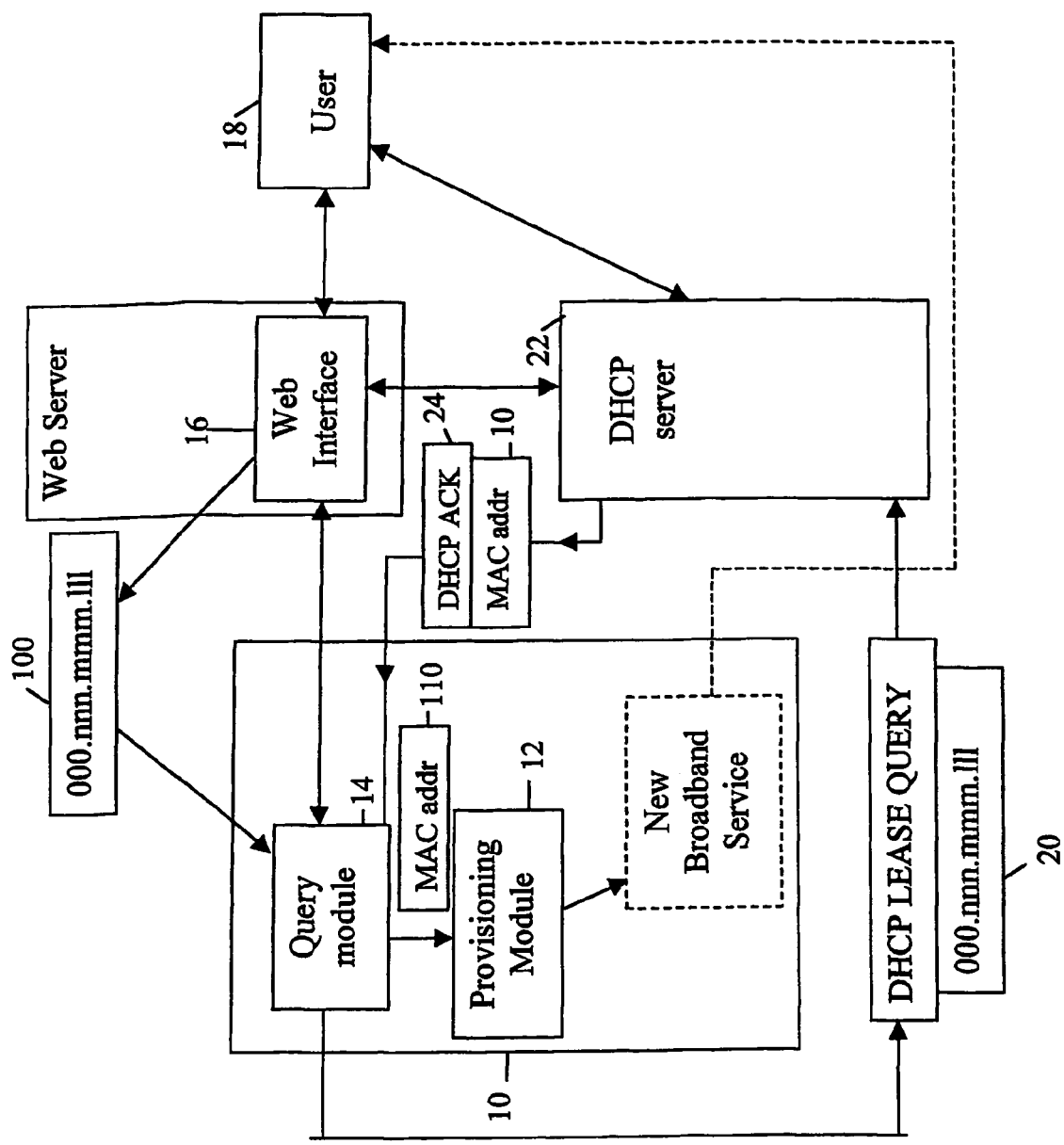
FIG. 4 is a schematic diagram of message flow in provisioning apparatus carrying out provisioning according to a further example of the systems and methods herein described.

Referring to FIG. 3, the network environment in which services are administered and delivered can be complex. It may be that the service provider's platform 190 is directly connected to the network to which the user's access device 105 is connected. In this case, the provisioning server 180 can easily send a DHCP Lease Query message to the DHCP server 130 for the relevant network. However, in an open access environment, it may be that the network is actually one of many which could be used by a service provider. In this environment, each broadband network may have associated management platform comprising an access device manager, eg a cable modem manager 330 such as a cable modem termination system, and an address server of some sort which might be managed centrally for instance by a Cable Network Registrar (CNR) 340 as one of several network address servers across several networks. The CNR 340 may then have access over a core network to various address-related platforms, such as DHCP servers 130 and Domain Name Servers (DNS). The core network will also be connected to the Internet 170.

An environment of this type is described in "Integration Solutions Guide for Managed Broadband Access Using MPLS VPNs for MultiService Operators", published by Cisco on the Internet at:
http://www.cisco.com/univercd/cc/td/doc/cisintwk/intsolns/mplscabl.htm.

Since multiple ISPs will have access to the same networks, a way in which such an environment might be managed is that each ISP has its own set of IP addresses and effectively its own Virtual Private Network (VPN) which may in practice be supported by several separate broadband networks. Whenever a user's access device such as a cable modem 105 is assigned an IP address belonging to a particular ISP, that cable modem along with all of the devices 100 connected to its Ethernet port are placed into that ISP's VPN. Thus, the user's PC can acquire an IP address in the ISP's address range directly from the ISP's DHCP server via the CNR 340.

It is known in an environment of this general type, providing managed broadband access via logical separation, to use tunnelling for communication between an ISP's platform and the management platform supporting the CNR 340. The use of this tunnelling may be extended to allow a provisioning server 180 of the ISP to obtain user access device hardware addresses via the CNR 340 of that management platform. The steps of FIG. 2 can be repeated but the DHCP Lease Query message will be sent (Step 215) and acknowledged (Step 220) using a tunnelling protocol over a network such as the Internet itself, or another network such a management core network using the Internet Protocol.

Referring again to FIG. 3, once a service provider can obtain an access device hardware address for a user's service provision, there are several potential benefits which the service provider can exploit in relation to individual access devices. The service provider can provide various backend services via an application server 185 and can interface via middleware 315 to a workflow engine 310 and a subscriber management system 305. The following are examples of potential benefits:

end-to-end self provisioning for the user, including deprovisioning
using a single interface and PIN for provisioning
open access provisioning
resource management
fraud management As mentioned above, the auto-discovery by the service provider platform of the user's access-device hardware address on service provisioning removes the need for the consumer to enter the physical address of an access device manually. The use of the hardware address of the access device means that the consumer devices don't have to be provisioned individually which provides greater flexibility in handling lifetime scenarios. For example, a user can change, upgrade his/her PC without having to go through the whole provisioning process.

Further methods and apparatus herein described can also simplify de-provisioning. The consumer can self de-provision services by accessing the interactive Web interface of the relevant service providers, installed on an Internet host 175, and using substantially the same process as described above but now to de-provision the service. In this case, the Query Module 200 and Provisioning Module 205 of the ISP's provisioning server 180 will again query the relevant hardware address server, such as a DHCP server 130, but the provisioning module 205 will de-provision the service in place of provisioning it as before.

By providing a simple authentication routine in, or accessible by, the provisioning module 205, service provisioning and de-provisioning can be done through a single Web interface 175, using a PIN and thus providing again greater flexibility. The same interface and application can then be used not only to provision multiple different services, over multiple end user termination devices 100, but also for multiple subscribers and/or users.

By using a tunnelling protocol, an open access business model can be supported, which enables both a retail model (i.e. "plug and play" type provisioning of off-the-shelf access devices) and/or a wholesale business model (provision of services that are external to a management network which may again be external or independent of broadband networks used for the actual service provision). Since the service provider can auto-discover the access device identity, pre-provisioning is not required and any access device can be provisioned, whatever its origin. This tunnelling feature for provisioning means that service providers external to the broadband network itself can host their own service-provisioning in-house but through the operators network.

Through integration with a capacity management, or service assurance product, for instance accessible via the middleware 315 of the service provider's platform, the service provider can check that the relevant network resources are capable of handling the quality of service requested by the customer. To do this, the service provider needs to keep track of all the potential services to be delivered so as to aggregate at least loosely all impacted service levels and thus determine the potential risk and probability of resource congestion at peak time.

For example, if network equipment X serves 10,000 users with a back-plane capacity of 2 GB, then the service provider should only sell 80% of the equipment capabilities and only through a mix of various of qualities of service (QoS). A Gold service could be based on a capacity of 2 Mbps, a Silver service would be 1 Mbps, a Bronze service would be 512 Kbs and a standard service would be 256 Kbps. Then the service provider needs to aggregate the content of all the service agreements entered into so as not to exceed the utilisation threshold decided by the operator. This will generally need to be adjusted to reflect peak usage time and other relevant factors.

When a customer uses self-provisioning, this aggregation may remain important. Although the service provider may not control every new instance of service provision, it remains important (or indeed is more so) that the service provider maintains a database and software to monitor service provision. Means to maintain such a database and software are already known. However, another aspect which arises with self-provisioning is ongoing service monitoring.

New customers will generally have an expectation of an acceptable quality of service and will often have a form of service level agreement with a service provider. Existing customers will not expect the quality of service to become degraded because other customers have been newly provisioned.

By sharing data, for instance by sharing a data model and access to common data storage, a provisioning application working in conjunction with a service assurance application may offer a particularly efficient use of data for diagnostics. The invention independently provides a method comprising sharing a data model between a provisioning application and a service assurance application, preferably dynamically, and further independently provides use of a common data model in a plurality of communications applications including at least two of: provisioning, service assurance, planning, inventory management, and network management. Service assurance products may for instance receive alarm signals or data arising in use of a network to provide an identified service. Since a provisioning application may gather subscriber-related address data in relation to services provisioned, by sharing access to that data the service assurance product can be enabled to relate alarm data not just to services but also to relevant service subscribers.

Referring further to FIG. 3, the service provider's platform 190 may be provided with a database 345 accessible to several applications including backend services 185 and subscriber management 305 via the middleware 315. Except perhaps for services paid in advance, when a subscriber triggers provisioning of a new service for instance by means of a self-provisioning module 180, it is usually necessary that the subscriber provides identification, at least in the form of a billable account number, as well as identifying the service to be provided. If the provisioning module 180 writes this information to the database 345, it is relatively simple to give access to the same information for a service assurance application 350, particularly if they share the same data model. This represents a very convenient way to support analysis of service problems during use of a network in relation to individual customer accounts.

Tools for monitoring performance of networks and services in use are known, such as the Micromuse Netcool products.

An advantage of the service provider having knowledge of the access device address is that the service provider can determine the serviceability of the customer before trying to provide a service. This step can be used to ensure that the operator infrastructure can physically deliver services to the client since the service provider will be able to detect at least some shortcomings in the customer's arrangement. For instance, if a customer wishes to subscribe to a VoD over DSL service, the service provider is enabled to check whether the customer's access device is actually physically close enough to a DSL Access Multiplexer (DSLAM) and that there is therefore enough bandwidth. The MAC address contains information on hardware type and this information is also therefore available to the service provider for use in checking serviceability.

The use of a limited IP scope at initial activation time limits greatly fraud by preventing an un-authorised access modem to access services. However, through management of the IP address scheme and physical address of the access devices, whether based on the MAC address of a cable modem or management of the PVC in the case of a DSL modem, it is possible for the service provider to detect the origination of fraudulent activity and to take action to avert the fraud for instance by suspending or de-activating service provision to the offender, or by downgrading level of service.

The methods and apparatus herein described can be used in relation to many different services, access networks and CPE types. For instance, the following can be supported:

IP Data Access
Service on Demand (video or games, i.e., any pay-per-use services.)
TV broadcast
Voice over IP
Cable networks (DOCSIS and DAVIC)
XDSL
WLL
FTTH
Personal Computers
STBs
PDAs
mobile phones.

Each feature disclosed may be provided independently, unless otherwise stated. In summary, the provisioning of communications services may be facilitated by a self-provisioning application which, in preferred applications, can operate with off the shelf access devices, such as cable modems is disclosed; this makes use of an existing IP address to discover a unique "physical" address (e.g. MAC address for a cable modem or PVC ID for a DSL modem) thereby avoiding the need for a user or specialised user software to communicate the physical address of the access device prior to provisioning. A low level command, particularly DHCP lease query, is preferably used to obtain a hardware address for use in provisioning of a new broadband service based on a user=s existing IP address. Provisioning may be based on the access device physical address. The provisioning application may communicate with a capacity management application. It may also, or instead, share a data model and data storage with a service assurance application to enable data captured during service provision to be used in alarm analysis after a service has been provisioned and is in use.

Application to VPN MPLS

The systems and methods of the provisioning system and methods described herein will now be illustrated further by the following description of an IIP specific Virtual Private Network (VPN) Multiprotocol Label Switching (MPLS) provisioning system. This system is described by way of example only and the description is not intended to be limiting in any way.

The initial set-up of the VPN MPLS network will firstly be described with reference to FIG. 5.

The test set up described below uses a plurality of simulated customers at geographically distinct sites and demonstrates many of the advantageous features which may be achievable in a typical implementation.

Figure 5:
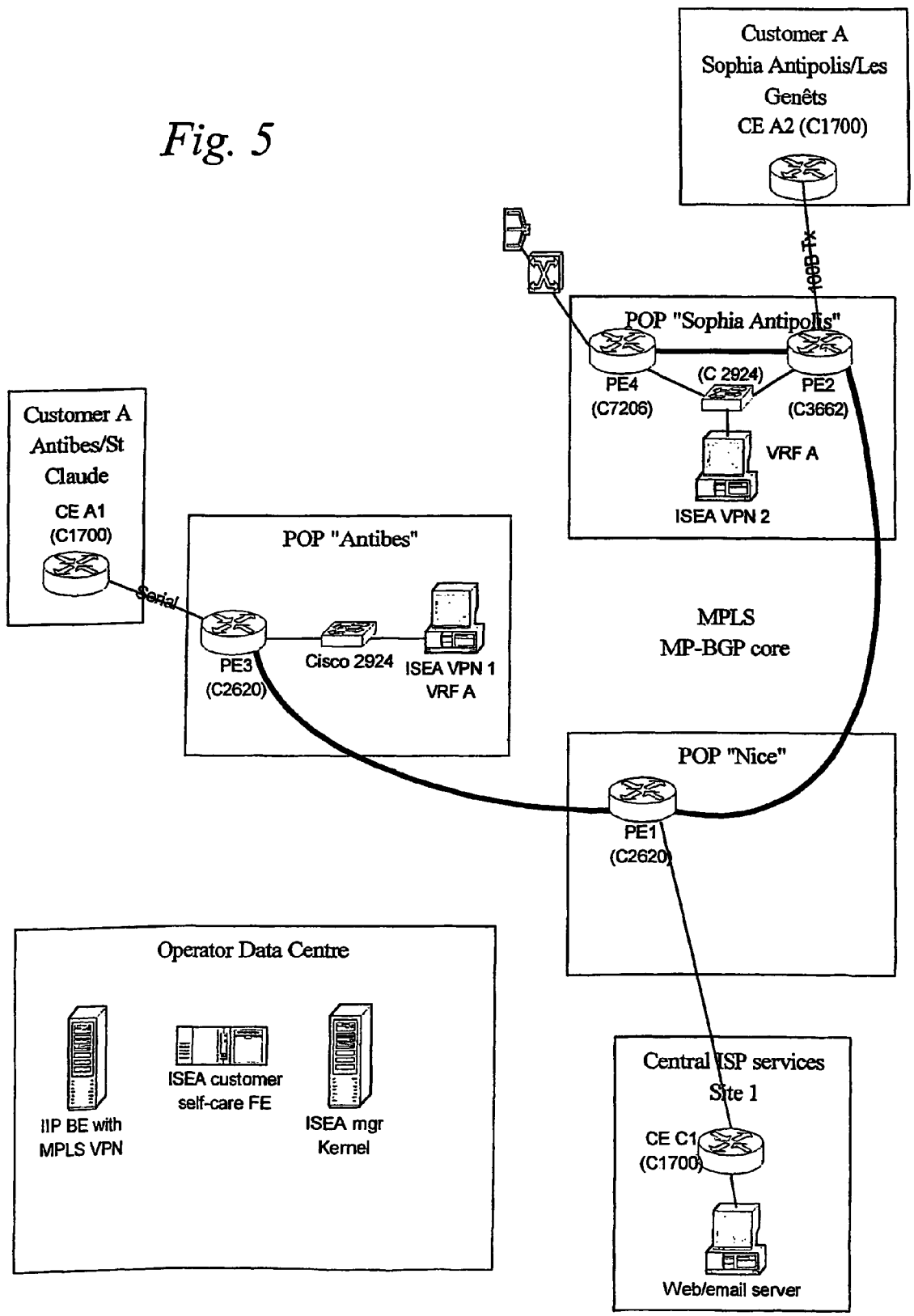
FIG. 5 is a schematic diagram of an initial set-up of a network environment for provisioning apparatus in accordance with a further example of the system and methods herein described.

In the initial scenario for this example system, illustrated in FIG. 5, the core MPLS network has been set-up with 3 Points of Presence (POPs):

Antibes POP has one Provider Edge (PE) router with an ISEA VPN.
- PE3 has a VRF (a VPN Routing and Forwarding device) for Customer A's Antibes/St Claude site connected via serial interface to a C1700 Customer Edge (CE) router.

Sophia Antipolis POP has 2 PE routers. ISEA is connected to both PE routers.
- PE2 has a VRF for Customer A's Sophia Antipolis/Les Genets site connected via Fast Ethernet to a C1700 CE router
- PE4 is connected to an ATM switch and to a DSLAM (Digital Subscriber Line Access Multiplexer). There are no VPN customers yet.

Nice POP has one PE router with no ISEA MPLS.
- PE1 has a VRF for Central ISP services site connected via Fast Ethernet to a C1700 CE router. A web/email server is located behind the CE router.

Customer A has already been provisioned using IIP VPN. Customer A has 2 sites
- A primary CE A1 site located in Antibes/St Claude connected to Antibes POP.
- A secondary CE A2 site located in Sophia Antipolis/Les Genets connected to Sophia Antipolis POP.

Figure 6:
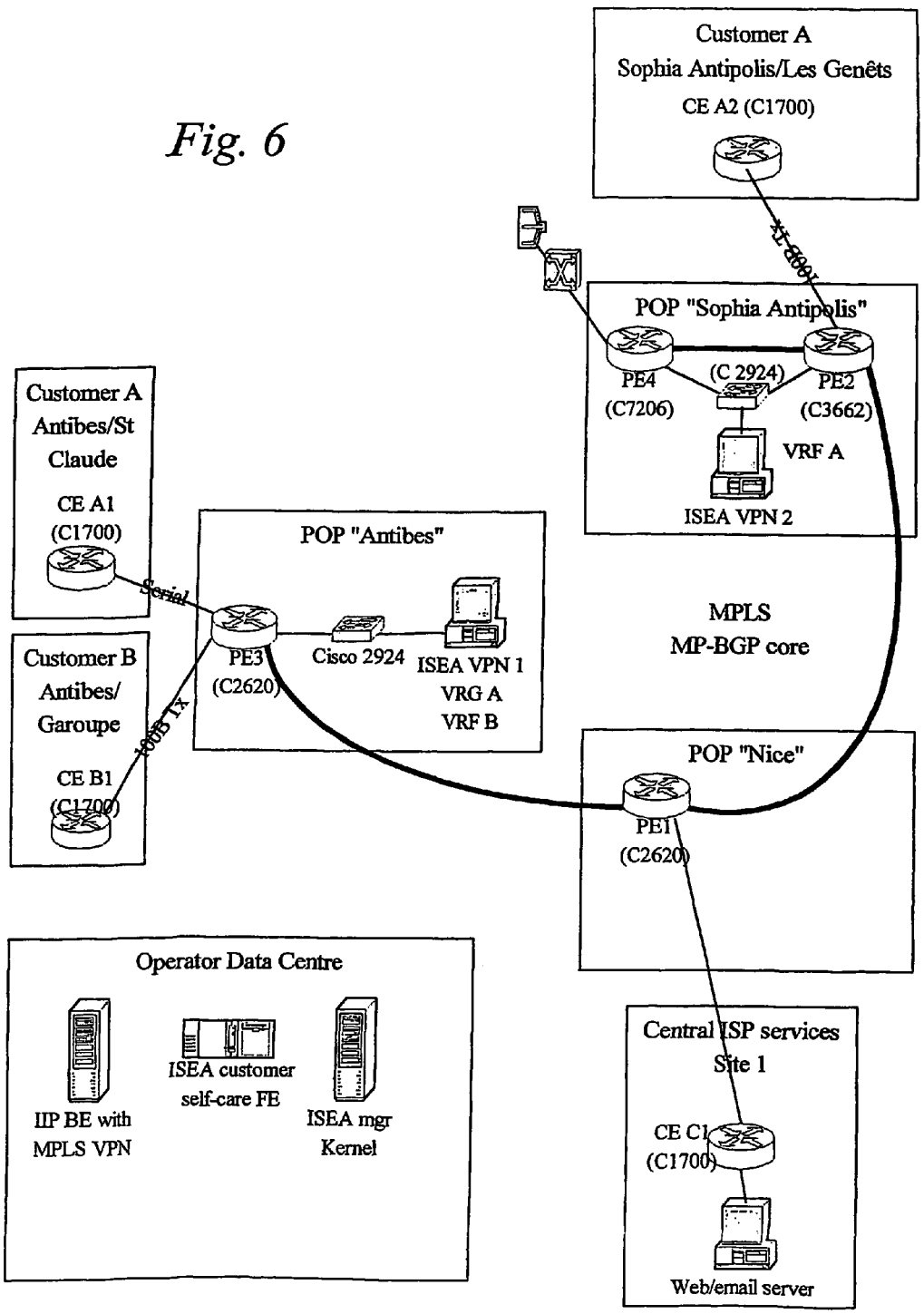
FIG. 6 is a schematic diagram of a network environment for provisioning apparatus in accordance with the example illustrated in FIG. 5 after a new customer edge router has been added to the network according to an example process.

An example of the process of connecting a new CE router to the network in a new VPN with access to the centralised services web server and management VPN will now be described with reference to FIG. 6, which summarises an example network topology. In this example, all actions must be carried out through the MPLS console/Graphical User Interface (GUI).

1. A new customer called "Customer B" is created using the console.
2. A new VPN is created for "Customer B" using the console
3. A new primary CE site called "Antibes Garoupe" is added for Customer B with ISEA monitoring (Ethernet 802.1Q sub-interface).
4. An interface is provisioned on the PE router for the PE-CE link
5. A minimal "IP only" configuration file is created for the CE router.
6. The configuration file is manually loaded onto the CE router and it is plugged in.
7. When IP connectivity is established to the CE the VPN/routing/CoS config file is downloaded to the router. This demonstrates the advantageous feature of the provisioning system in preparing configuration files.
8. Customer connects a PC behind CE router and accesses centralised services.

Figure 7:
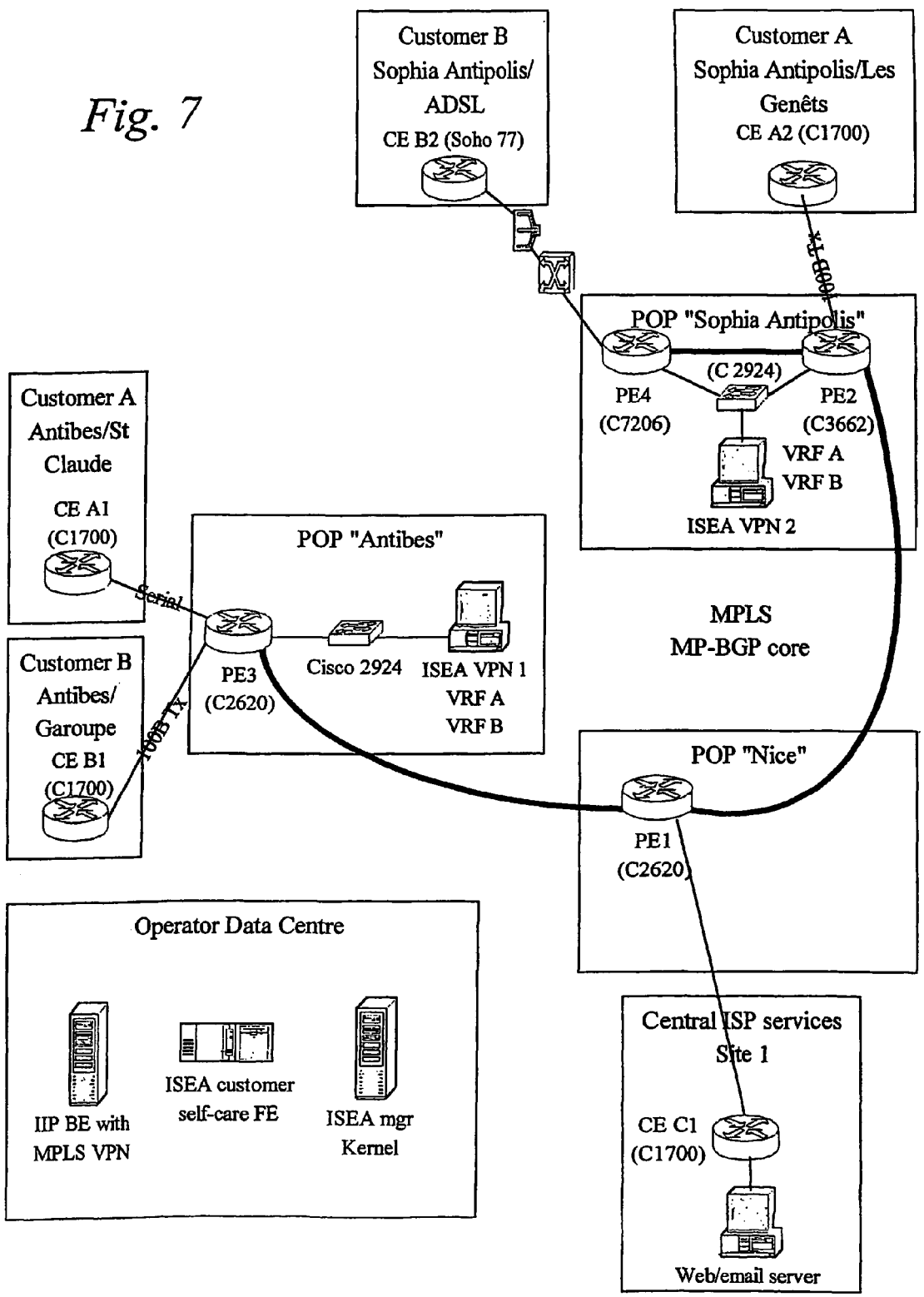
FIG. 7 is a schematic diagram of a network environment for provisioning apparatus in accordance with the example illustrated in FIG. 5 or 6 after a new customer edge router has been added to the network according to a further example process.

By way of example, FIG. 7 summarises the VPN topology and illustrates the process of connecting a new CE router will to the network in a new VPN with access to the centralised services web server and management VPN. In this example, all actions can be carried out through the MPLS console/GUI.

1. A new secondary site called "Sophia Antipolis ADSL" is added for Customer B (where ADSL indicates an Asynchronous Digital Subscriber Line).
2. An interface (ATM sub interface) in a VRF is provisioned on the PE router for the PE-CE link with ISEA monitoring (Ethernet 802.1Q sub-interface).
3. The full CB router configuration is provided to the customer via a File Transfer Protocol (FTP) download.
4. The configuration file is manually loaded to the CE ADSL router and it is rebooted.
5. Customer connects a PC behind ADSL CE router and accesses centralised services.

Figure 8:
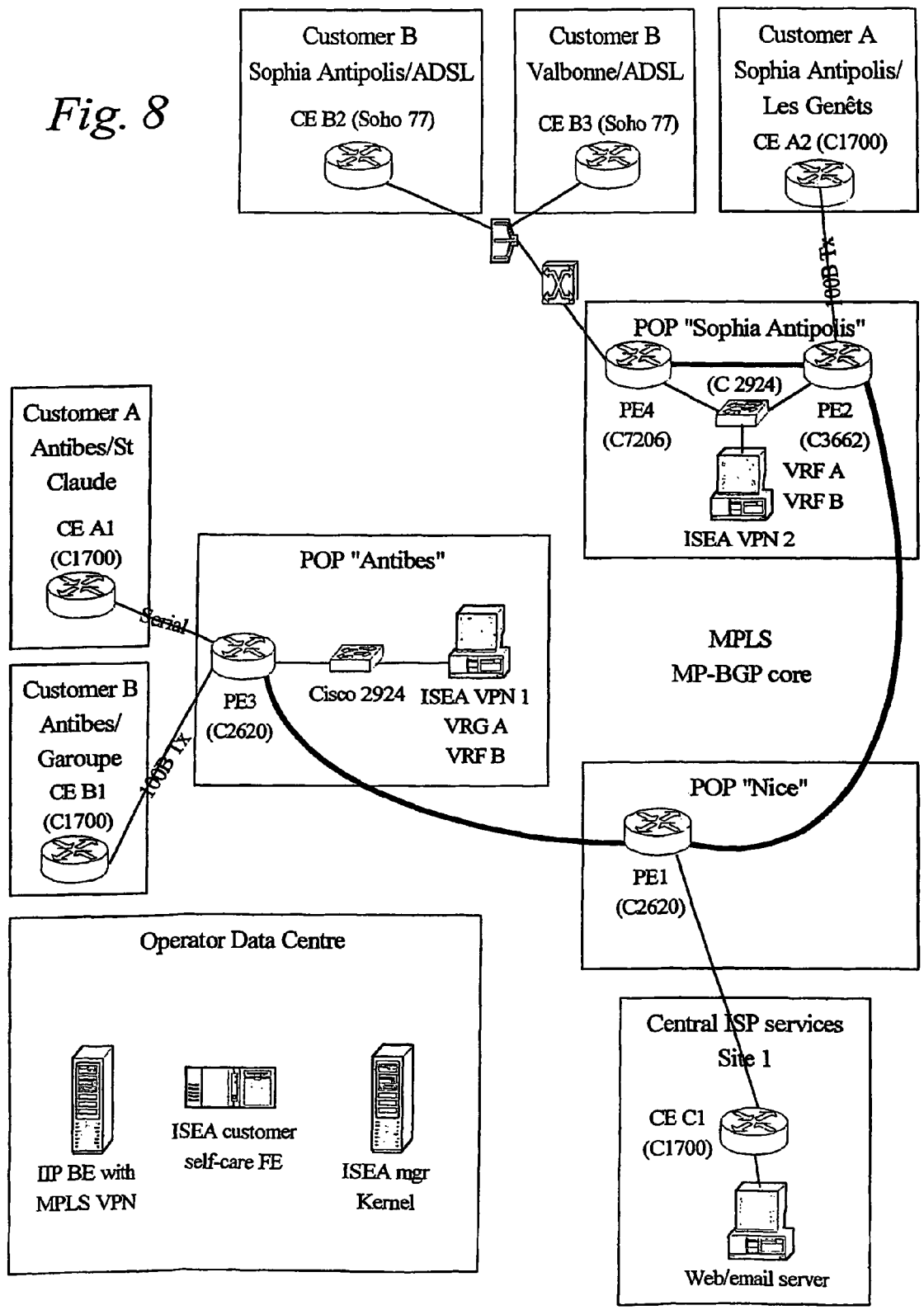
FIG. 8 is a schematic diagram of a network environment for provisioning apparatus in accordance with the example illustrated in FIG. 5, 6 or 7 after a new customer edge router has been added to the network according to a further example process.

The phase PE-CE link parameters for the CE router added in above may be modified according to the following example procedure:

1. In the MPLS console/GUI browse to the PE-CE link edition screen.
2. Edit the Class of Service (CoS) of the Ethernet PE-CE link by choosing a Diffserv class and sub class and applying this to the Ethernet interface
3. Deploy the configuration to the PE4 and CE B2 routers FIG. 8 illustrates an example of a VPN physical topology in which a new CE router may be connected to the network in a new VPN with access to the centralised services web server. In this example, all actions must be carried out through a batch file using the VEA.

1. A new secondary site called "Valbonne ADSL" is added for Customer B.
2. An interface (ATM sub interface) in a VRF is provisioned on the PE router for the PE-CE link with ISEA monitoring (Ethernet 802.1Q sub-interface).
3. The full CE router configuration is provided to the customer via FTP download.
4. The configuration file is manually loaded to the CE ADSL router and it is rebooted.
5. Customer connects a PC behind ADSL CE router and accesses centralised services.

Figure 9:
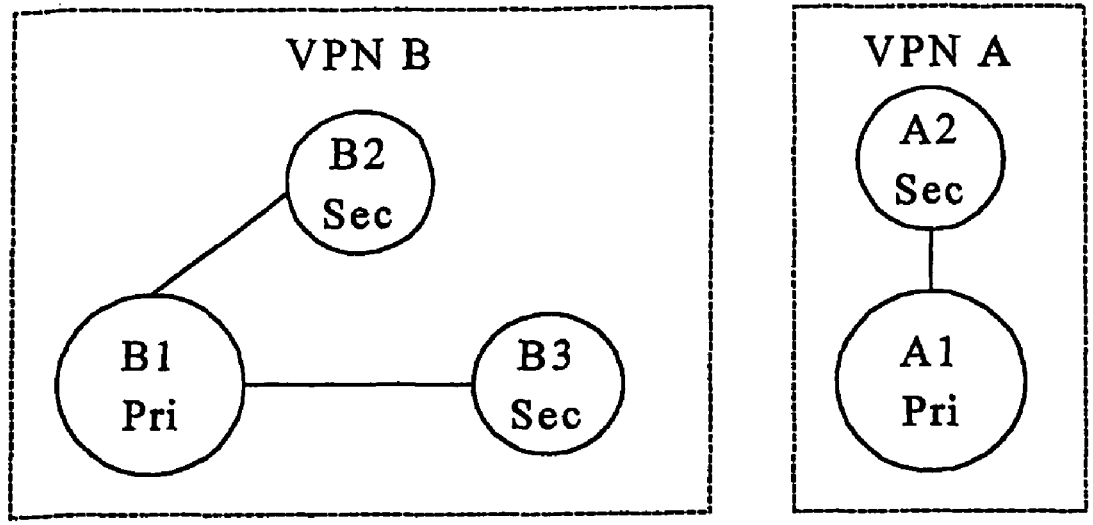
FIG. 9 is a schematic diagram of an initial topology of the network environment for provisioning apparatus, before modification has taken place, according to an example of the system and methods herein described.

VPN topology may also be modified. An example of a process in which VPN B's topology is modified will be described below. FIG. 9 summarises the VPN logical topology of the present example before the modification.

By way of example, Customer B has expressed a requirement that site B3 (currently secondary) is now becoming one of his major offices/data centres and it must be able to communicate with all primary and secondary sites in the network. In order to modify the topology accordingly, the following process may be implemented:

1. In VPN console/GUI go to the properties of site B3.
2. Change the status of site B3 from secondary to primary.
3. The topology change is applied to the network elements.
4. With a PC connected behind B3 show that all sites (B1, B2) can be pinged.

Figure 10:
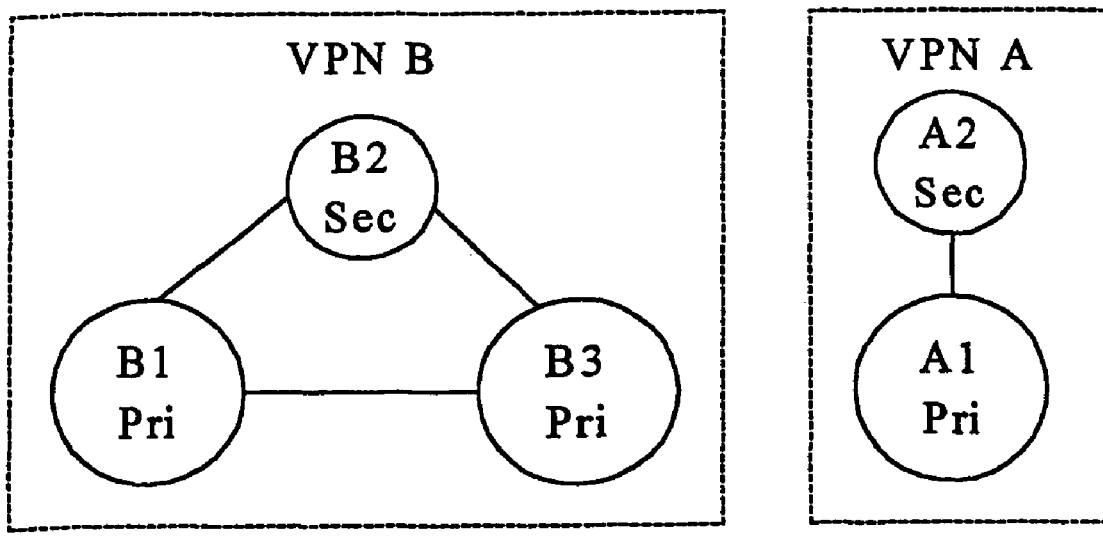
FIG. 10 is a schematic diagram of a final topology of the network environment for provisioning apparatus, after modification has taken place, according to an example of the system and methods herein described.

FIG. 10 summarises the VPN logical topology after the modification.

A further feature of one embodiment of the present system may be the Digital Subscriber Line modem manager. The DSL modem manger may allow an operator to view the status of each VPN subscriber's DSL line and modem. For example, when an ADSL CE router is provisioned in the database, a DSLAM port must be assigned for the customer and using DSL modem manager it may then be possible to gather information. Examples of the information which may be gathered may include one or more of: the customer name, the port on the DSLAM, the port status, the modem SNR US/DS, a 5 minutes average input/output rate and bytes input and output. The invention independently provides a method comprising gathering status data from a DSL modem connected to a broadband comprising communicating with the modem or an agent associated with the modem over the network.

A further feature of the system described above may be the VPN MPLS network manager. Using the network view of MPLS network manager, it may be possible to browse, for example: PAD (PACA), POP (Antibes), PE router (PE4).

The network view of the network manager may also be used to show the VPN logical view functionality that displays, for example, VPNs from the OSS database and VRFs that are auto-discovered from the PE.

The network view of the network manager may also be used to show, for example the PE router's:

CPU (MRTG)

Memory (MRTG)

Interface bandwidth utilization per physical interface. Show the button that can be used to define target max aggregate bandwidth for the physical interface Number of sub-interfaces per physical interface. Show the button that can be used to define target max number of sub-interfaces per interface Total number of VRFs (target max VRFs can be edited by clicking on a button)

CEF statistics (show ip cef summary)

The customer view of MPLS network manager may be used to browse, for example: Customers (B), VPNs (VPN B), PE routers and CE routers.

When on the PE router level one can view the same data in the customer view as in the network view, an example of which is provided above.

All of the above features are advantageously provided in an exemplary network manager; however, features may be omitted in a simplified embodiment.

A further feature of the present embodiment may be the ISM VPN, which may advantageously be implemented using one or a number of agents. Each agent may monitor the network for, for example: VPN connectivity, VPN Performance, Centralized services, Mangement VPN and Audit & accounting.

In a preferred arrangement, which may be independently provided, at least one agent is provided, the agent comprising means for accessing a service and means for signaling an alarm in the event of detection of a fault condition. By providing an agent which accesses a service, potential or actual faults may be more reliably or rapidly identified as compared to detection of a hardware failure and subsequent determination of affected services.

For each alarm that may be generated by ISEA VPN, each ISEA may be able to detect connectivity, performance, management, audit and centralised service problems independently. Five different scenarios that simulate each type of problem will now be described by way of example.

VPN Connectivity Alarm

A VPN connectivity alarm may be generated by making a CE router unavailable. This may occur if, for example, the CE router's Ethernet connector is physically unplugged. In this situation, ISM may be configured to generate a VPN connectivity alarm.

Performance Monitoring

A performance alarm may be triggered, for example, when the data is beyond "acceptable" levels, for example, the system may be set up to trigger a performance alarm when data is being processed at a slower rate than it is being received. Rate limiting may be disabled from the VPN to make performance acceptable. Preferably, the disabling of rate limiting may allow the alarm state to be overcome within 1 minute.

VPN Central Services Monitoring

A central services alarm may be generated in the ISM in certain situations, for example, if the ISEA is continuously monitoring central services (email and www) offered from the operator's central services site and the central services www server is shut down, a central services alarm may be generated. Preferably, when the www server is resumed ISM central services monitoring should return to green status in less than 1 minute.

Management Network Monitoring

The ISEA may include management VPN monitoring that can check on the status of the management VPN by continuously pinging the management network central router. A management services alarm may be triggered if, for example, the IP address of the management router is de-configured. If the management services router is subsequently reconfigured, ISM central services monitoring preferably returns to green status in less than 1 minute.

Audit & Accounting

Using ISEA MPLS, examples of statistics that may be gathered for each VPN include:

Total uploads/downloads for each CE router using Netflow

Analysis of traffic patterns using netflow.

A further feature of an embodiment may be the Imagine Component Fault Manager (ICFM). An ICFM view may show an inventory with a map of the network of the system. The ICFM may be implemented as a client of the inventory manager that is described in more detail later.

A Knowledge Management System (KMS) may be implemented as part of the ICFM, it may be possible to right click on "documentation" for a given PE router to show the documentation associated with the device. Further, a component alarm may be generated by shutting down the PE-PE core link on PE3. This alarm, and the documentation associated with the alarm may be shown within the ICFM. The documentation linked to the alarm may also be modified within the ICFM.

A link to a configuration manager may also be provided for each PE router, for example it may be possible, for a given PE router, to click on "Configuration manager" to be taken to the "Configuration Manager" application and to view the configuration file of the PE router. A link to an inventory manager in the ICFM, outlined in more detail below, may also be provided and may be used to be taken to the inventory manager application An inventory manager may further be provided in which it may be possible, for example, to add a new PE router (for example, PE 5 of type Cisco 3662) to the Sophia Antipolis POP. Equipment can be auto-discovered by, for example, running an auto-discovery script. A file may be generated to populate the database.

As part of the resource management of the inventory manager, it may be possible to define a pool of IP addresses by adding a new pool of IP addresses. Utilization statistics on the pools of IP addresses and the pools of RTs, RDs, VLANs, ASN numbers may be viewed.

A further feature of one embodiment of the present invention may be a Configuration Manager, which may allow the use of template configuration files. New template files may be added to the template manager. Further, the configuration file may allow the display of configuration files of routers in the system and may allow the version history of configurations on routers to be displayed.

The provisioning system described above and the communications network management system, which will be described in more detail below may be implemented in conjunction with a Set-Top Box Manager, an embodiment of which is now described.

The set-top box manager (STB-MGR) is a tool which may allow customer service operators and network operators to interact directly with customer DOCSIS-compliant cable modems to reduce the lead-time for problem resolution.

The set-top box manager tool (STB-MGR) may be provided as part of the system described herein, or it may be provided independently. By way of example, one embodiment of the STB-MGR will now be described in more detail. The features of the system described herein may be provided in combinations other than those outlined here and may be provided independently unless otherwise stated. The following description is not intended to be limiting in any way. Potential users of the system may be described as customers in the following description.

As stated above, the Set-Top Box Manager (STB-MGR) tool may be used to provide the customer service operator with a means of interacting directly with a customer Set-Top Box to reduce lead-time for problem resolution.

Figure 11:
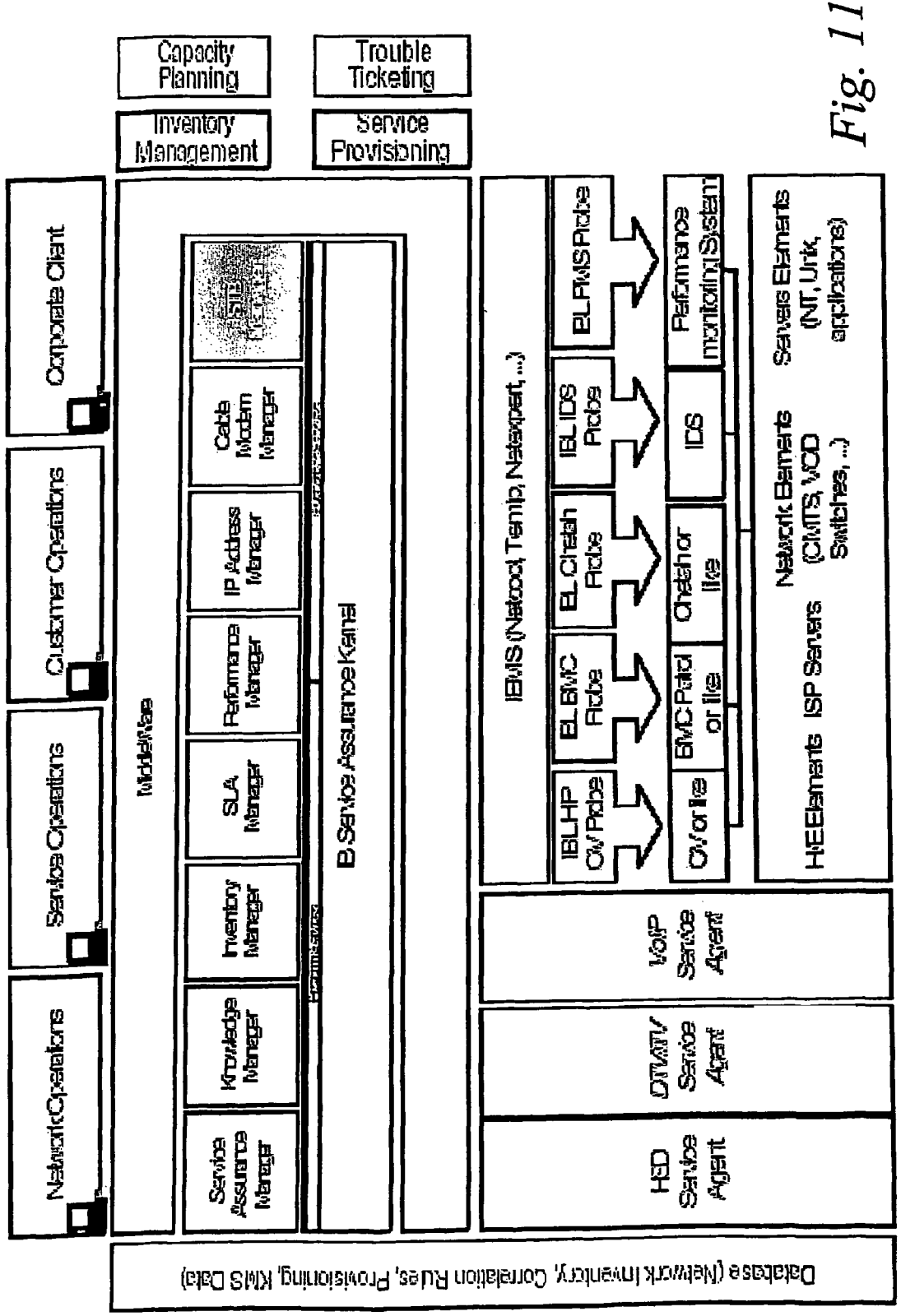
FIG. 11 is a schematic diagram of how the Set-Top Box Manager application may be incorporated into a network environment for provisioning apparatus according to one embodiment of the systems and methods herein described.

FIG. 11 provides an outline of how one embodiment of the STB-MGR may be incorporated into a network environment for provisioning apparatus. Details of embodiments of some of the other products within the system may be incorporated within the present application.

According to one embodiment, the Set-Top Box Manager application may perform some or all of the functions outlined below. The following functionality may be provided independently, or may be provided by further elements other than the STB-MGR within the system. By way of example, the STB-MGR may have the functionality to do at least one of:

Display a list of customers based on the identity of their Set-Top Box. For example, PID, MAC address or IP address. More details of this functionality are provided below.

Manage Installation parameters. This button may be configured to run the query with the content of the selection fields and is also described in more detail below.

The window displayed by the STB-MGR may be configured to depend on the number of subscribers retrieved, for example:

If many subscribers are retrieved, the matched subscribers list may be displayed.

If only one subscriber is retrieved, the 'Install' Results List Panel for this subscriber may be displayed. By way of example, the 'Install' Results List Panel may provide information such as the About Installation parameters, hardware and code release version, MPEG and PCM attenuation level and the MAC Address. It may be possible to update some Installation parameters within the 'Install' Results List Panel, for example: the Network ID, QAM rs: Default frequency and symbol rate.

Detailed information from the Set-Top Box may also be displayed for a selected subscriber. This information may include, for example, the About Forward Path, the About Return Path or a list of events/status with time stamps.

A user interface may also be provided. The user interface may be divided into three type of windows: a selection panel to edit, for example, the subscriber name, PID, IP or MAC address, a results list window to show the subscriber details that match the selection and a details window to show all the Set-Top Box information.

Use of one embodiment of the STB-MGR will now be described in more detail. A number of user issues will be described to illustrate use of the STB-MGR, but these issues are not limited and are provided by way of example only.

According to the first example scenario, the subscriber makes a complaint that he can not gain access to a regional channel. By way of example, this complaint may be dealt with in a number of steps, as outlined below.

Step 1: Display Subscriber's Set-Top Box Installation Parameters

Ask the caller for their name or PID and input this information into the relevant fields.

Figure 12:
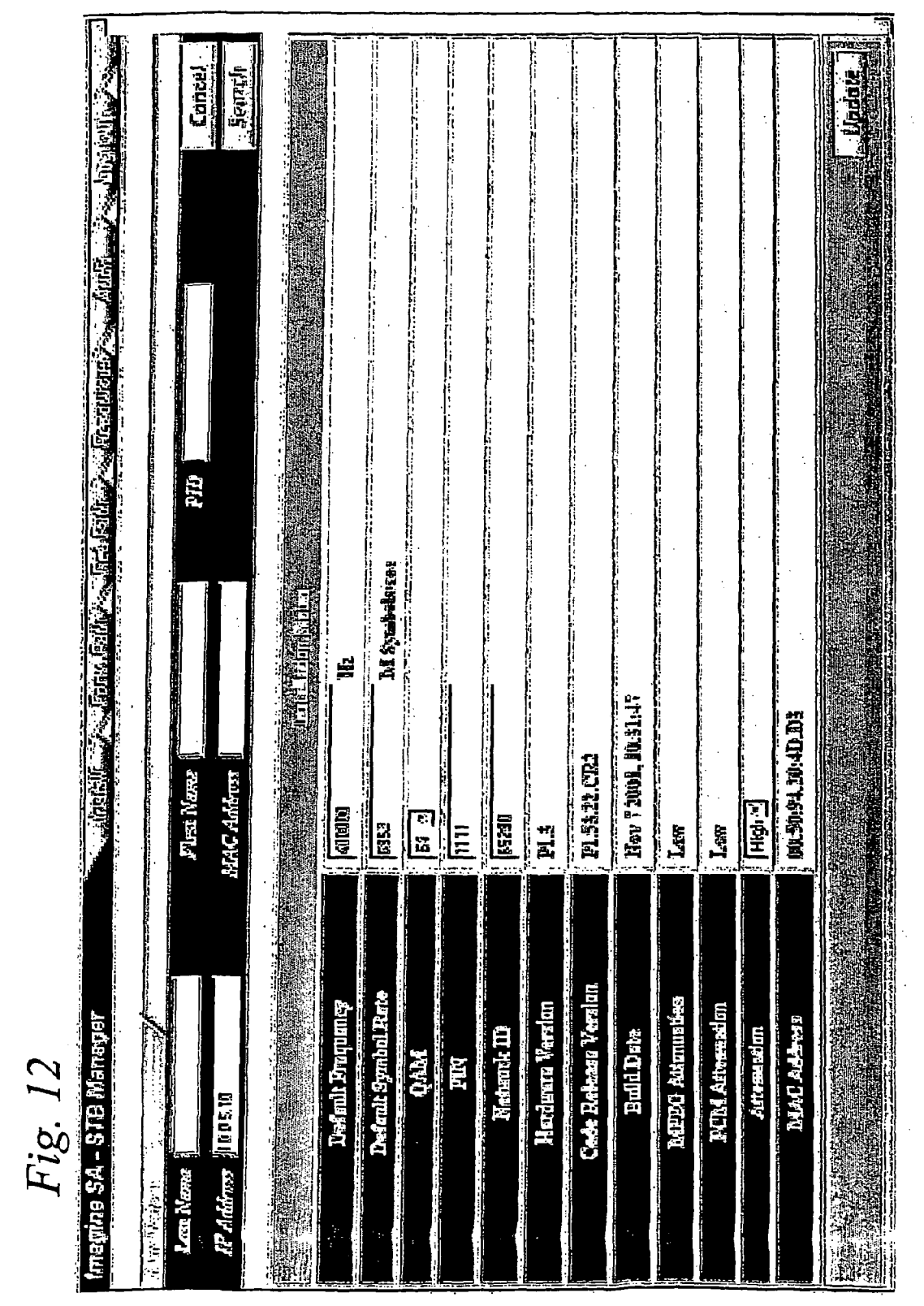

Click on the Search button to view the Set-Top Box-Manager screen display. An example of a typical screen display is illustrated in FIG. 12.

In this example, the correct Set-Top Box is identified and the detailed Set-Top Box information is automatically displayed.

Step 2: Analyze the Data

In this example, the value of 'Network ID' does not match the region of the subscriber (this may occur due to a moving for instance). In this example, the problem may be cured by updating the Set-Top Box installation to reload the right Set-Top Box configuration file.

Step 3: Update Set-Top Box configuration

In this embodiment, the Set-Top Box configuration file may be updated by editing the right Network ID and clicking on the Update button to display the Set-Top Box-Manager tool screen In a second scenario, the subscriber makes a complaint that he can't access a pay-per-view service. By way of example, this problem may be solved using the following numbered steps:

Step 1: Check Installation Parameter

In this example, this may be done in the same way as in Step 1 of the previous scenario, but, in this case, the initialization parameters are correct.

Step 2: Display Subscriber's Set-Top Box Forward Parameters

Ask the caller for their name or PID and input this information into the relevant fields.

Click on the 'Search' button to view the Set-Top Box-Manager screen display, as illustrated in FIG. 12.

Figure 13:
FIG. 13 is a schematic diagram of an example of a further Set-Top Box Manager screen display according to one embodiment of the systems and methods herein described.

Click on 'Forward Path' menu to view the Set-Top Box-Manager screen display shown in FIG. 13.

Step 3: Analyze the Data

In this example, the value of 'Credit'.shows that the subscriber does not need to carry a sum to his credit. The status of the smardcard shows that the Credit Card is maybe out of order.

In a third scenario, the subscriber makes a complaint that his Set-Top Box often reboots. This problem may be solved, by way of example, according to the following numbered steps.

Step 1: Check Installation Parameters

In this example, this may be done in the same way as in Step 1 of the previous scenario, but, in this case, the initialization parameters are correct.

Step 2: Display Audit Information

Figure 14:
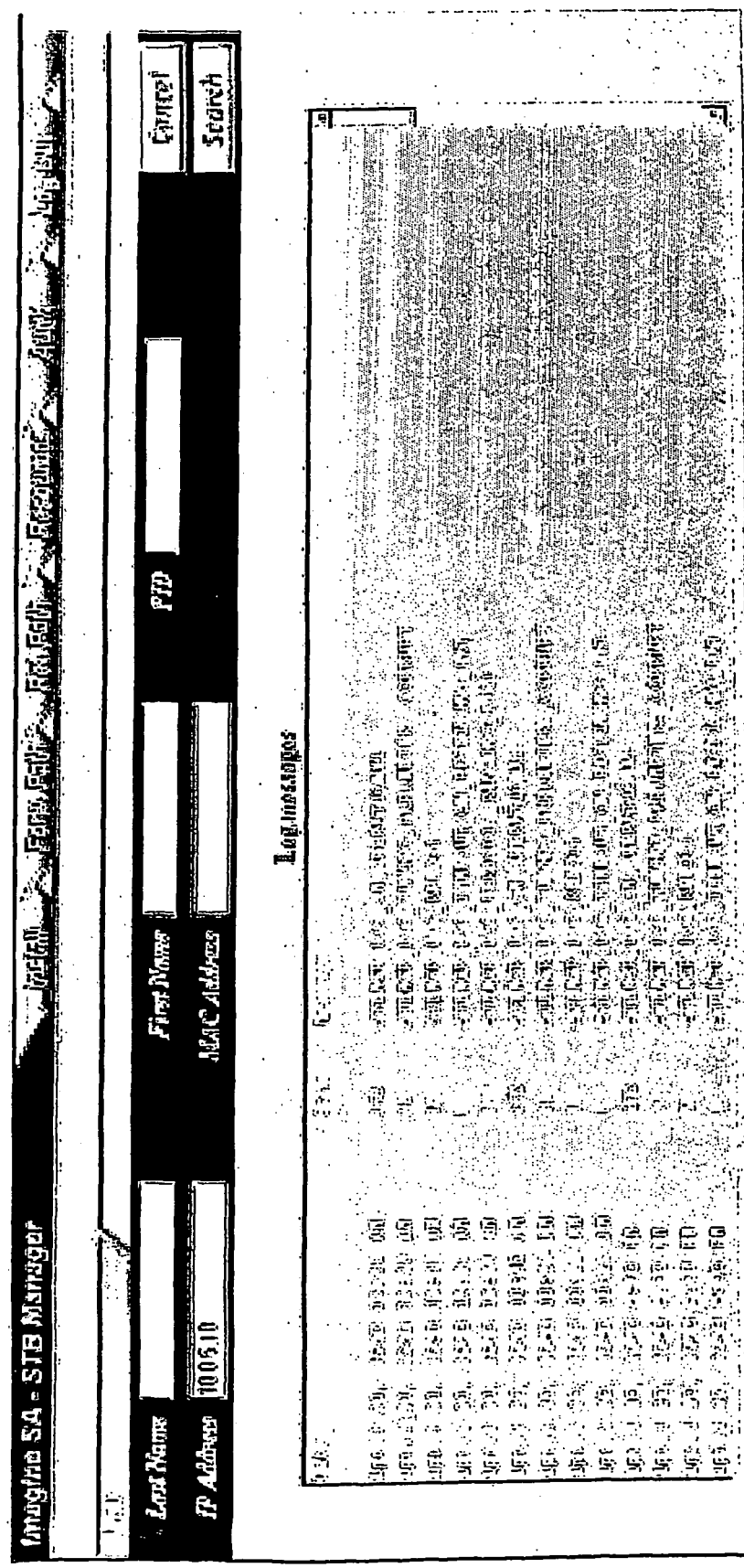
FIG. 14 is a schematic diagram of an example of a further Set-Top Box Manager screen display, which may be used to show 'Audit' information, according to one embodiment of the systems and methods herein described.

Click on the Audit menu to view the Set-Top Box-Manager screen display shown in FIG. 14. The event log is displayed.

Step 3: Analyze the Data

This may allow the operator to see if the number of reboots announced by the subscriber is correct and abnormal.

Further details of a preferred embodiment of the STB-MGR are outlined below. Features may be provided independently or in alternative combinations. Features of the following components of the STB-MGR are outlined: the Connection Window, the Main Window and the Top-bar. Features described herein may be applied to other components of the STB-MGR.

Figure 15:
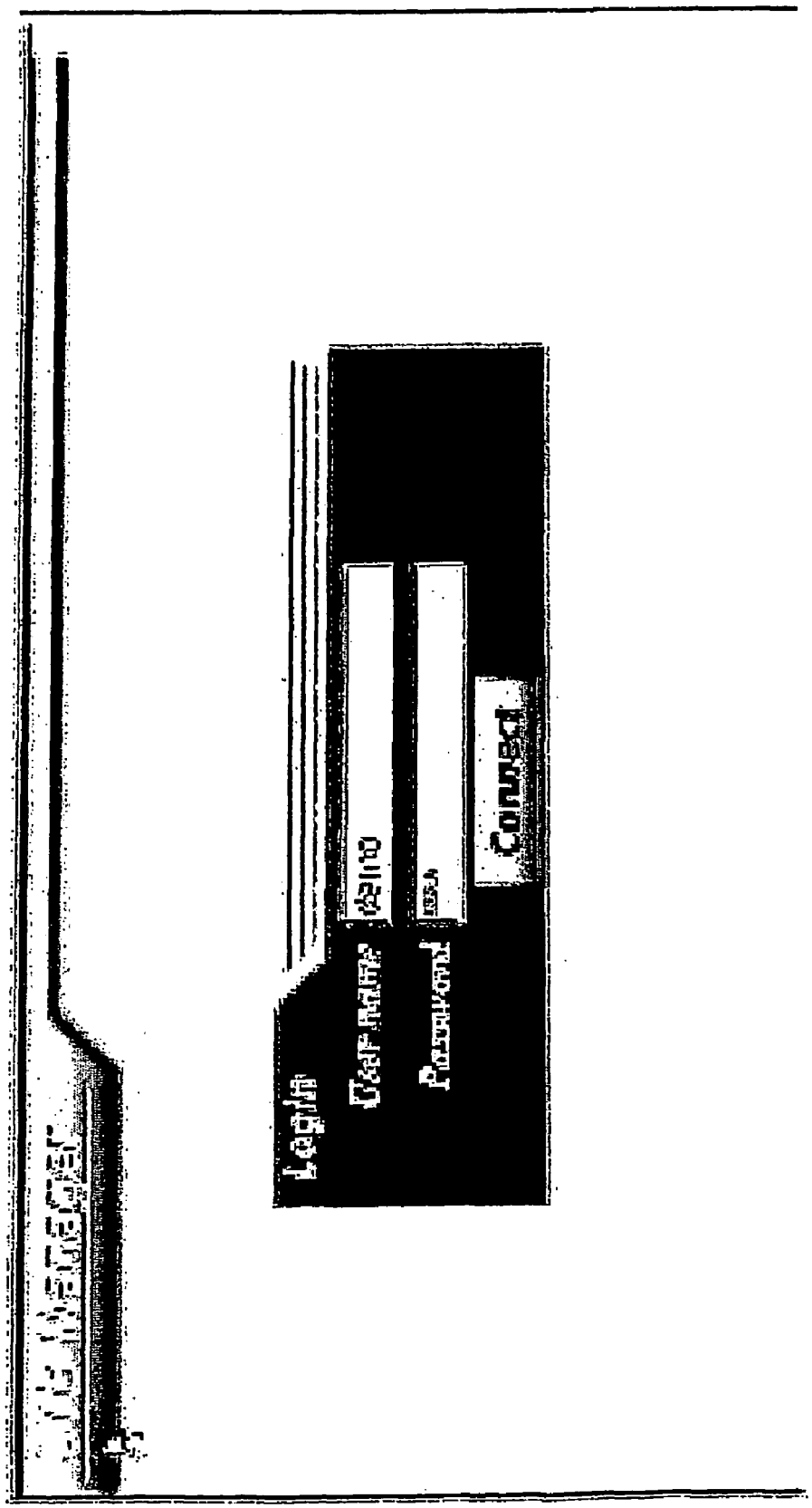
FIG. 15 is a schematic diagram of a 'Connection Window' screen display according to one embodiment of the systems and methods herein described.

FIG. 15 illustrates a screen shot of an embodiment of the Connection Window. The Set-Top Box-Manager tool may be accessed by entering the correct URL in the browser bar. According to a further, optional feature, the Set-Top Box- Manager can be accessed directly either from the Customer Operations Dashboard application, for example, by clicking on 'STB-MGR' in the top bar or from the Network Operations Dashboard application, from either the Alarm Explorer or the Location Explorer.

A login window may be provided for the Communications Window, at which a valid username and password are required. Text entered in the Password field may be obscured with asterisk (*) characters. If connection fails due to an incorrect username or password, a connection error dialog box may be displayed.

According to one embodiment, the Main Window may be used to retrieve details from the Set-Top Box Manager (STB-MGR) based on either subscriber information, IP Address or MAC Address or to check the status of the subscriber's Set-Top Box.

Preferably, a Select Panel may be provided and may be used to search within any combination of the following selection fields:
  Last name
  First Name
  PID
  IP address
  MAC Address Preferably, at least one field must be completed to run the query and avoid an error message. A cancel button may be provided to clear the content in the selection fields. A Search Button may be used to run the query with the content of the selection fields.

The window displayed may depend on the number of subscribers retrieved:
  If many subscribers are retrieved, the matched subscribers list may be displayed.
  If only one subscriber is retrieved, the 'Install' Results List Panel for this subscriber may be displayed.

Figure 16:
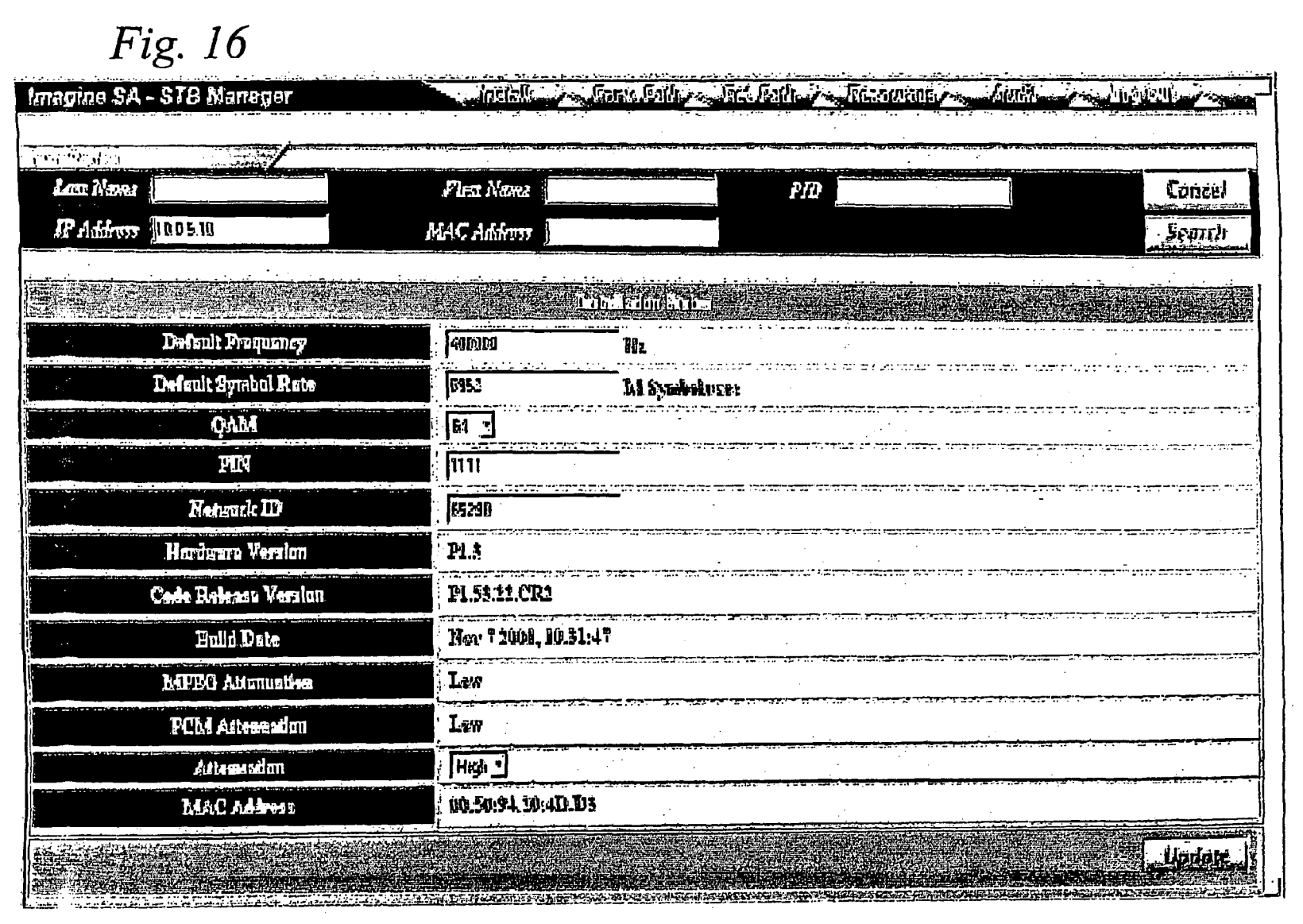

In this embodiment, the 'Install' Results List Panel displays the results of the query matching the selection. A screen shot of this panel is shown in FIG. 16.

In this screen shot, the 'Installation' parameters that are displayed include:
  Default frequency: Frequency in Hz of the Home Transport Stream
  Default symbol rate: Rate at which the data leaves the modulator.

symbol rate=input rate rate (Mbps)*framing overhead*1/RS-rate*1/FECrate modulation factor QAM: Type of Quadrature Amplitude Modulation (QAM64 or QAM256)
  PIN: Subscriber's Personal Identification Number
  Network ID: Identifies the network segment (in DVB terms) to which the STB is attached. If a subscriber moves from one region to another, he typically needs another STB ID
  Hardware version: Version of the hardware platform
  Code release version: Release number of the software platform
  Build date: Download date of the software platform
  MPEG attenuation level
  PCM attenuation level: Pulse Code Modulation attenuation level
  Attenuation
  MAC address: MAC address of the integrated cable modem
Update Button In a preferred embodiment, the user can use an 'Update' button to modify only information displayed in FIG. 16 with a white background, by edition or pre-defined value selection. The parameters which it is possible to modify may include some of all of the following:
  Default frequency
  Default symbol rate
  QAM
  PIN
  Network ID The Update button preferably displays a confirmation box.

A further feature may be the 'Forward Path' Results List Panel, an example of a screen display of which is shown in FIG. 17, which may display parameters such as those outlined below:
  SNR estimate: Signal/Noise estimate. Should be high if there is little noise
  Pre RS Error rate: Number of errors per 500 ms before Reed-Solomon error correction
  Post RS Error rate: Number of errors per 500 ms after Reed-Solomon error correction
  Lock status: Indicates whether the STB is successfully tuned to a transport stream (i.e. locked to a RF carrier).
  Last PAT: Last time/date when a Program Association Table was received
  Last CAT: Last time/date when a Conditional Access Table was received
  Channel table: Status of the channel table capture process, for example: "Looking for UPDATES" means that the STB is receiving DVB SI tables under normal conditions. If the status remains "Looking for NIT", it means the STB can not receive the Network Information Table
  Number of transport streams: Number of Transport Streams available received by the STB (i.e. Transport Streams available to the configured Network ID)
  Number of services: Number of video services (digital channels) available received by the STB (i.e. DVB services available to the configured Network ID).
  AGC combined: Combined Audio/Video gain currently applied to the forward Path signal. AGC stands for Automatic Gain Control.
  Current TSID: Transport Stream ID to which the STB is currently tuned.
  Current Service ID: Service ID (i.e. digital channel) to which the STB is currently tuned.

Figure 18:
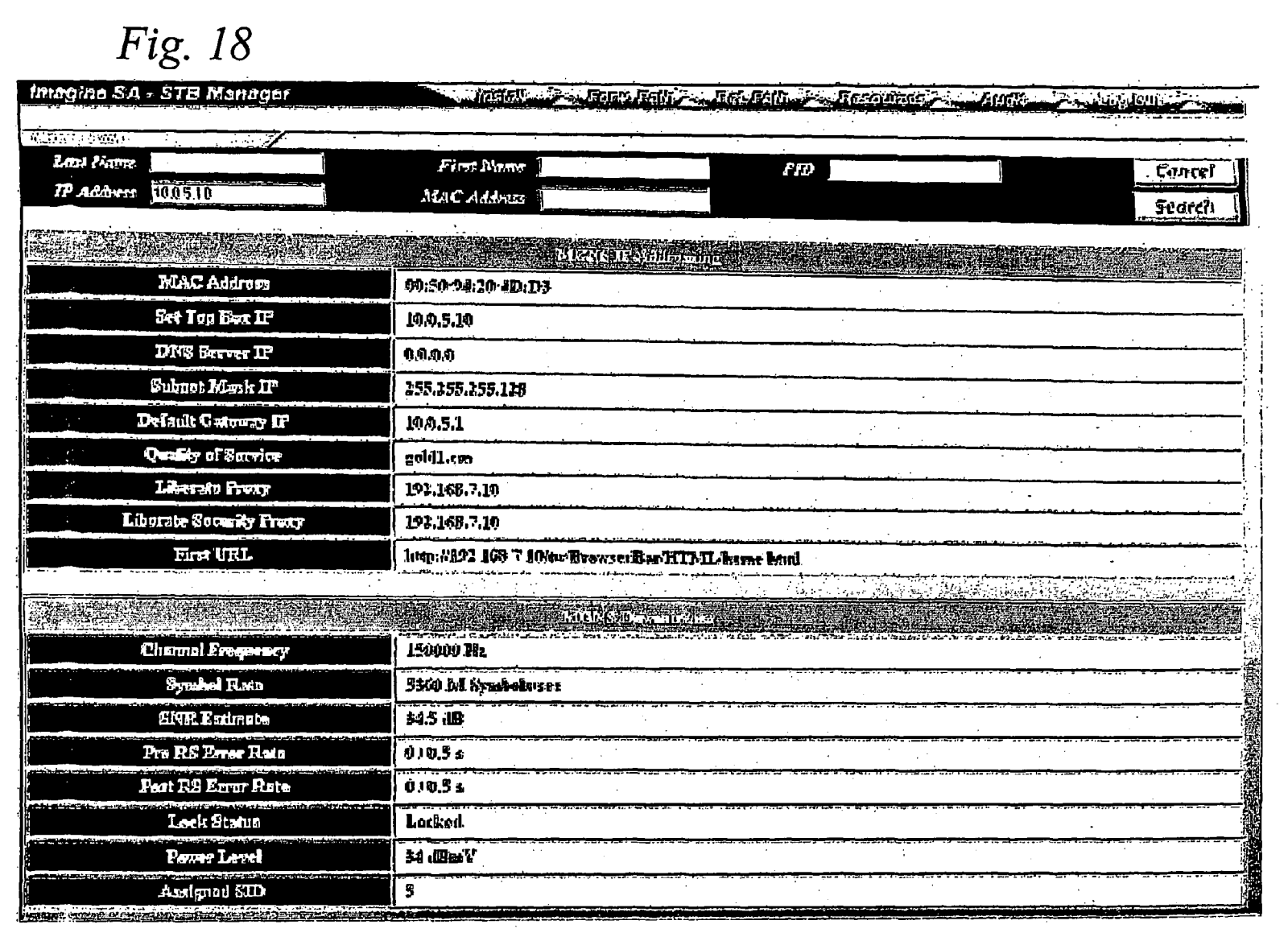

In a preferred embodiment, the DVB Demodulator Status may provide at least some of the following features:
  Nagra serial number: CAS serial number.
  Smartcard status: Shows the status of the Conditional Access smartcard
  IPPV status: Status of the Impulse Pay-Per-View service provision
  Credit: Current credit available for Impulse Pay-Per-View
  Smartcard Version: version of the Conditional Access smartcard
  Smartcard Revision: Revision of the Conditional Access smartcard
  CA Version: Version of the CAS software kernel
  CA Revision: Revision of the CAS software kernel
  Smartcard zipcode: Zipcode of the smartcard owner
  Smartcard serial number: Serial number of the Conditional Access smartcard
  Set Top Box serial number: Serial number of the Set-Top-Box
  Last EMM received: Date when the last EMM was received The 'Return Path' Results List Panel may display a number of 'Return Path' parameters. An example of a screen display of the 'Return Path' Results List Panel is shown in FIG. 18. In a preferred embodiment, the parameters displayed may include: MCNS IP addressing

- MAC address: Set-Top-Box integrated cable modem physical address
- STB IP: Configured Set-Top-Box IP address
- DNS Server IP: Configured domain name server IP address
- Subnet mask IP: Configured subnet mask
- Default gateway IP: Configured default gateway IP address
- Quality of service: Current cable modem configuration file (which defines the Quality of Service allocated to the STB)
- Liberate proxy: IP address of the Liberate Proxy server
- Liberate security proxy: IP address of the Liberate Security Proxy server
- First URL: URL opened upon start-up of the Liberate Browser MCNS Downstream

- Channel frequency: Frequency of the used return path downstream channel
- Symbol rate: Rate at which the data leaves the return path modulator.

$$\text{symbol rate} = \text{input rate rate (Mbps)} * \text{framing overhead} * 1/\text{RS-rate} * 1/\text{FECrate modulation factor}$$

- SNR estimate: Signal/Noise estimate. Should be high if there is little noise
- Pre RS Error rate: Number of errors per 500 ms before Reed-Solomon error correction
- Post RS Error rate: Number of errors per 500 ms after Reed-Solomon error correction
- Lock status: Indicates whether the STB is successfully tuned to a transport stream (i.e. locked to a RF carrier).
- Power level: Radio Frequency power level
- Assigned SID: Assigned DOCSIS channel identifier (Service IDentifier)

Figure 19:
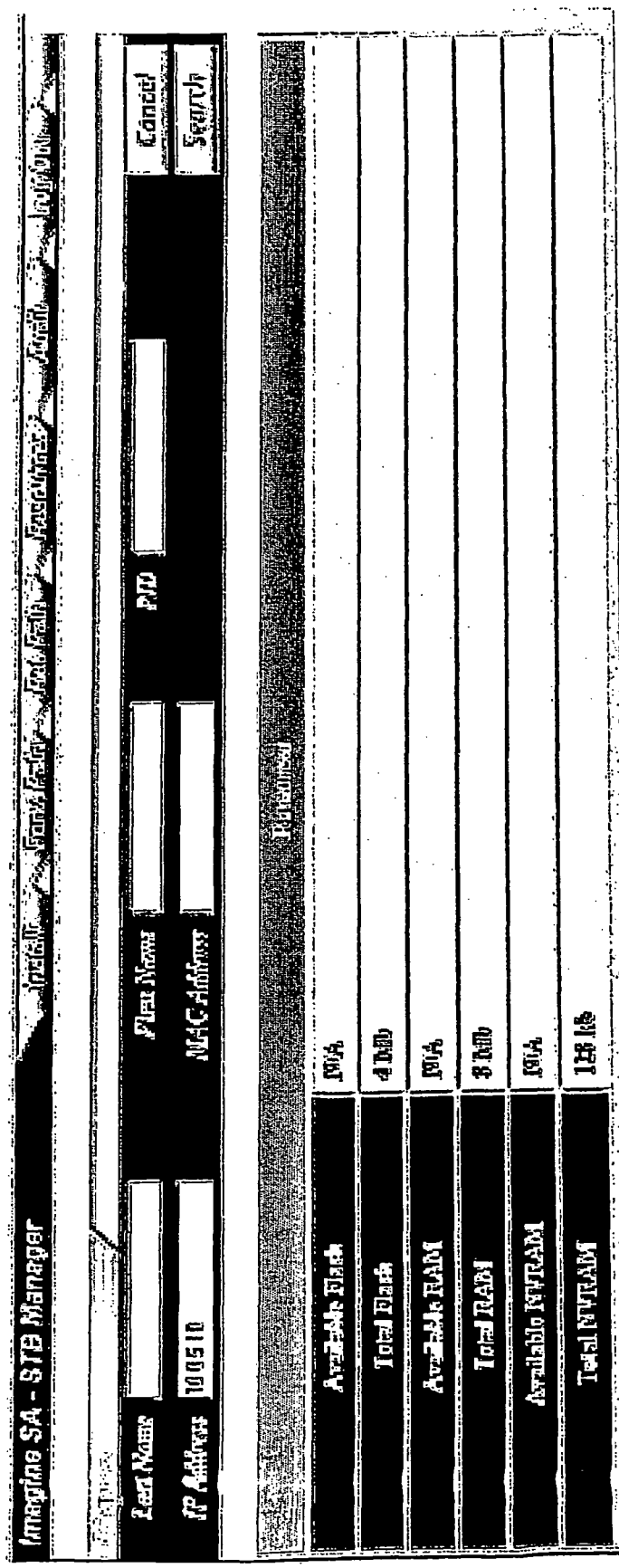
FIG. 19 is a schematic diagram of a 'Resources' Results List Panel screen display according to one embodiment of the systems and methods herein described.
Figure 20:
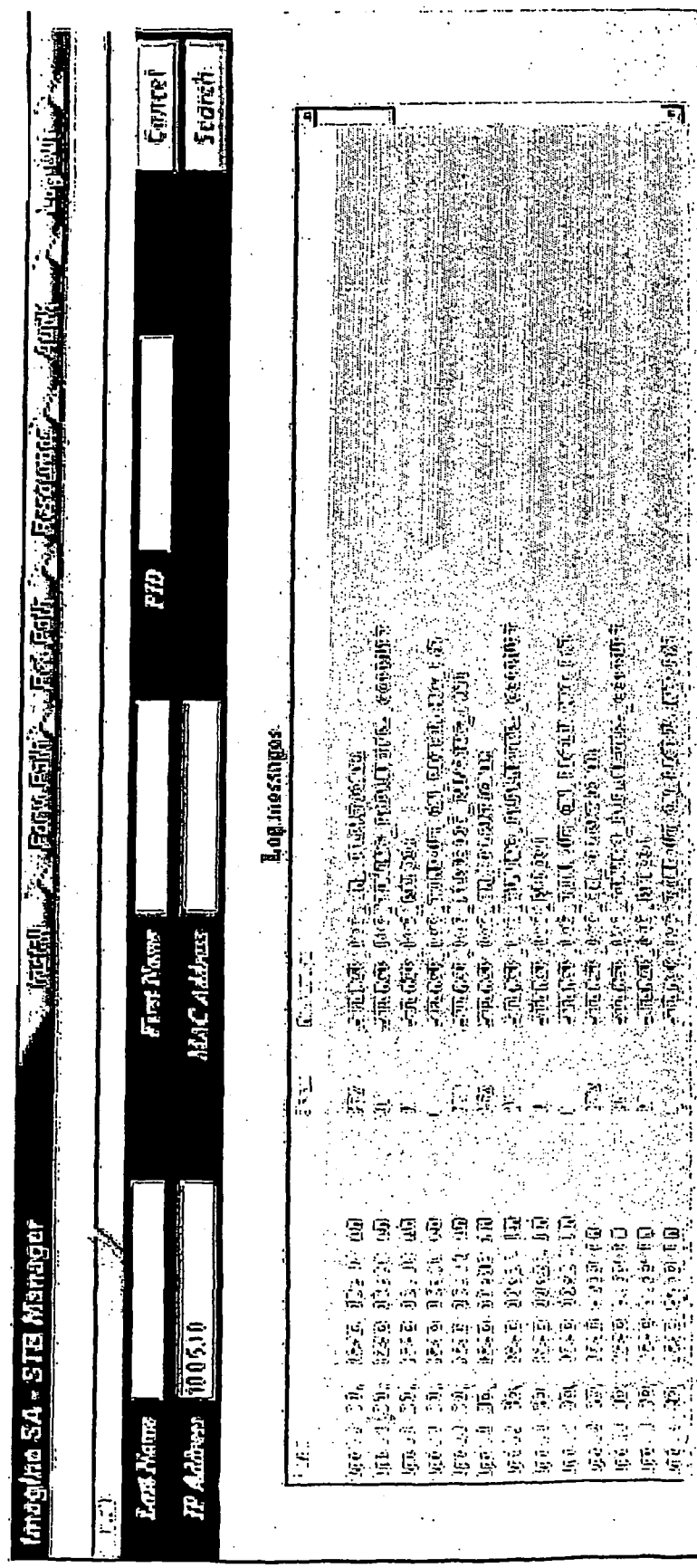
FIG. 20 is a schematic diagram of an example of a further Set-Top Box Manager screen display, which may be used to show 'Audit' information, according to one embodiment of the systems and methods herein described.

A further feature of a preferred embodiment may be the 'Resources' Results List Panel, an example screen display of which is shown in FIG. 19, which may display information such as:

- Available flash: Free Flash memory currently available
- Total flash: Total Flash memory available on the STB hardware
- Available RAM: Free volatile memory currently available
- Total RAM: Total volatile memory available on the STB hardware
- Available NVRAM: Free non-volatile memory currently available
- Total NVRAM: Total non-volatile memory available on the STB hardware A screen shot of the 'Audit' Results List Panel according to one embodiment is shown in FIG. 20 This panel may be used to display the list of the lasts status logged by the STB. In this example, the information may be formatted in 3 parts:

- Date of the action in MM-DD-YYYY HH-MM (AM/PM)
- Code
- Messages to describe the status.

For instance:
STBMGR_LOG_REBOOT
STBMGR_LOG_CM_OPERATIONAL
STBMGR_LOG_TUNING_PARAMETERS_CORRUPT
STBMGR_LOG_PERIODIC_RANGING_FAIL
STBMGR_LOG_TIMEOUT_ON_RECEIVING_PAT . . .

Figure 21:
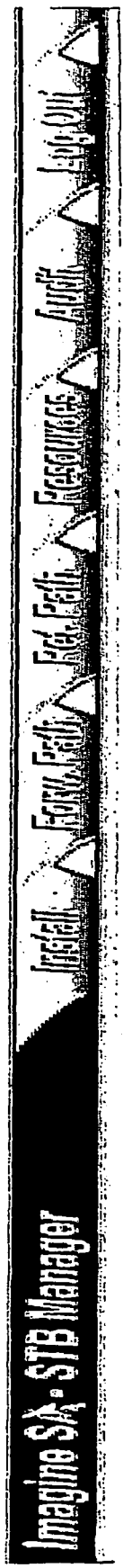
FIG. 21 is a schematic diagram of a Set-Top Box Manager Top Bar according to one embodiment of the systems and methods herein described.

The STB-MGR Top-Bar may contain buttons which control the overall functionality of the system. An example screen display of a Set-Top Box Manager Top Bar is shown in FIG. 21. The buttons on the Top Bar may include:

The 'Install' Button—which may be used to run a query relative to the Installation information of the Set-Top Box. The selection criteria may be set in the Select Panel (see 3.2.1) and the information may be displayed. This button may run the query with the content of the selection fields.

The window displayed may depend on the number of subscribers retrieved:
- If many subscribers are retrieved, the matched subscribers list is displayed.
- If only one subscriber is retrieved, the 'Install' Results List Panel for this subscriber is displayed. 'Install' Results List Panel (see 0)

The 'Forw. Path' Button—This button may be used to run a query relative to the Forward Path information of the Set-Top Box. The selection criteria may be set in the Select Panel (described earlier) and the information may be displayed in the 'Forward Path' Results List Panel (described earlier).

The 'Ret. Path' Button—This button may be used to run a query relative to the Return Path information of the Set-Top Box. The selection criteria may be set in the Select Panel and the information are displayed in the 'Return Path' Results List Panel.

The 'Resources' Button—This button may be used to run a query relative to the Resources information of the Set-Top Box. The selection criteria may be set in the Select Panel and the information may be displayed in the 'Resources' Results List Panel.

The 'Audit' Button—may be used to run a query relative to the Audit information of the Set-Top Box. The selection criteria may be set in the Select Panel and the information may be displayed in the 'Audit' Results List Panel.

The 'Log Out' Button—this may be used to close the current STB-MGR session and open a new Connection Window.

A summary of the functionality of one embodiment of the STB-MGR is provided below:

The STB-MGR may be used to increase call centre efficiency by faciltating remote operations and reducing manual transfers and interventions.

The functionality of a preferred embodiment of the Set-Top-Box Manager includes:

- Monitoring the status of a particular Set-Top-Box by sending a request to the STB directly with any of the following being used as input criteria: STB MAC address, STB IP address or subscriber name/PID. The following sets of data may be retrieved from the STB
  - Installation parameters
  - Forward path parameters
  - Return path parameters
  - Resources information
  - Audit information.
- Polling a set of selected Set-Top-Boxes for a given period of time in order to gather history of STB utilisation.
- Selected STB is polled at regular interval for a defined duration (customisable)
- The polling feature is limited to a configurable number of simultaneous STB to be polled.
- The data generated by this polling is stored for a configurable time period in a separate database or until extra space is needed to store more recent data.
- A web-based application allows operators to iew, over the polled time period, utilisation of:

STB Memory
Channels
Transport Stream ID
Service ID

In a preferred embodiment, the managed information may include:
Installation parameters
Default frequency*
Default Symbol Rate*
Modulation type*
PIN*
Network ID*
Hardware version
Code Release version
Build date
MPEG Attenuation
PCM Attenuation
Attenuation*
Mac Address
Forward path parameters
Conditional Access Status
Nagra Serial Number
Smart card Status
IPPV Status
Credit
Smart card Version
Smart card Revision
Conditional Access Version
Conditional Access Revision
Smart card Zip Code
Smart card Serial number
Set-Top-Box Serial Number
Last EMM received: Date when the last EMM was received
DVB Demodulator Status
SNR Estimate
Pre-RS Error Rate
Post-RS Error Rate
Lock Status
Last PAT
Last CAT
Channel Table
Number of Transport Streams
AGC Combined
Return path parameters
MCNS IP Addressing
Mac Address
STB IP Address
DNS Server IP Address
Subnet Mask IP Address
Default Gateway IP Address
Quality of Service
Liberate Proxy
Liberate Security Proxy
First URL
MCNS Downstream
Channel Frequency
Symbol Rate
SNR Estimate
Pre-RS Error Rate
Post-RS Error Rate
Lock Status
Power level
Assigned SID
STB Resources information
Available flash memory
Total flash memory
Available RAM
Total RAM
Available NVRam
Total NVRam
Audit information
Log of the last STB operations (Date/Code/Operation . . . )
(Preferably, appropriate installation parameters (*) can be updated directly from the STB Manager front-end (reload of the right Set-Top Box configuration file).)

The Architecture of a preferred embodiment can be summarised as follows:

The STB manager may be a distributed web based application. It may be deployed centrally for a small amount of STBs to poll but could be distributed as the number of polled cable modems increases. The preferred STB manager requires it's own database to store historical data polled from cable modems.

Figure 22:
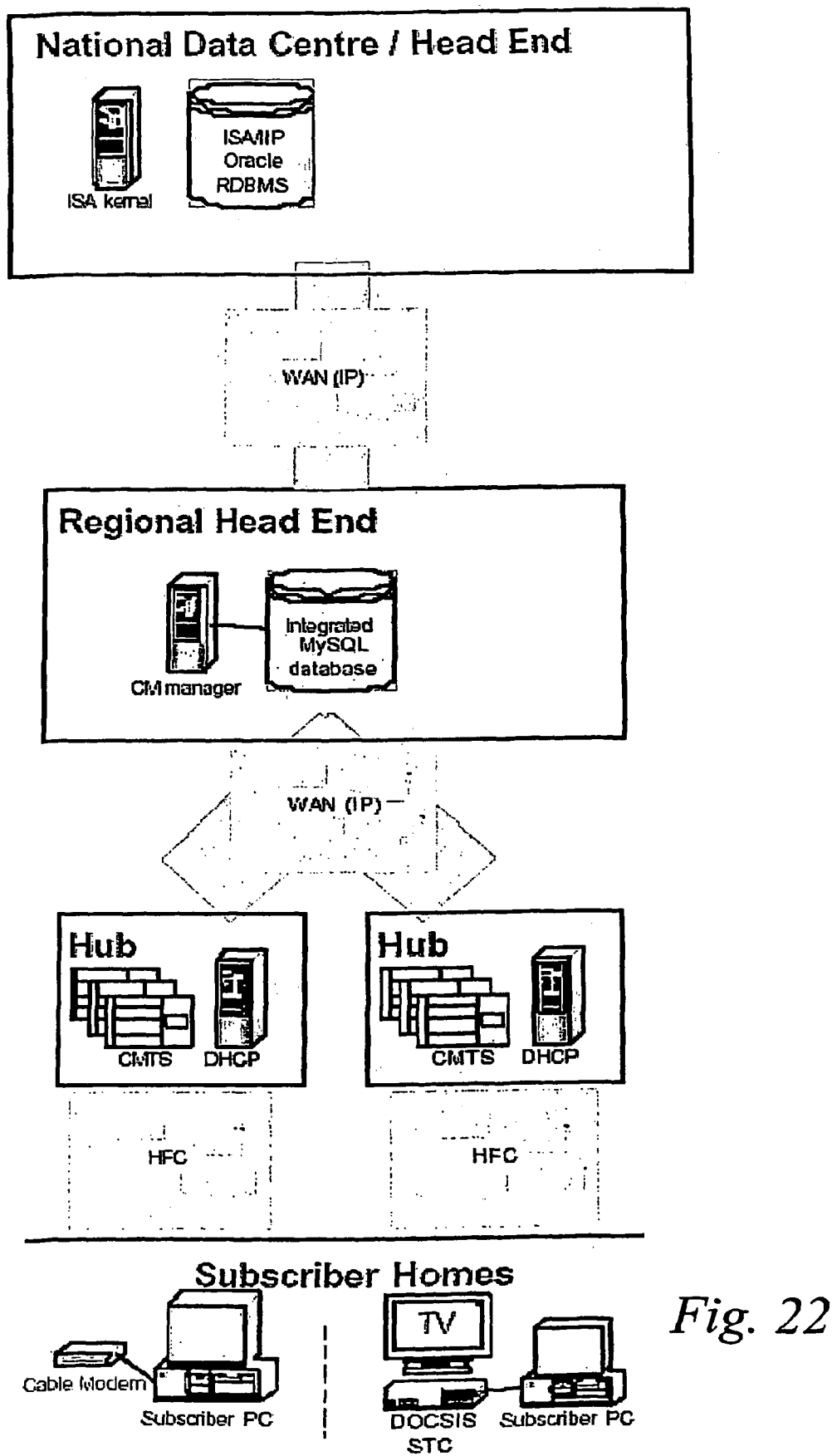
FIG. 22 is a schematic diagram of a one embodiment of the architecture of the Set-Top Box Manager.

FIG. 22 shows one embodiment of an STB manager with a distributed solution.

This may provide the advantage that the number of STB that can be polled by this solution is greater than in a centralised solution. Only infrastructure elements relative to STB Manager are shown in FIG. 22.

Any convenient hardware and software platform may be used. Purely by way of example, a Unix platform may be used, and this may be conveniently based on readily available components. Hardware and software resources required are not excessive and, for example, a commercial deployment may be implemented readily using the hardware and software below (or equivalents).

Hardware for STB Manager:
  SunE420
  1×450 MHzCPU
  1 GbRAM
  2×17 Gb disk
Additional Software Required for STB Manager
  Apache 1.3.19
  Tomcat 3.2.1
  JVM 1.3.1
  Solaris 7 or 8
  Database: Oracle or any SQL-compliant database In addition to the Set-Top Box Manager outline above, the system may also be implemented with a Cable Modem manager, which is described in more detail below.

The principles and methods described herein will now be illustrated further by the following description of a Cable Modem Manager application (CM-MGR). This application is described by way of example only and is not intended to be limiting in any way.

Figure 23:
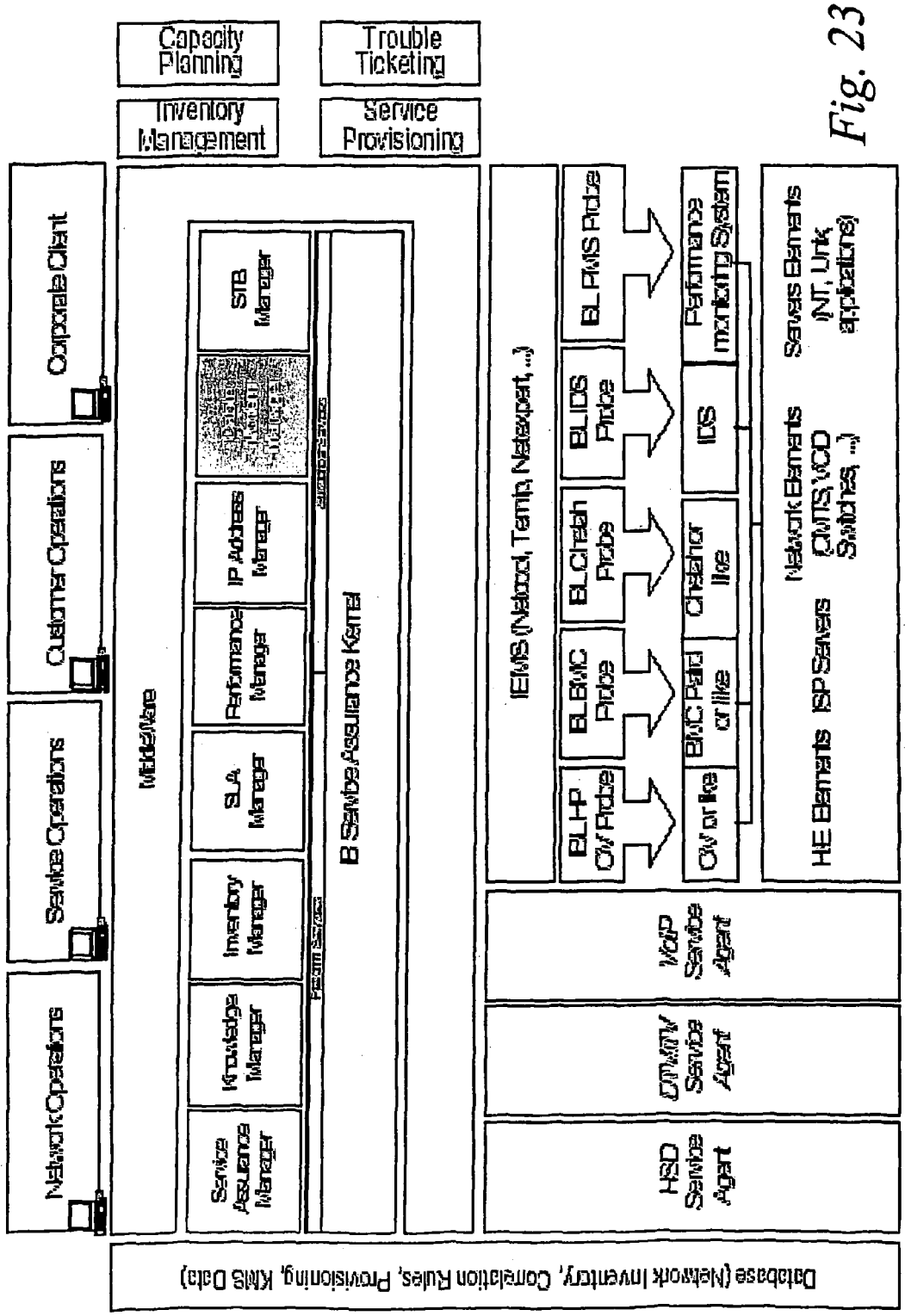
FIG. 23 is a schematic diagram of a Cable Modem Manager integrated into a distributed system according to one embodiment of the systems and methods herein described.

The Cable Modem Manager is a distributed web based application, and can be deployed centrally or be distributed. FIG. 23 shows CM-MGR with a distributed solution.

The Cable Modem Manager can be integrated with Imagine Service Emulation Agent (ISEA) modules to simulate a subscriber access to Internet Service.

Figure 24:
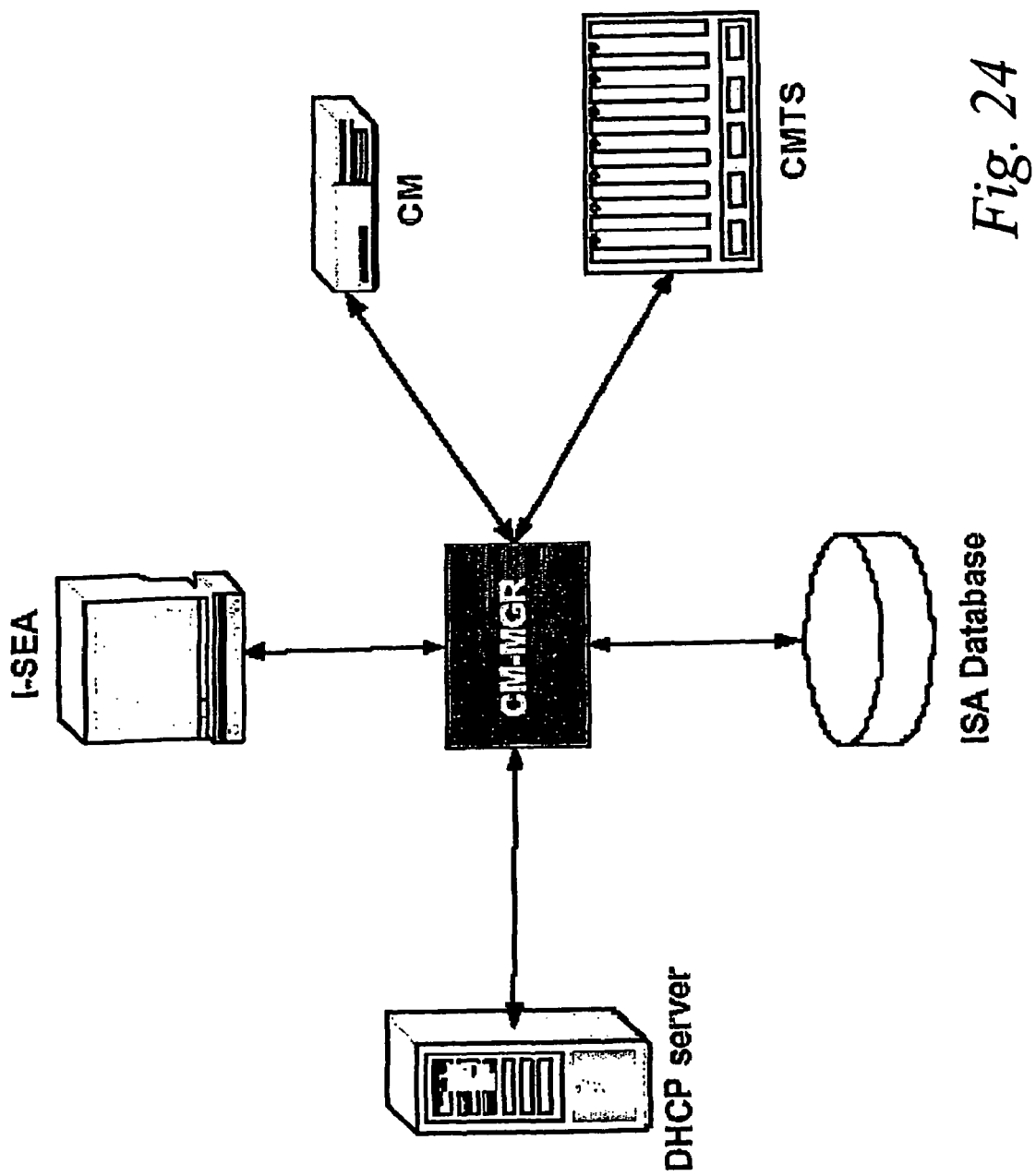
FIG. 24 is a schematic diagram of a technical architecture overview of the Cable Modem Manager according to one embodiment of the systems and methods herein described.

FIG. 24 shows the CM-MGR technical architecture overview, and how the CM-MGR application can retrieve and display information from sources including:
  The ISA Database, to retrieve subscriber, provisioning and services data.
  The (Dynamic Host Configuration Protocol (DHCP) servers, to retrieve cable modem IP addresses.
  The Cable Modem Termination System (CMTS) and cable modem, to retrieve cable modem data.
  The ISEA (when ISEA integration is employed), to obtain detailed information concerning subscriber services.

The Cable Modem Manager application can perform the following main functional features:

Subscriber information searching, wherein by inputting criteria such as first name, last name, PID, MAC or IP address. The application displays a list of subscribers that match the search criteria Status Monitoring, wherein by inputting the details of a selected subscriber the application displays detailed information about that selected subscriber. Such detailed information may include:

Subscriber Information: PID, name, address and e-mail address.

Cable modem status from the ISA database: MAC address, CMTS name, UBR name, Location and Region.

Cable modem status from the Cable Modem Termination System (CMTS): includes downstream and upstream channel information, online state, timing offset, received power, and Quality of Service (QoS) profile.

Cable modem status directly from the cable modem: serial number, software and hardware versions, and operating system.

Performance Monitoring (Polling), wherein by inputting the details of a selected subscriber and polling characteristics, the application can monitor and display performance information such as the start date, MAC address, PID and status.

Service status monitoring, whereby if ISEA Integration is employed, status of ISP, Internet, and performance can be displayed In this way the CM-MGR can be used as a tool to solve a number of technical problems in the field of communications networks. For example if a subscriber has recently upgraded to a premium subscription service, but complains that service is no faster than before, then by taking the subscriber's details, the status of the subscriber's modem can be displayed at a remote location, and if necessary that modem can be remotely rebooted.

In an example where ISEA integration is employed, if a subscriber makes a complaint because of being unable to access their e-mail service, and by taking the subscriber's details and analyzing the status of the subscriber's modem the cause of the subscriber's issue is not identified, then ISEA connection can be activated and the availability of the email service to the user account can be displayed.

It will be appreciated that such an application can be used to monitor a wide variety of information associated with a communications network. Examples of status information which the present application may be used to monitor include:

Subscriber information including:
  Personal ID (PID)
  First and Last Name
  Address: street, city, zip code
  E-mail
Cable Modem Information from Database Frame, including:
  CM MAC address
  CMTS name
  UBR name
  Location and Region Cable Modem Status from the CMTS Frame, including:
Downstream Channel:
  Identification. The Cable Modem Termination System (CMTS) identification of the downstream channel.
  Frequency. The frequency of this downstream channel.
  Bandwidth. The bandwidth of this downstream channel.
  Modulation. The modulation type associated with this downstream channel.
  Interleave. The Forward Error Correction (FEC) interleaving used for this downstream channel.
  Power. At the CMTS, the operational transmit power. At the CM, the received power level.
Upstream Channel:
  Identification. A unique value, greater than zero, for each interface.
  Frequency. The centre of the frequency band associated with this upstream channel. Minimum permitted upstream frequency is 5 MHz for current technology.
  Bandwidth. The bandwidth of this upstream channel. Minimum permitted channel width is 200 kHz currently.
  Transmit timing offset. A measure of the current round trip time at the CM, or the maximum round trip time seen by the CMTS.
  Slot size. The number of 6.25 microsecond ticks in each upstream mini-slot. Ranging backoff start. The initial random backoff window to use when retrying Ranging Requests. Expressed as a power of 2. A value of 16 at the CMTS indicates that a proprietary adaptive retry mechanism is to be used.
  Ranging backoff end. The final random backoff window to use when retrying Ranging Requests. Expressed as a power of 2. A value of 16 at the CMTS indicates that a proprietary adaptive retry mechanism is to be used.
  Transmit backoff start. The initial random backoff window to use when retrying transmissions. Expressed as a power of 2. A value of 16 at the CMTS indicates that a proprietary adaptive retry mechanism is to be used.
  Transmit backoff end. The final random backoff window to use when retrying transmissions. Expressed as a power of 2. A value of 16 at the CMTS indicates that a proprietary adaptive retry mechanism is to be used.
Other Information:
  Max number of CPEs. The maximum number of permitted CPEs connecting to the modem.
  IP address. IP address of this cable modem.
  Received power. The received power as perceived for upstream data from this cable modem.
  Timing offset. A measure of the current round trip time at the CM, or the maximum round trip time seen by the CMTS.
  DOCSIS status. Status code for this cable modem as defined in the RF Interface Specification.
  Unerrored. Codewords received without error from this cable modem.
  Corrected. Codewords received without error from this cable modem.
  Uncorrectable. Codewords received with uncorrectable errors from this cable modem.
  Signal to Noise Ratio. Signal/Noise ratio as perceived for upstream data from this cable modem.
  Micro reflections (dbmV): Total microreflections including in-channel response as perceived on this interface, measured in dBc below the signal level.
  Connectivity state. Current cable modem connectivity state.
  Online times. The percentage of time that the modem stays online during the time period starting with the modem's first ranging message received by the CMTS until now.
  Minimum online time. The minimum period of time the modem stayed online during the time period starting with the modem's first ranging message received by the CMTS until now.

Average online time. The average period of time the modem stayed online during the time period from the modem's first ranging message received by the CMTS until now.

Maximum online time. The maximum period of time the modem stayed online during the time period from the modem's first ranging message received by the CMTS until now.

Minimum offline time. The minimum period of time the modem stayed offline during the time period from the modem's first ranging message received by CMTS until now.

Average offline time. The average period of time the modem stayed offline during the time period from the modem's first ranging message received by the CMTS until now.

Maximum offline time. The maximum period of time the modem stayed offline during the time period from the modem's first ranging message received by the CMTS until now.

Admin status

Quality of service. Group number, for example the QoS profile of 9 means that the maximum downstream data rate is 128 kb/s, corresponding to a bronze QoS.

In Octets (MB). The total number of octets received on the interface, including framing characters.

In Packets

Create time SID. Service ID

Cable Modem Status Directly from Modem Frame, Including:

Description. A text description of the entity. This value should include the full name and version identification of the system's hardware type, software operating system, and networking software.

System uptime. Time the system has been up for, since last reboot.

CMTS MAC address. MAC address of this cable modem.

Ranging response waiting time. Waiting time for a Ranging Response packet.

Ranging waiting time. Waiting time for a Ranging packet.

Upstream transmit power. The operational transmit power for the attached upstream channel.

Resets. Number of times the cable modem reset or initialised this interface.

Lost syncs. Number of times the cable modem lost synchronisation with the downstream channel.

Status code.

Invalid MAP. Number of times the cable modem received invalid MAP messages.

Invalid UCD (if Advanced View selected). Number of times the cable modem received invalid UCD messages.

Invalid ranging. Number of times the cable modem received invalid ranging response messages.

Invalid registration. Number of times the cable modem received invalid registration response messages.

Counter T1 expired. Number of times counter T1 expired in the cable modem.

Down channel frequency. The frequency band associated with this upstream channel.

Up channel frequency. The center of the frequency band associated with this upstream channel. Minimum permitted upstream frequency is 5,000,000 Hz for current technology.

Up channel transmit timing offset. A measure of the upstream transmissions.

Relative priority [0-7]. A relative priority assigned to this service when allocating bandwidth. (0) indicates lowest priority; and (7) indicates highest priority. Interpretation of priority is device-specific Maximum upstream bandwidth (kbps). The maximum upstream bandwidth, in bits per second, allowed for a service with this service class Guaranteed upstream bandwidth (kbps). Minimum guaranteed upstream bandwidth, in bits per second, allowed for a service with this service class.

Maximum downstream bandwidth (kbps). The maximum downstream bandwidth, in bits per second, allowed for a service with this service class.

Transmit burst. The maximum number of minislots that may be requested for a single upstream transmission.

Downstream signal to noise ratio: describes the Signal/Noise of the downstream channel.

Micro reflections: Total microreflections including in-channel response as perceived on this interface, measured in dBc below the signal level.

Examples of performance information which the present application may be used to monitor include:

Current In: current number of octets received on the CM, in Bytes/seconds

Current Out: current number of octets transmitted by the CM, in Bytes/seconds

Average In: average number of octets received on the CM, in Bytes/seconds

Average Out: average number of octets transmitted by the CM, in Bytes/seconds

Maximum In: maximum number of octets received on the CM, in Bytes/seconds

Maximum Out: maximum number of octets transmitted by the CM, in Bytes/seconds

Figure 25:
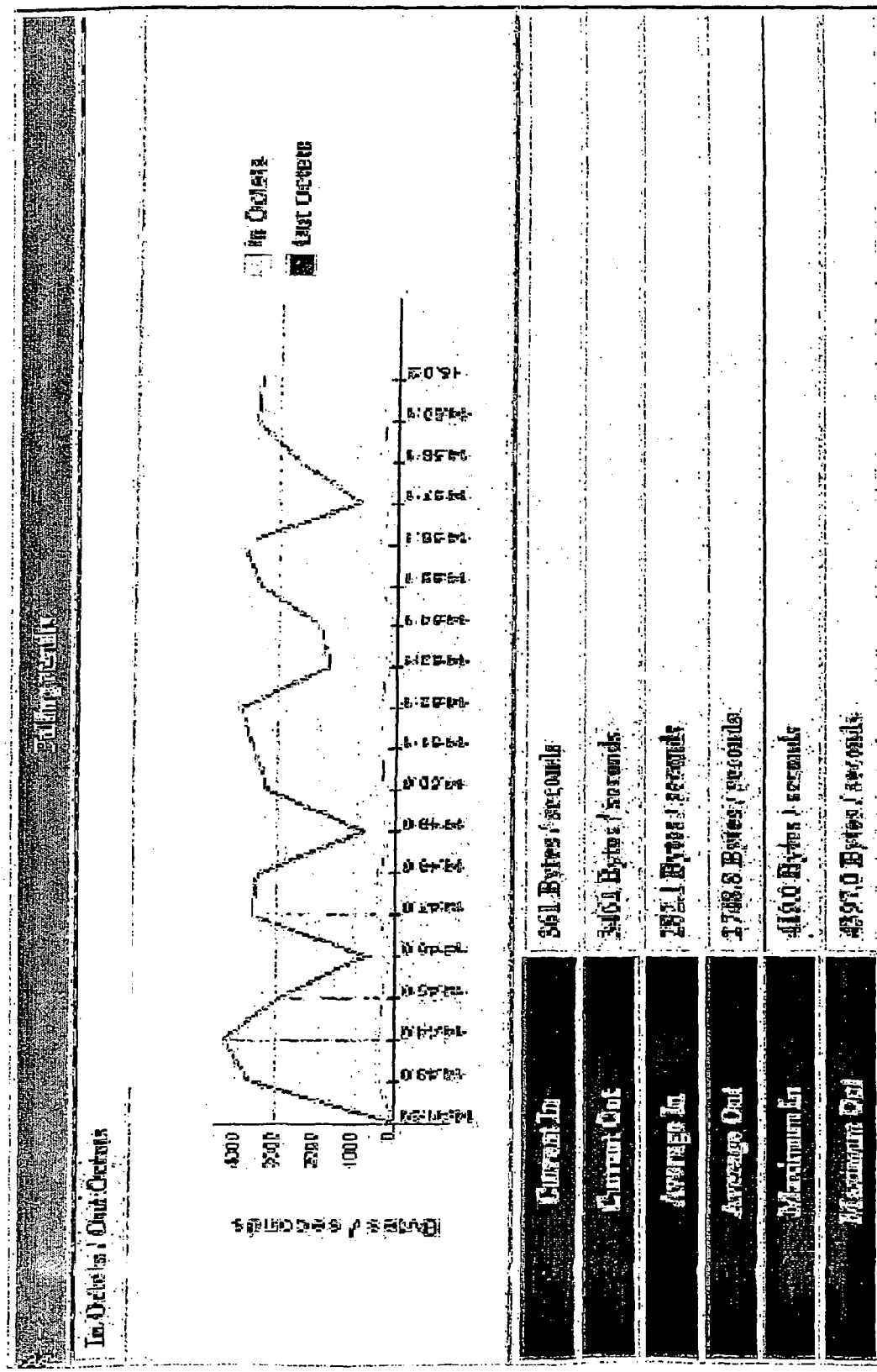
FIG. 25 is a schematic diagram of a screen display which may be generated by the Cable Modem Manager to display data according to one embodiment of the systems and methods herein described.

Current SNR: current Signal/Noise ratio as perceived for upstream data from the CM., in dB Average SNR: average Signal/Noise ratio as perceived for upstream data from the CM., in dB Maximum SNR: maximum Signal/Noise ratio as perceived for upstream data from the CM., in dB These data may be displayed either graphically as shown in FIG. 25, or in tabular form. The provisioning system and methods described above may also be implemented in conjunction with a communications network management system, which may find particular but not exclusive application in management of systems supporting broadband services.

With the advent of higher transmission capacity networks, and particularly for instance broadband networks, network operators have to manage more and more complex infrastructure and to keep an always-increasing number of services up and running. As a result, subscriber satisfaction can drop if they perceive deficient service management and there is more subscriber "churn". Meanwhile, the operators already have to invest more in their operation support teams, taking on more people and/or improving the skills their people have. Hence it is a challenge to be able to provide cost effective management of complex services.

The sort of complexity involved is demonstrated by the services it may be important to support. For instance, these may include digital multiplexes of entertainment video, high speed connections with the Internet and local servers via cable modems, commercial enterprise Local Area Networks and Wide Area Networks, personal communication services over cable and telemetry, as well as traditional analogue TV.

The supporting "cable" network technology may also be complex, based partially on fibre as well as on coaxial cable. A typical architecture for a network operator might be a hybrid fibre coaxial (HFC) architecture in which there is a head end, where all the signal sources are collected and processed, connected for distribution over a fibre backbone to primary hubs, comprising switches or routers, which in turn distribute to secondary hubs which in turn distribute to fibre nodes. The fibre nodes convert the communications to radio frequency and use coaxial cable to reach the end-users who may be corporate or private. The head ends and hubs will also distribute to their local vicinities.

In the broadband domain, such as services offered over cable networks, there are characteristics which differentiate today's services from those traditionally offered over telephone networks. For instance high speed data is often transmitted over always-on connections to customer personal computers (PCs) using cable modems (CMs). This means that cable operators need to provide a network which is working correctly throughout every day of every week to meet performance requirements compatible with service level agreements with customers. The always-on connection is vulnerable to non-subscribers trying to get free connections and the computer access is vulnerable to hackers.

Automated fault management tools are known but tend to be focused of equipment, tools and mechanical problems rather than trying to solve problems at other levels of customer service.

Meanwhile, as customer expectation and competition in the market increase, operators are under pressure to offer not just consistent and high quality services to many customers using different types of customer equipment but also to take into account fraud and security management.

According to an aspect of the present invention, there is provided a communications network management system, which system comprises:
 a) an input for fault reports in respect of a network and/or one or more services supported by a network,
 b) a data store for storing data in respect of said network and/or services,
 c) a fault processor for processing fault reports received via the input, using data stored in the data store, to generate corrective solutions, and
 d) a simulation engine for simulating one or more service instances
wherein the simulation engine has an output to the network to trigger provision of said one or more service instances, such that a fault report in respect of said provision will be received at the input and processed by the fault processor.

The simulation engine can be used in embodiments of the present invention in providing service assurance to the end user by intelligent monitoring of complex platforms. In particular, the simulation engine could be used either proactively, to run test service instances, or to validate the result of applying a corrective solution which has been generated by the fault processor. The simulation engine may be implemented by one or more agents running on a network component, for example a user access device such as a cable modem, or a switch or router or access concentrator.

The manner in which corrective solutions are generated is of course important, particularly in respect of the level at which they are targeted. It could be easy to meet the requirements of a received fault report but to fail to diagnose a more widespread problem that might continue to mean service failures.

According to a further aspect of the present invention, there is provided a communications network management system, which system comprises:
 b) an input for receiving fault reports in respect of one or more services supported by a network, and for receiving component alarms from components of said network;
 b) a data store for storing data in respect of said network and/or services; and
 c) a fault processor for processing fault reports received via the input, using data stored in the data store, to generate corrective solutions,
wherein the fault processor comprises a correlation engine for correlating received fault reports in respect of one or more services with received component alarms.

Embodiments of the present invention including the correlation engine can provide improved fault processing in that they may be able to identify a root cause of faults which can affect more than one service, or service to more than one customer.

Preferably, the data store is structured to support fault processing of this type. For instance it may be structured to hold data relating a problem description to one or more fault reports and to corresponding one or more component alarms. A problem description may include data describing component behaviour and, preferably, data received in respect of historic component behaviour. In the relatively simple network and service provision of the past, historic behaviour is likely to reproduce predicted behaviour for a component. However, in the much more complex networks and services being provided today, embodiments of the present invention recognise that component behaviour may 110 longer be fully predictable. Thus embodiments of the present invention which support fault processing in relation to historic component behaviour may be very valuable in providing a learning mechanism in fault processing.

Alternatively, the fault reports generated by problems with component behaviour might be unpredictable. Hence a problem description may instead or as well contain data defining fault reports in respect of past system behaviour, related to successful corrective solutions.

Known fault management systems for communication systems have relied principally on fault reports by end-users to locate faults and trigger a fault management process. Fault management has been done largely at the network level, with the aim of keeping a network fully functional. However, this means there will often be delays between identification of a fault and its correction. As mentioned above, embodiments of the present invention may use proactive simulation of service instances to trigger faults latent in the network but not yet exposed by customer requirements. A further improvement which can be provided by embodiments of the present invention is to relate fault processing to both service and customer data.

According to a further aspect of the present invention, there is provided a communications network management system, which system comprises:
 c) an input for fault reports in respect of a network and/or one or more services supported by a network,
 b) a data store structured to store data in respect of said network and services, and
 c) a fault processor for processing fault reports received via the input to generate corrective solutions,
wherein the data store is further structured to store customer data in relation to services and the fault processor comprises a correlation engine for correlating received fault reports in respect of one or more services with customer data.

Preferably, the fault processor further comprises sorting apparatus for sorting fault reports in an order determined by correlated customer data. This could be very important in prioritising fault reports and thus the manner in which a network is repaired in order to restore services of highest priority for instance because they have an impact on a large number of customers or customers with stringent service levels agreed.

In practice, the correlation engine may combine the attributes of the correlation engines of the previous two aspects of the present invention and thus provide a two stage correlation mechanism, including both correlation of fault reports to component alarms and correlation of component alarms to customer data.

Advantageously, the customer data includes a measure of priority of service provision in relation to an identified customer and an identified service. This enables a further level of flexibility for the manner in which the network is repaired which might be inherited from priority values in contractual data for the respective customer.

In an alternative to the previous aspect of the present invention, the data store may be further structured to store not necessarily customer data but a priority parameter in respect of at least one identified service and the fault processor may comprise a correlation engine for correlating received fault reports in respect of one or more services with the respective priority parameter(s). In this alternative, there is no need to rely on customer data to identify important services and thus to be able to prioritise fault reports or component alarms for repair.

It is intended in embodiments of the present invention that a network operator, such as a cable operator, should be able to deal efficiently, and preferably proactively, with problems relating to access loss, performance, fraud and security. Further, it is intended that the operator should be able to analyse the impact of a problem in more than one context, including preferably the impact on a service in relation to the location in a network, the subscribers (customers) affected and the nature of the impact such as lost access or limited performance. Then the operator should preferably be able to identify the equipment generating a problem, current or pending, fix the problem at the equipment level and log it for future analysis. This last may be particularly useful if the operator can use past problems in diagnosing future ones.

Embodiments of the present invention may take advantage of a particularly advantageous arrangement for launching test signals into the network. According to a further aspect of the present invention, there is provided a method of testing a broadband network, the network comprising a head end for receiving one or more communications services from service providers and transmitting the one or more services towards end user equipment, and comprising at least one node for receiving said one or more services from the head end and delivering the service(s) towards end user equipment, which method comprises launching a test signal to the network at said at least one node and monitoring a response by the network thereto.

A way of doing this is to install a personal computer, or like computing platform, in the node. The personal computer could be pre-programmed, or controlled from elsewhere, to launch the test signals. For instance, it could be controlled via the head end relevant to the node. In order to test the response of the network to something as close as possible to user signals, if the node is a node in which optical to electrical signal conversion takes place, at a cable modem termination system, the personal computer can be arranged to launch the test signals via the cable modem termination.

If there is a significant problem in the signal path used to launch one or more test signals, the same problem could affect incoming control signals to the personal computer. It is therefore particularly advantageous if the signal path used to carry control signals to the personal computer is different from the signal path used to launch one or more test signals from the personal computer. A way of providing these different paths is to launch the test signals via the cable modem termination system, which also means that the test signals closely emulate user signals such as service requests, but to carry the control signals to the personal computer without going through the cable modem termination system. Alternatively or as well, out of band signalling can be used for the control signals.

A network management system according to an embodiment of the present invention will now be described, by way of example only, with reference to the accompanying drawings (FIGS. 26 to 43):

GLOSSARY (The following will not necessarily be the only expansions or explanations relevant and are here to give at least one option rather than to be taken as limiting the meaning of an acronym, word or phrase in any way.)

ACL: Access Control List
CM: cable modem
CMTS: Cable Modem Termination System
CRM: Customer Relationship Management
DHCP: Dynamic Host Configuration Protocol
DLC: Data Link Control. A service provided by the Data Link Layer of a function defined in the Open Systems Interconnection (OSI) Model for network communications. The Data Link Layer has two types of sublayer, a MAC sublayer for each physical device type and a Logical Link Control sublayer.
DSL: digital subscriber loop
DTV: Digital TV
EMS: element management system
FTTH: Fibre to the Home
HFC: Hybrid Fibre Coaxial network for carrying broadband (video, data and voice). The CATV company instals fibre from the Cable Head End (distribution centre) to serving nodes near the uses, then coaxial cable to the customer premises.
HSD: high speed data
Hub (See Regional networks and Hubs below): data can come in/go out in many directions. Usually includes a router, bridge or switch. May include modem cards for dial-in users, a gateway card to a LAN, and a line connection.
HTTP: HyperText Transfer Protocol
IDS: Intrusion Detection System
IDSL: Integrated Digital Subscriber Line. Can be flat rate without usage charges. It bypasses the voice network by plugging into a special router at the phone company end.
IEMS: Intelligent Element Management System
IMAP: Internet Message Access Protocol. For accessing e/mail from a local server. The user can decide when and what should be downloaded. Cf POP3 (Post Office Protocol) in which everything is downloaded at once.
IP: Internet Protocol
ISM: Internet Service Monitor by Netcool
KMS: knowledge management system
LDAP: Lightweight Directory Access Protocol. Enables anyone to locate organisations, files, devices etc in a network.
MAC address: Media Access Control address. The unique hardware number of a device. In an Ethernet, it is the Ethernet address. In the Internet, a correspondence table relates the IP (Internet Protocol) address to a physical device address on a LAN.

MOM: Manager of Managers

MRTG: Multi Router Traffic Grapher. A tool which monitors traffic load on network links. It generates live representation by means of HTML pages containing GIF images. Available under GNU public licence.

NHE: Network Head End

PCS: Personal Communications Services

Regional networks and Hubs: these can carry digital multiplexes of entertainment video, high speed connections with the Internet and local servers via cable modems, commercial enterprise LANs/WANs, PCS over cable and telemetry, as well as traditional analogue TV. Typical architecture is the head end, where all the signal sources are collected and processed, distributing over a backbone to primary hubs which in turn distribute to secondary hubs which in turn distribute to fibre nodes. Everything between the head end and the fibre node is carried on fibre. The fibre nodes convert to RF and send signals onto coaxial cable to the users. The head ends and hubs will also distribute to their local vicinities.

Scope: in DHCP, a pool of IP addresses which the DHCP server can assign or lease to clients.

Segmentation: a network design approach using routers, switches and bridges to keep traffic levels down in a network. A router, switch or bridge provides an access point controlling traffic into and out of a segment of network. Traffic is only sent into the segment containing the destination of the traffic and won't be sent out of a segment if it is already in the segment containing its destination. Broadcast traffic may be blocked from a segment as a default behaviour of a router unless the router has for instance explicit instruction to pass broadcast traffic into the segment. Traffic in practice tends to be locally addressed. With segmentation, less traffic goes out onto the backbone and thus collisions are reduced. Segmentation reduces the number of users sharing the bandwidth since, within a segment, all users share the bandwidth and the smaller the segment the fewer the users sharing. It therefore increases available bandwidth to each user. It can also extend Ethernet cabling distances because the beginning point for the maximum cabling distance is re-established.

SMTP: Simple Mail Transfer Protocol

STB: Set Top Box

Telnet: user command and underlying TCP/IP protocol for accessing remote computers with permission. HTTP and FTP can be used to request files but not to logon. With Telnet, a user can log on like a regular user with privileges of the relevant application and data on that computer.

UBR: unspecified bit rate? For efficient, shared use of capacity.

VOD: Video on Demand

WLL: Wireless Local Loop

Figure 26:
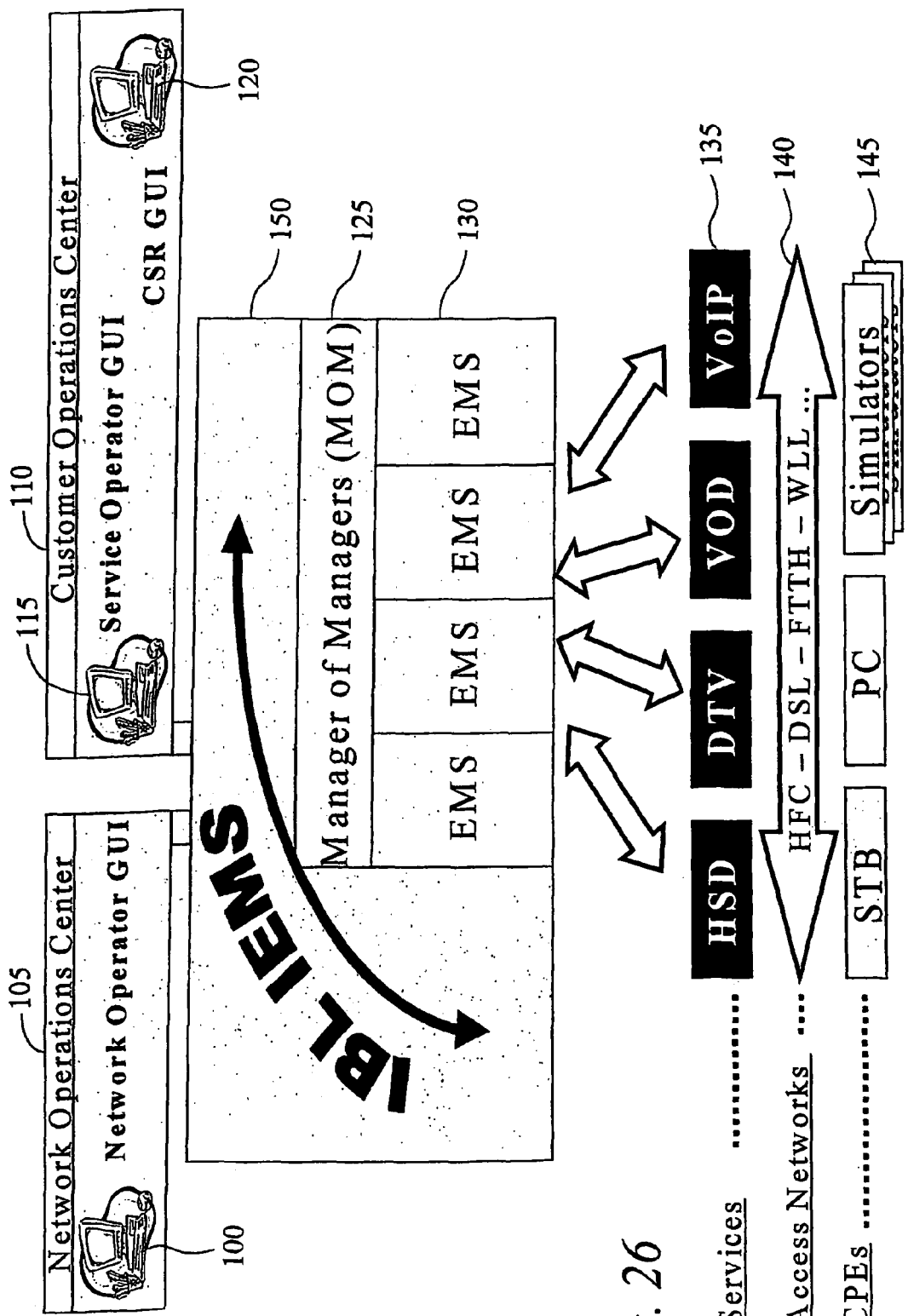
FIG. 26 shows a schematic view of where the network management system sits in relation to interfaces for use by users, including customers, service operators and network operators, and the services and network elements being managed.

Referring to FIG. 26, a cable network operator may use several different access networks 140 to support multiple services 135 for delivery to multiple types of Customer Premises Equipment (CPE) 145. To do that, it is necessary to manage behaviour of the components of the network particularly to monitor for alarms, and it is known to run an Element Management System EMS) 130 to do that, such as Hewlett Packard's OpenView™ or BMC Patrol™. At this level, it is also known to run an intrusion detection system and a network performance monitoring system such as Multi Router Traffic Grapher™, available under GNU public licence.

All the data output from the EMS is collected for processing by a Manager of Managers (MOM) 125 such as Micromuse Netcool™ and aspects of the processed data may be made available to various users of the system who may be in the Network Operations Centre 105 or the Customer Operations Centre 110. There will usually be two types of user in the Customer Operations Centre 110, a service operator and a customer service manager. Hence overall, aspects of the processed data may be required for presentation at three different Graphical User Interfaces (GUIs), a network operator GUI 100, a service operator GUI 115 and a customer services GUI 120.

Importantly in embodiments of the present invention there is also an Intelligent Element Management System (IEMS) 150 and it is this which provides a fully integrated management system which has powerful analysis capabilities across all levels of service provision to the end user, for use at three different levels, the network, the services and the customer interface. That is, the IEMS 150 provides in a unique package the complete set of functionalities which are needed to manage a full network.

Figure 27:
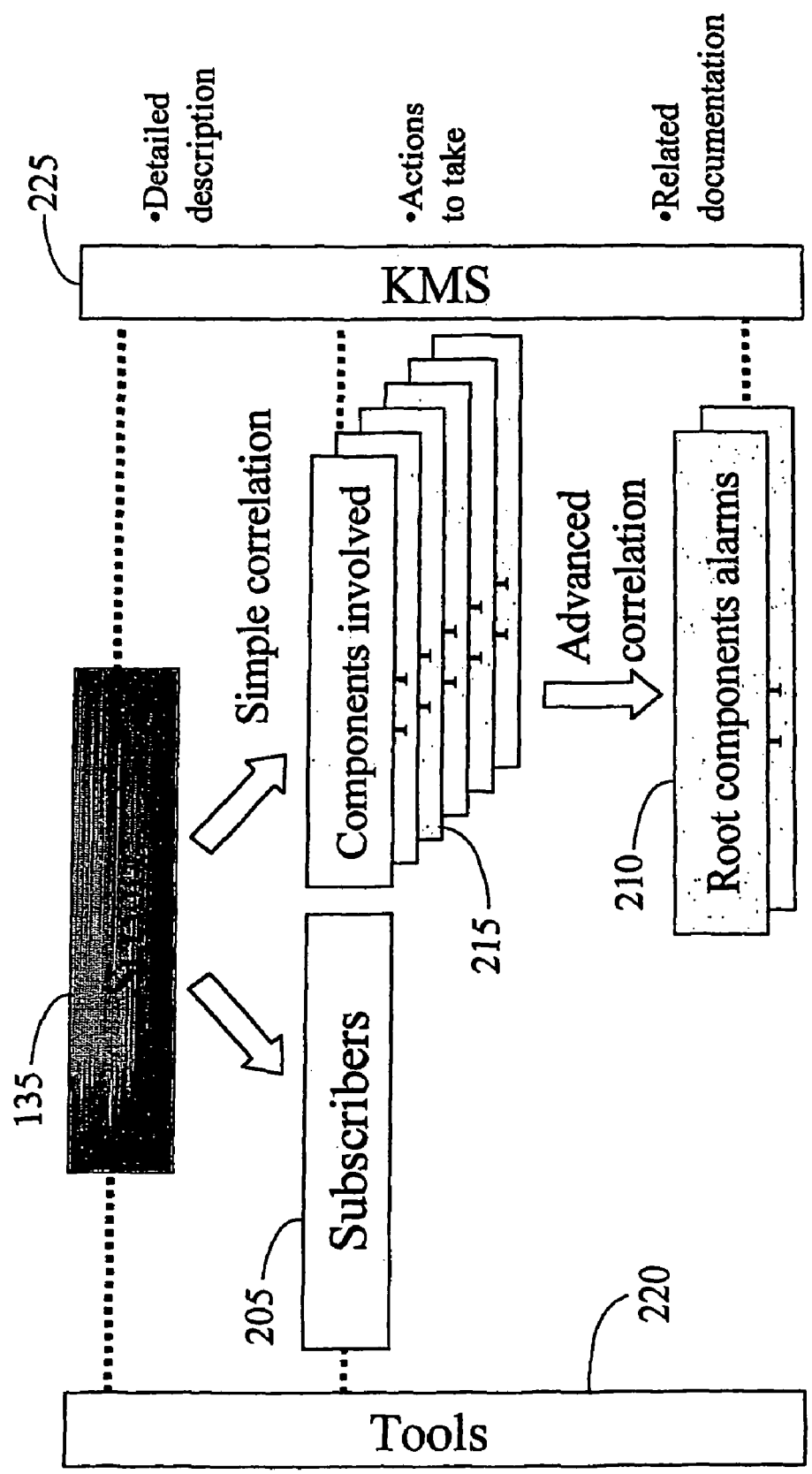
FIG. 27 shows a schematic view of the primary components of the network management system.

Referring to FIGS. 26 and 27, the IEMS 150 provides the following aspects:

fault processing based on the services 135 supported so that subscribed services can be kept up and running subscriber oriented information processing and provision, which is obviously important since subscriber satisfaction is always a major priority of the service provider all-in-one product supporting the complete set of functionalities which are needed to manage a full network an integrated and powerful knowledge management system 225, which can be provided with a complete set of relevant content a multi-user/multi-purpose GUI, remotely accessible over low bandwidth links and offering relevant views for the Network Operator Console 100, the Service Operator Console 115 and the Customer Operator Console 120 powerful correlation which can be used to analyse service failure to provide an impacted subscribers list and details, information on the network components involved in the failure and, due to a second level of correlation, to extract the root component alarm(s)

a complete set of tools 220, adapted to user type and including service, customer and network related tools adaptation to multiple services 135 and multiple access networks 140

The example of an embodiment of the present invention described below is designed particularly to support high speed data services on a HFC network. For the cable operator, this means providing always-on connection with performance parameters to meet the contractual aspects signed with the subscriber. Because of the always-on connection, it is also particularly important to prevent fraud, such as a non-subscriber trying to get a free connection, and security violations such as hacking. It is intended in embodiments of the present invention to support the cable operator to do at least one and preferably all of the following in the event of a problem:

Identify the global impact on Service in terms of

Where (which segment, which hub, which regional head end, ... )

Who are the subscribers impacted (list)

What is the detailed impact (no access, limited performance, ... )

Identify the equipment(s) (hardware, software, link) which has generated the service problem (current or predicted)

Find and validate a solution to the problem

Log the problem for further analysis

Figure 28:
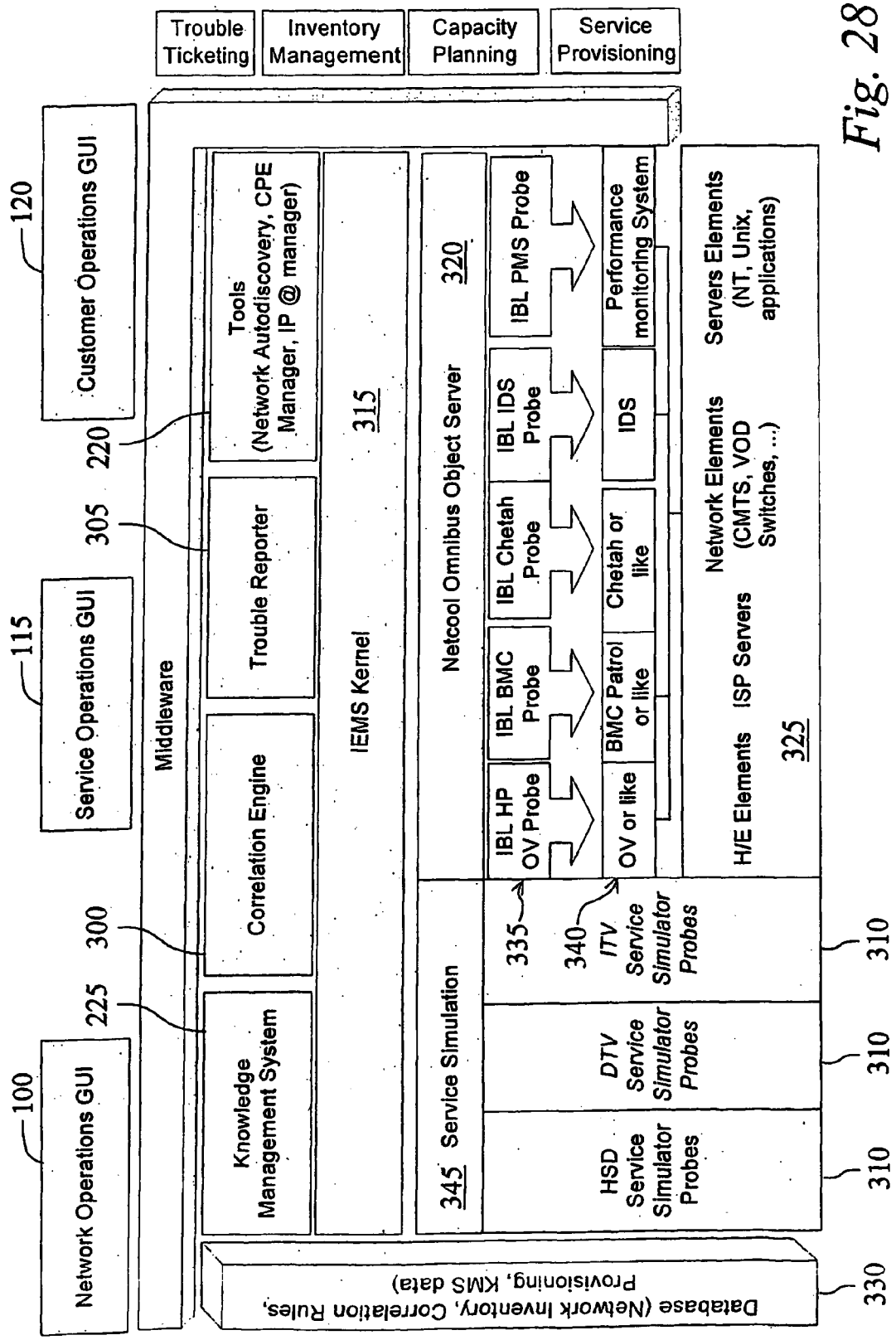
FIG. 28 shows a more detailed view of components of the network management system together with tools and other systems with which it interacts.

Referring to FIG. 28, the IEMS comprises inputs for network alarm data via a database 320 and more service-specific monitoring data via service simulation data processing software 345, a powerful knowledge management system 225 for use in generating corrective solutions to problems and a correlation engine 300 for analysing alarms to the root component level. Supporting these is a database 330 holding for example the rules for the correlation engine 300 and data supporting the knowledge management system 225. The service simulation data processing software 345, receiving service data via probes 310 in response to service activity triggered by simulators embedded in the equipment being monitored is particularly powerful in that it can be used to test services proactively, and to validate corrective solutions, by simulating instances of services, as a user might trigger in normal use, and detecting service level responses via the probes 310. Use of the simulators can also produce network alarm data in the same manner as normal use of the network and services.

The following description firstly describes a network environment for providing High Speed Data services to an end user, to put embodiments of the present invention into a working context, and then takes the above areas and describes them in more detail.

Network Environment as Working Context

Figure 42:
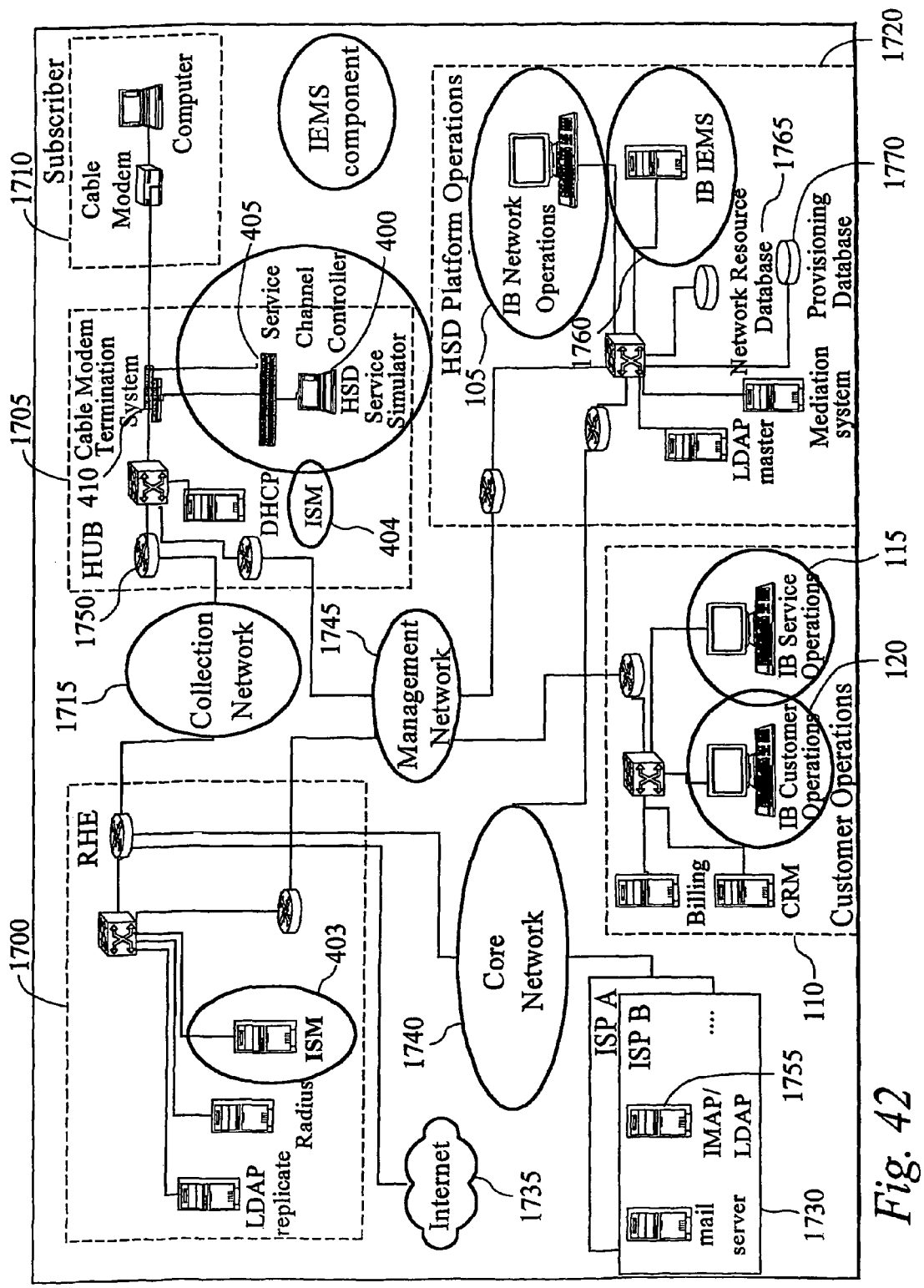
FIG. 42 shows a network context for the network management system in which a global infrastructure provider controls the end-to-end network.

Referring to FIG. 42, a typical regional network for providing broadband services will comprise a regional head end 1700 which receives services from Internet Service Provider equipment 1730 over a core network 1740. The regional head end 1700 transmits services in connection with identified locations in its regional network over a collection network 1715 to a plurality of hubs 1705. These hubs 1705 contain routing devices 1750 which route the services towards the end user equipment 1710.

A management network 1745 is provided for monitoring and controlling the network and service platform used to support service provision. The management network 1745 is used in particular to pick up alarms and event data in respect of the network and services and to transport it to an operations centre, in the case shown in FIG. 42 to the High Speed Data service and network operations centre 1720. In the operations centre 1720, it is input to an intelligent management system 1760 where it is processed in the light of network and service data, and in particular with reference to the knowledge management system 225 and the correlation engine 300. Once the alarm and event data has been processed, the results can be stored in a database of the management system 320 and viewed via Graphical User Interfaces (GUIs) by users of different categories. In particular these GUIs will be dedicated to a network operator 100, a service operator 115 and a customer relations operator 120.

The intelligent management system 1760 primarily comprises the software processes needed to process the incoming alarm and service data. It needs to call on data such as correlation rules for the correlation engine 300, and data to support the knowledge management system 225. This data can be stored on any accessible database, preferably local, and can conveniently be stored on the network resource database 1765 and/or the provisioning database 1770 of the operation centre 1720.

Network Alarm Data

Referring to FIG. 28, looking first at the collection and processing of network alarm data, the Netcool ObjectServer 320 integrates and consolidates alarms coming from network equipment 325 via a set of probes 335. For each piece of network equipment 325, including servers, the tools 340 from the EMS layer 130 will detect a range of alarms. For the purpose of the IEMS, particular data content of these alarms is appropriate. The probes 335 are used here effectively as filters which select the types of alarms which are appropriate to the IEMS and input them to the Netcool ObjectServer 320.

At least the following pieces of network equipment 325 can be monitored:

CMTS (MC16 card)
    Unspecified Bit Rate (UBR) Router
    Catalyst™ (Cisco router)
    NT Operating System
    Solaris Operating System
    DHCP servers (CNR)
    LDAP servers
    Oracle Database Server
    Back-end Provisioning Server The network monitors 340 are of known type and may comprise for instance the following:

Hewlett-Packard OpenView™: a set of products such as a Network Node Manager which provide event correlation, thresholding and alarming;

BMC Patrol™: a set of products by BMC Software which include for instance a central point of control for applications, computers, LANs, WANs and communications devices;

Chetah: a network management tool for HFC networks

Intrusion Detection Systems: these are systems which run continuously on a network and produce alerts for system and network administrators of potential illegal access to the network or host;

SATAN and SAINT tools: a Security Administrator's Tool for Analysing Networks and the Security Administrator's Integrated Network Tool which improve the security of a network by trying to break into it, available under a GNU public licence;

Performance monitoring tools; these measure performance in terms of response times or loading. An example of a performance monitoring tool is the Multi-Router Traffic Grapher, available under a GNU public licence, which monitors traffic load on network links and generates HTML pages containing GIF images to give live representation.

Alarms detected by the tools 340 are selected by the probes 335 for input to the Netcool ObjectServer 320. The particular alarm types may be in relation to the following:

Availability (hardware or software)
        Servers (including operating system processes, application processes and the like)
        Network devices
    Security
        Some critical servers are security hardened so that some services such as Telnet for instance are not available, and alarms arise if security is not maintained
        Access Control Layer (ACL) violation
        Firewall down
    Performance
        Central processing Units (CPU)
        Random Access Memory (RAM)
        Bandwidth and traffic
        Cable Modem Termination System
    Fraud
        The MAC addresses of Customer Premises Equipment (CPE) for invalid (unsubscribed) users are identified. A "diff-file" between LDAP repository and SMS database is built, and an appropriate alarm is generated for invalid Mac-addresses
    Change configuration
        In network equipment
        In servers The network alarm data is stored for the IEMS in a database 320 which does some processing of received alarm data. The database 320 used in this embodiment is the Micromuse Netcool ObjectServer™ which maintains an overview of events and processes them to the extent that they can be grouped according to the services they potentially impact.

Service Monitoring Data

Figure 29:
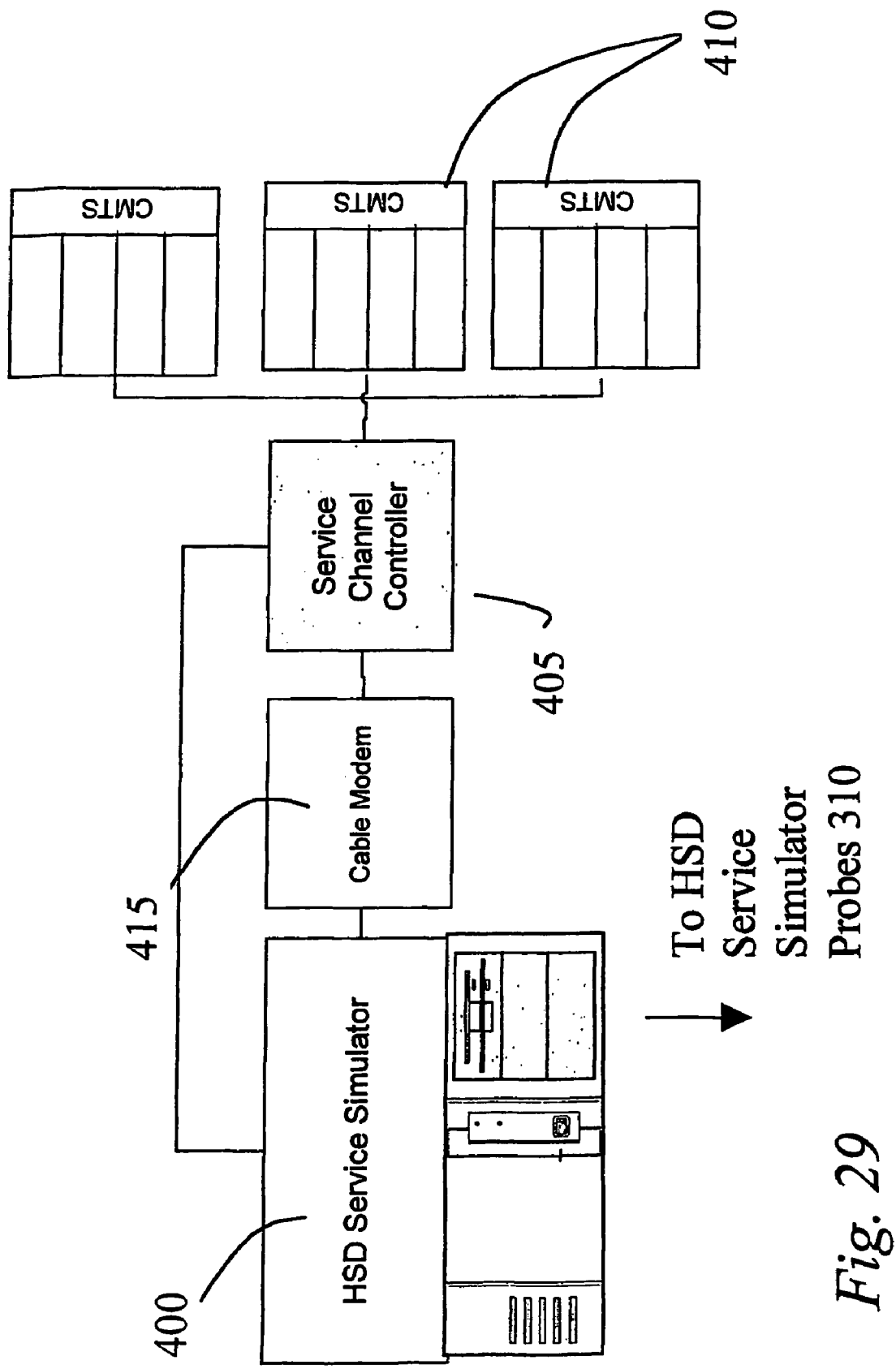
FIG. 29 shows a simulator for use in the network management system of FIG. 26 and its connection into a network to be tested.

Referring to FIGS. 28, 29 and 42, as well as the collection of network alarm data, service-specific data is collected for each service type. Importantly, service data is picked up by the service simulator probes 310 in response to activity triggered by service simulators 400, 403, 404 which are installed at relevant sites in a network environment. The data collected is then processed and stored by service simulation data processing software 345 for the IEMS system.

To put the use of service simulators 400, 403, 404 and monitors into context, the following describes the collection of data for a High Speed Data (HSD) service run over a regional network as shown in FIG. 42.

There are three types of simulator 400, 403, 404 in the embodiment presently described, installed in different locations of the HSD network.

A first type of simulator 403 is provided by the known Internet Service Monitor (ISM) produced by Micromuse Netcool™, in the regional head end 1700 to monitor links for the ten most popular Web sites (to be defined in setup), the IMAP and LDAP based services, and POP3/SMTP e-mail services, and in the hub 1705 to monitor DHCP based services.

A second type of simulator 400, the HSD service simulator, is installed using a personal computer (PC) in the hub 1705 to test the "last mile" on all segments of the hub 1705. This PC is connected on the cable side of a cable modem termination system 410 in the manner of end user equipment. The PC is operated periodically to check a set of functionalities. The operations carried out by means of this PC include at least:
- Reboot the PC and test provisioning access
- Send an HTTP request to the provisioning server
- Send HTTP requests to some popular Web servers to test access and response times
- Attempt to use Telnet access to hardened servers A third type of simulator 404 is used specifically to test Telnet responses. It will launch Telnet commands to different pieces of service equipment in order to test critical links. For instance, it will "ping" a DHCP server or a Web site from an unspecified bit rate connection. That is, it will issue an echo request. All Internet hosts are required to send echo replies in response to an echo request and this is a simple way of finding out if a host can be reached.

A powerful aspect of embodiments of the present invention is the link that can be made between alarms detected by the various probes 335, 310 and other information such as services and customers affected and root component alarms. The data content of the alarms collected by the probes 335, 310 is of course important in this. This data content can be used in conjunction with the knowledge management system 225 to produce the necessary links.

IEMS Database
Component Alarm Information Database
　Each alarm generated has the following attributes:
　　IP Address
　　Equipment/module/port
　　Date/time of occurrence
　　Location, in particular where physically in the network (NHE, RHE, HUB)
　　Detailed description (in an "operator" comprehensive text)
　　Severity
　　Type of alarm (fault, performance, security, fraud, configuration change, ...)
　　Actions to take/recommendations to fix the problem, for instance this might be in the form of a direct link to the right page and the right alarm in the trouble-shooting guide or the right procedure
　　Additional links to useful documentation
　　　Procedures, docs, troubleshooting guide, installation guide, ...
　　　Engineering documentation (technical architecture, detailed design)
　　　Operational procedures
　　　Configuration files
　　　Vendor's documents
　　　Link to vendor's Web site
　　Status, such as new, deleted (TBC)
Service Alarm Information Database
　Each alarm generated has the following attributes:
　　Type of service
　　　Internet Access
　　　Service Provisioning
　　　ISP Services (such as Email ...)
　　　Security/fraud
　　　Performance
　　　Management (ie part of IEMS tool, like ISM, PC Simulator, ...)
　　Location
　　Detailed description
　　Alarm management
　　　New, acknowledge, update, close, delete, assign to (whom)
　　　When the status changes, store and display date/time, name of the operator and comment
KMS
KMS Tool
　KMS tool is a Web-based application allowing operators to:
　　Browse content
　　Add/Modify/Update content (according to access profile)
　　Search documents with a textual search engine
　The KMS tool is accessible from all screens of IEMS, and also directly from a browser by typing the right URL.
KMS Content
　The content of KMS is as exhaustive as possible; this is one of the major values of the IEMS product. The following lists the different sources of information available for all equipment of the HSD network:
　　Installation procedure
　　Configuration guide/files
　　Troubleshooting guide
　　Maintenance manual
　　User manual
　　Operations Manuals
　　Engineering documents
　　End To End Architecture
　　FAQ
　　Glossaries
　　Contact lists
　　Vendor's URL
GUI
Functional Role As mentioned above, there are different categories of people who are going to use IEMS and who are therefore provided with GUIs, these being users responsible for network, service and customer operations. For each type of user, there ate different levels of access defined, such as basic and advanced. For instance, a skilled operator's user should be able to create rules. Navigation within the different screens is designed to be intuitive, in order to minimize the technical skills needed by users.

Service operations GUI 115

Figure 30:
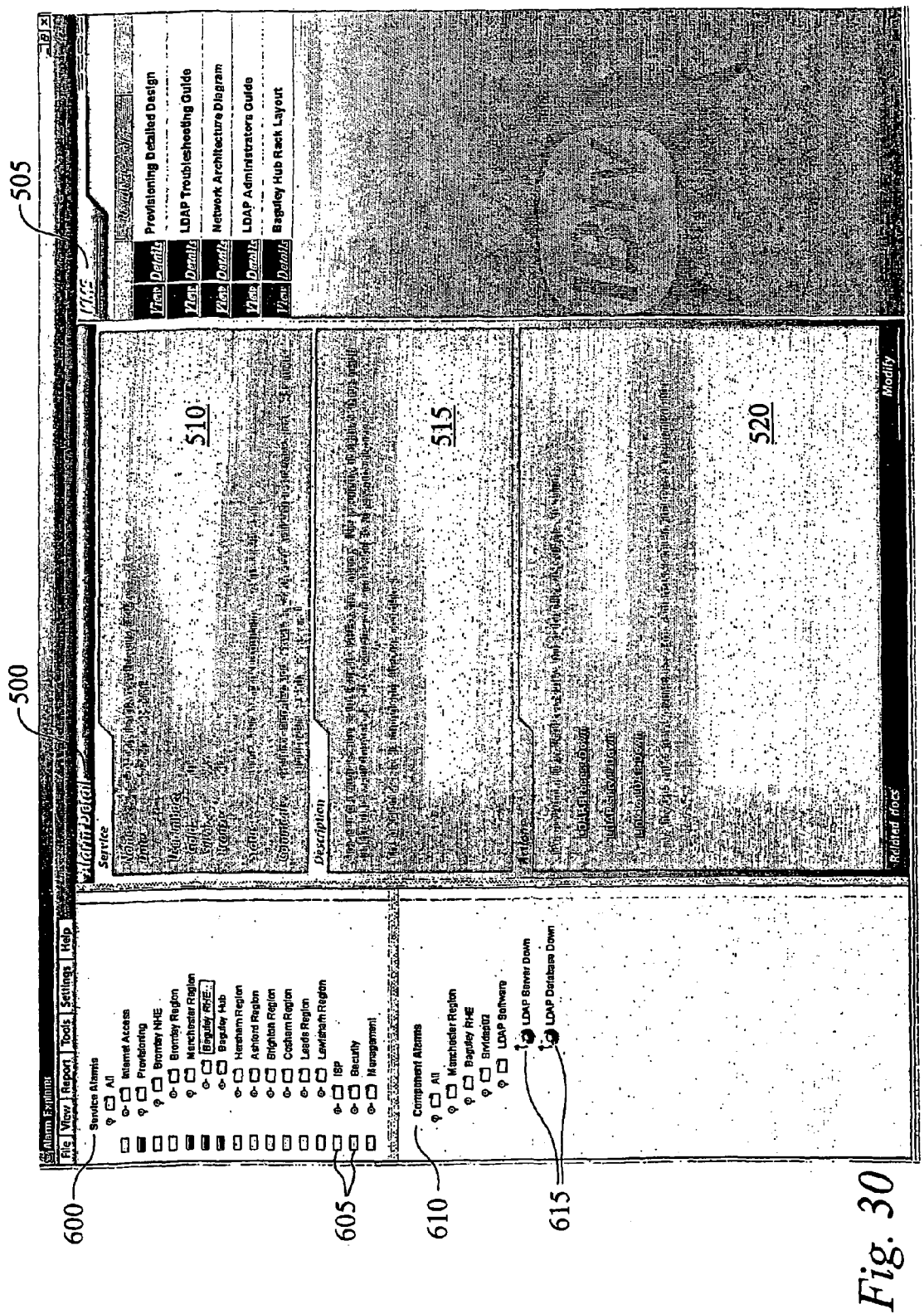
FIG. 30 shows a screen view from a graphical user interface reviewing an alarm by means of the network management system, with access available to a knowledge management system for further analysis.
Figure 31:
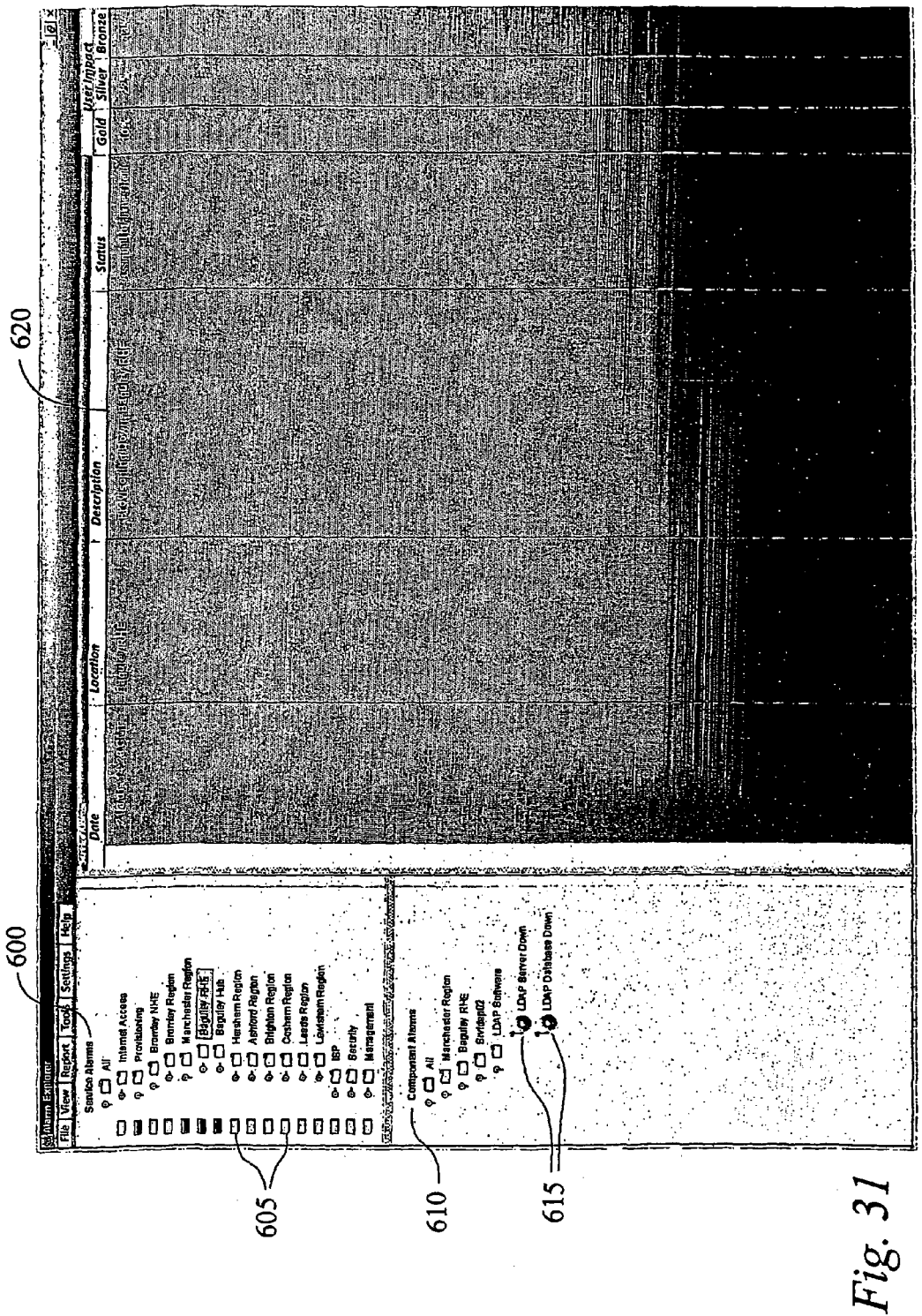
FIG. 31 shows a screen view from a graphical user interface reviewing an alarm in terms of user impact.

This GUI is fully Web-based and should be accessible through a low bandwidth link (typically 56 kbs). It shows:

Service status per service type/per location
Service outage list with % of users impacted/type of users impacted
Statistics of service outage per location/per type of service/per type of user
Planning (network bandwidth, IP Scope, System resources, . . . )
KMS: service related information
Information on location: postal address, manager's name/phone/email Customer Operations GUI Referring to FIGS. 30 and 31, the information that embodiments of the present invention can make available to a user in a customer operations centre 110 clearly links problems arising at the network level with the impact on customers. Further, it links service alarms with component alarms in relation to the same part of the network. FIG. 30 shows a screen available to a service operator in the customer operations centre 110 and FIG. 31 shows a screen available to a customer operator. FIG. 31 is simpler and has been taken first in the description below.

FIG. 31 shows a menu of potential service alarms 600 together with indicators 605 as to whether there is an alarm of that type ongoing. The potential service alarms 600 include five categories of service alarm which are being monitored:
  Internet access
  Provisioning
  ISP
  Security
  Management An indicator 605 for the provisioning service alarm is darkened, indicating a current provisioning service alarm. A user has clicked on the "Provisioning" box which has had the effect of drilling down to location information in respect of the ongoing alarm. The location information shows that there is a problem in the Manchester region of the Bromley NHE. Clicking on the Manchester region has opened up the Baguley regional head end and the Baguley hub locations as having problems in provisioning. The user has selected the Baguley regional head end in order to get further information.

Below the Service Alarms 600 section of the screen, there is a Component Alarms 610 section. This shows the user has drilled down to expose two component alarms 615 relevant to the Baguley provisioning problem in the regional head end, and gives the diagnosis that the LDAP server and database are down.

The main portion 620 of the screen is given to a "Service Alarms" screen showing management information in respect of the alarm in the Baguley regional head end for which the user has selected to drill down to the component alarms. This management information shows date, location, description, status and user impact. Importantly, the status data shows how the problem is being dealt with (it has been assigned to James Reid) and the user impact data shows what category of customer is hit by the problem. In this case 10% of gold customers, 22% of silver customers and 43% of bronze customers are affected.

Referring to FIG. 30, the service operator has access to much more detailed information by pulling in data using the KMS 225. Here, the user has selected an "Alarm Detail" screen in place of the "Service Alarms" screen. This has three sections. Firstly, in a "Service" 510 section of the screen, there is similar information to that shown to the customer operator on the "Service Alarms" screen described above, except that there is also now an estimated correction time of 25 minutes. Secondly, in a "Description" 515 section of the screen, there is information about the impact and importance of the problem. In the example in FIG. 30, customers are unable to do any provisioning and the problem is said to be critical with immediate action required. Thirdly and importantly, in an "Action" 520 section of the screen, the identified component alarms likely to be causing the problem are offered as links to a search engine for searching for information using the knowledge management system 225 about these component alarms.

It can be seen from the right hand section 505 of this screen, dedicated to the KMS 225, that the search engine has already been launched in respect of the component alarms listed in the "Action" 520 section of the screen to offer five sources of information relevant to correcting the problems, from the provisioning detailed design through to the Baguley Hub Rack layout. This is a powerful aspect of embodiments of the present invention in that targeted data from so many sources can be accessed.

This GUI is Web-based and therefore accessible through a low bandwidth link.

The primary types of information given which are accessible via the Customer Operations Centre 110 are:
Service status per service type/per location
Service outage list with % of users impacted/type of users impacted
Statistics of service outage per location/per type of service/per type of user
KMS with custom operations information, such as FAQ, etc. . . .
CPE manager (see "Tools")

Network Operations GUI 100

Figure 32:
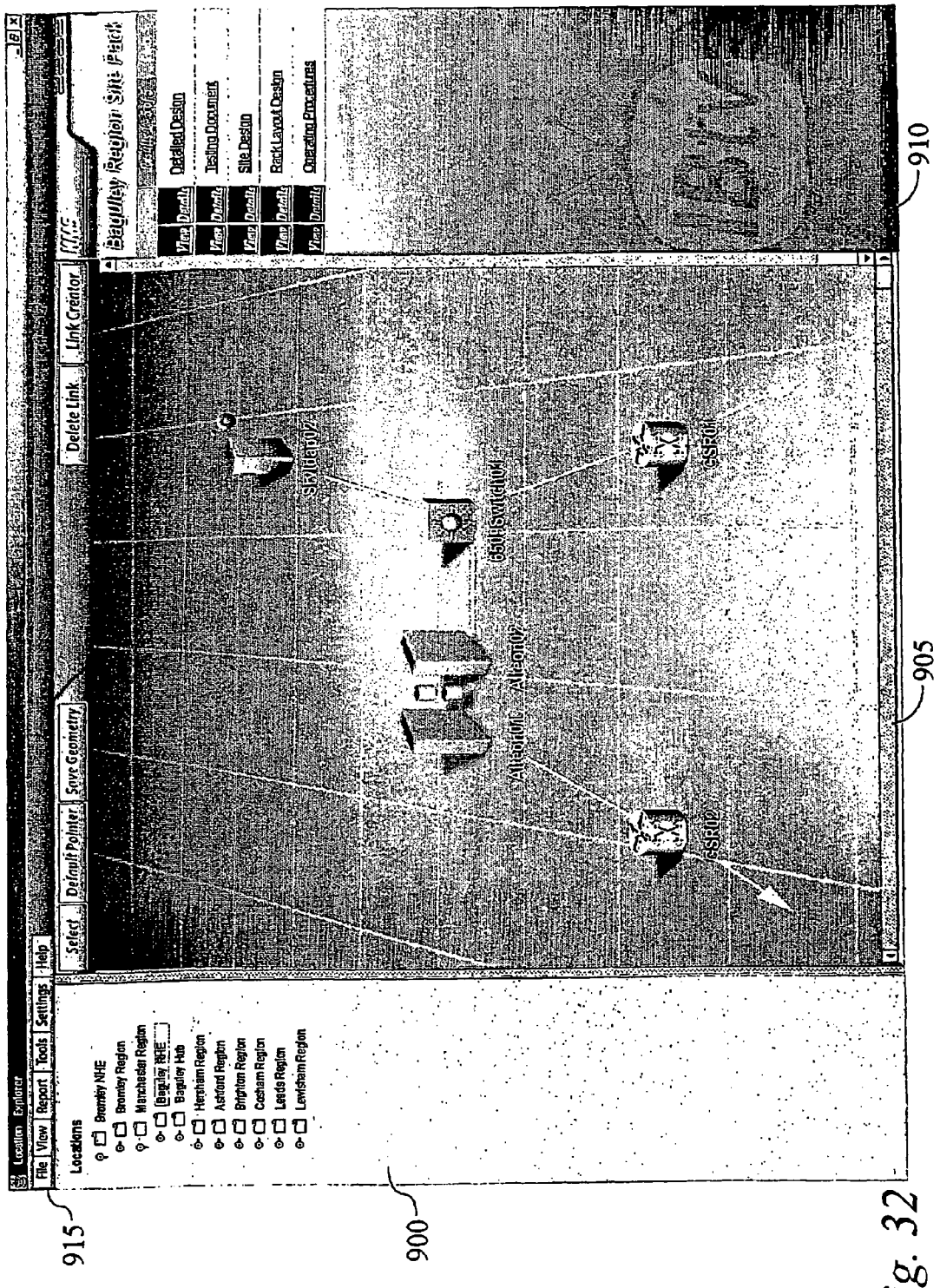
FIG. 32 shows a screen view from a graphical user interface reviewing an alarm with reference to its network location, with access available to the knowledge management system for further analysis.
Figure 33:
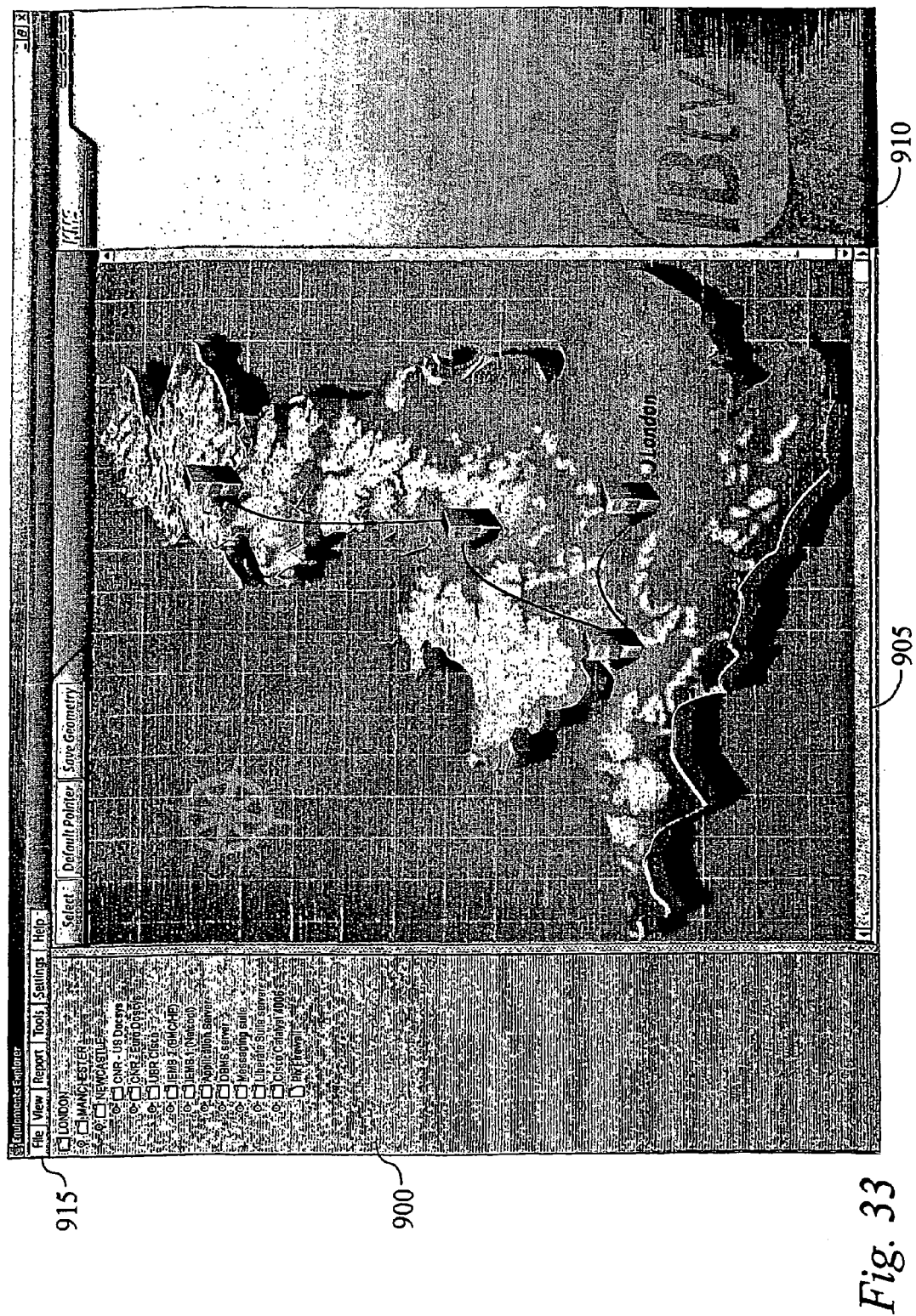
FIG. 33 shows a screen view from a graphical user interface providing equipment information, with access available to a knowledge management system for further analysis.
Figure 34:
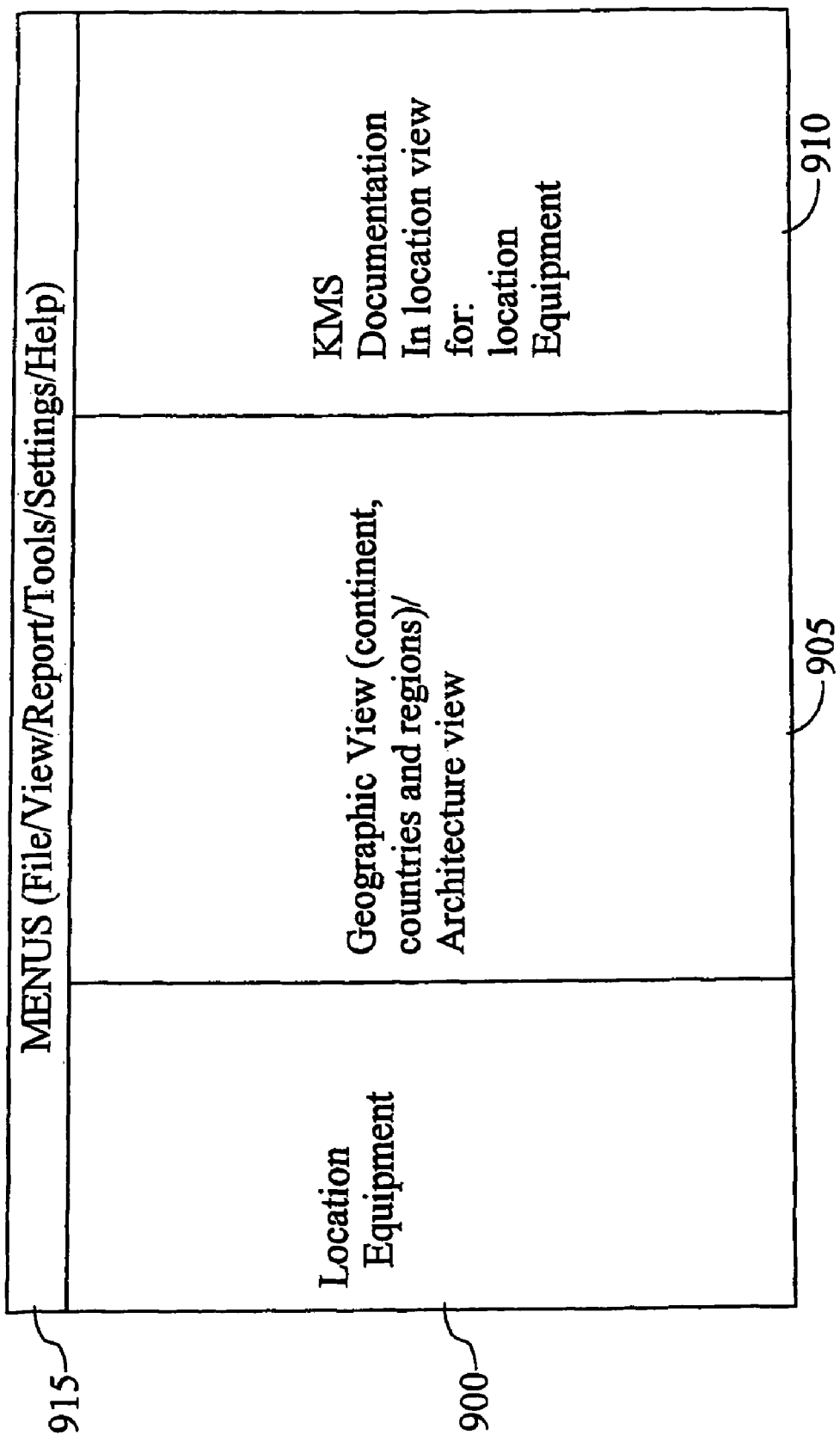
FIG. 34 shows the options available for a screen view layout as shown in FIG. 33.

Referring to FIGS. 32, 33 and 34, a network operator, usually working in the network operations centre 105, has access to the fill set of functionalities described above in relation to FIGS. 30 and 31 together with additional capabilities. These are accessible via the following:
  Location explorer
  Alarm explorer
  Full KMS access (service and component related information)
  Full set of tools
  Rules editor This GUI 100 is not necessarily fully Web-based.

FIGS. 32 and 33 show two screens in particular giving the network operator information on equipment at two different levels. FIG. 32 shows the Location Explorer screen for equipment located at the Baguley regional head end and FIG. 33 shows the Equipment Explorer screen for a route connecting London to Newcastle. FIG. 34 shows the overall layout of the Location and Equipment screens. This is that the user has a selectable list 900 of Locations and/or Equipment to the left, a central view of the relevant geographic or architectural layout 905 of network equipment and KMS access 910 to the right. A way the user can interact with these views is via a set of pulldown menus 915 at the top and further detail of these pulldown menus is as follows:
Menu Detail:
File
  Login
  Logout
  Quit
View
  Alarm Explorer
  KMS (y/n)
  Location
    All
    Regional Report
  Summary
  By location
  By service
  By users
Tools
  Telnet
  MRTG
  - - -
  KMS
  IP Address management
  IP provisioning query
  DHCP LOG
  - - -
  BMC Patrol
  HP OpenView
Settings
  KMS setup
  Inventory setup
  Correlation setup
  Graphics setup
    Select Mode
    Create Link Mode
    Save Geometry
Help
  About
  Location Explorer Help The Alarm Explorer screens available to service and customer operators in the Customer Operations Centre 110 are described with reference to FIGS. 30 and 31 above. However, the Alarm Explorer screens available to the network operator in the Network Operations Centre 105 and their associated navigation menus give access to different content.

Figure 35:
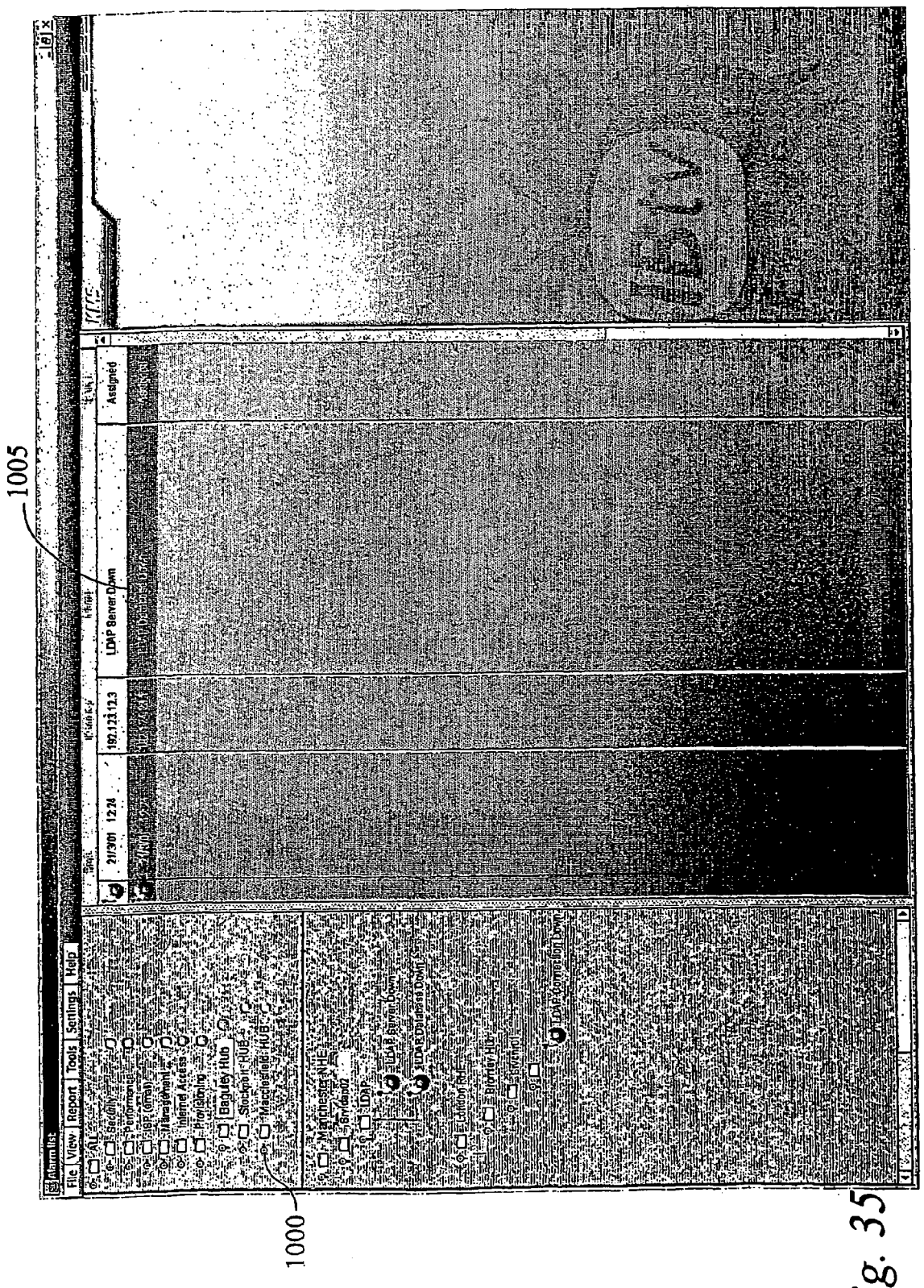
FIG. 35 shows a screen view from a graphical user interface providing an alarm list with access to the knowledge management system for further analysis of selected alarms.

FIG. 35 shows an alarm list for a user selection from a list of all alarm types 1000. The user has selected to get further information on ongoing alarms associated with the Baguley hub and status information 1005 is shown for two alarms affecting the hub, "LDAP server down" and "LDAP database down". The status information is that both of these have been assigned.

Figure 36:
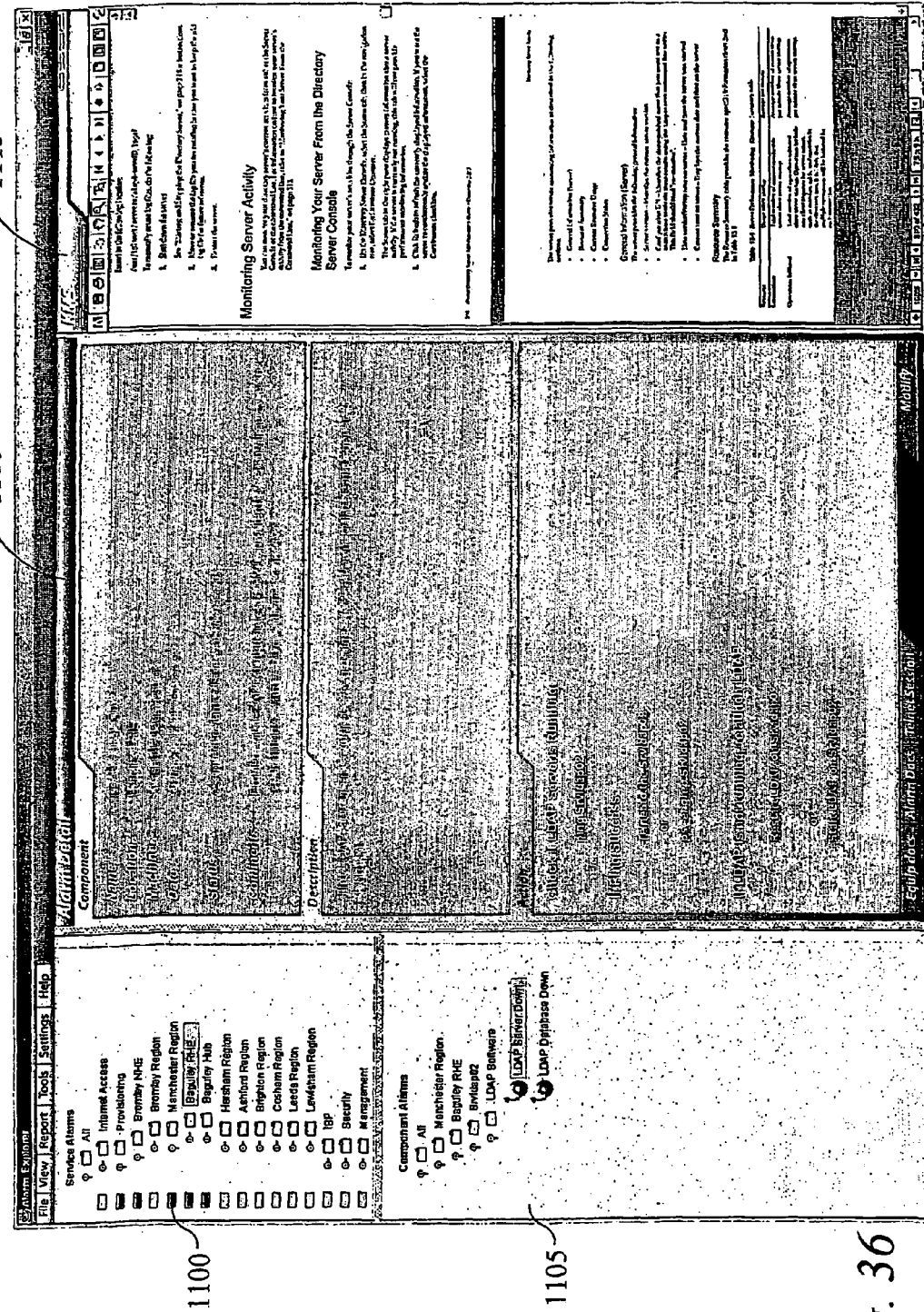
FIG. 36 shows a screen view similar to that of FIG. 30 in which the knowledge management system has been accessed for further relevant information.

FIG. 36 shows the Alarm Explorer screen for tracing component alarms 1100 relevant to ongoing service alarms 1105. In this case, the network operator has selected the Baguley regional head end and the service alarm associated with the Baguley regional head end is shown to be related to the same two component alarms as the Baguley hub, "LDAP server down" and "LDAP database down". The network operator has selected one of these, "LDAP server down", for Alarm Detail. In a manner equivalent to the Alarm Explorer capability for the service operator, shown in FIG. 30, the Alarm Detail section 1110 has brought up comments on the component involved, a description of the problem and action to take. A search has been run using the KMS 225 to bring up related documentation in the KMS portion 1115 of the screen.

Figure 37:
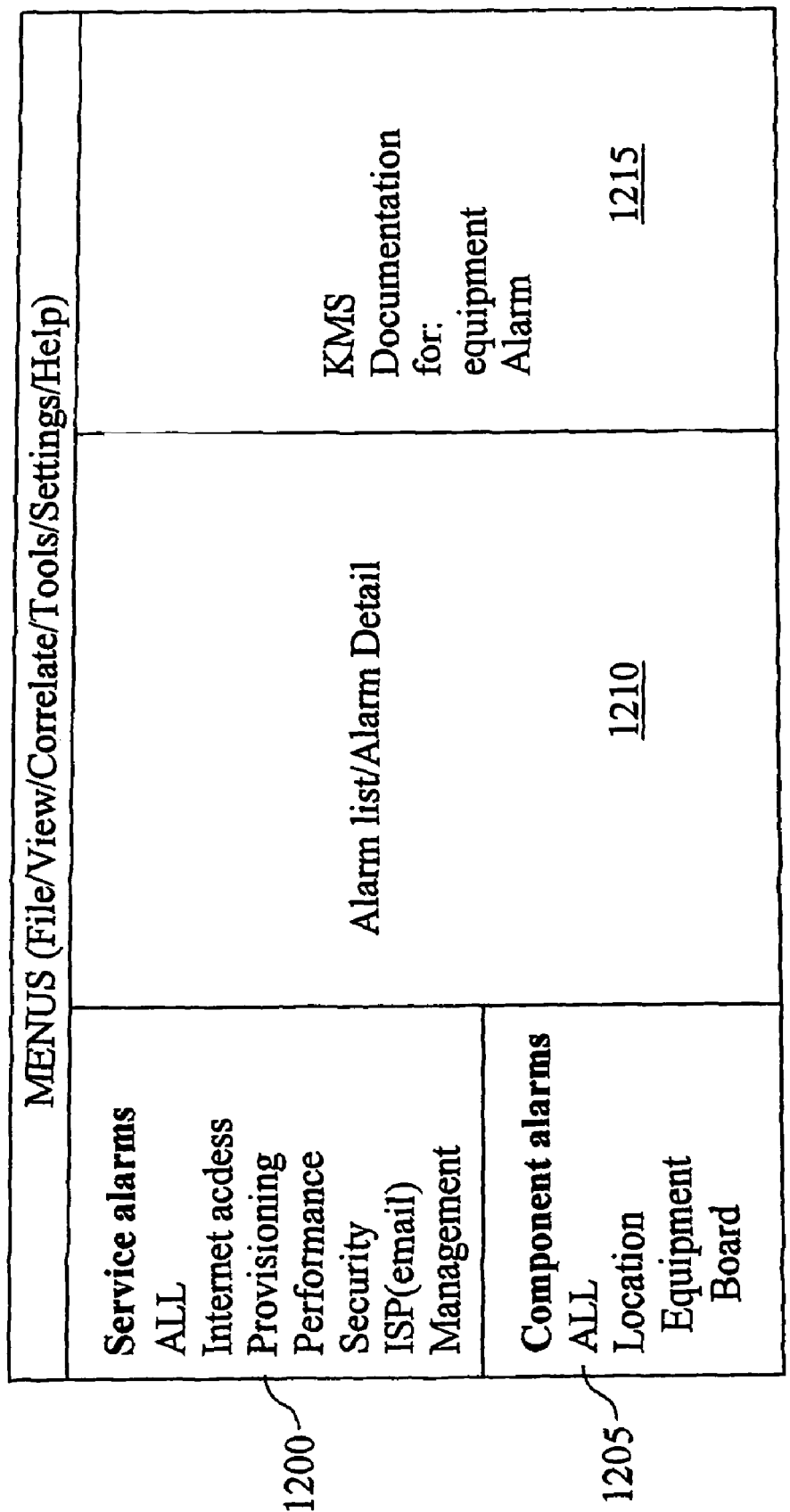
FIG. 37 shows the options available for a screen view layout as shown in FIG. 36.
Figure 38:
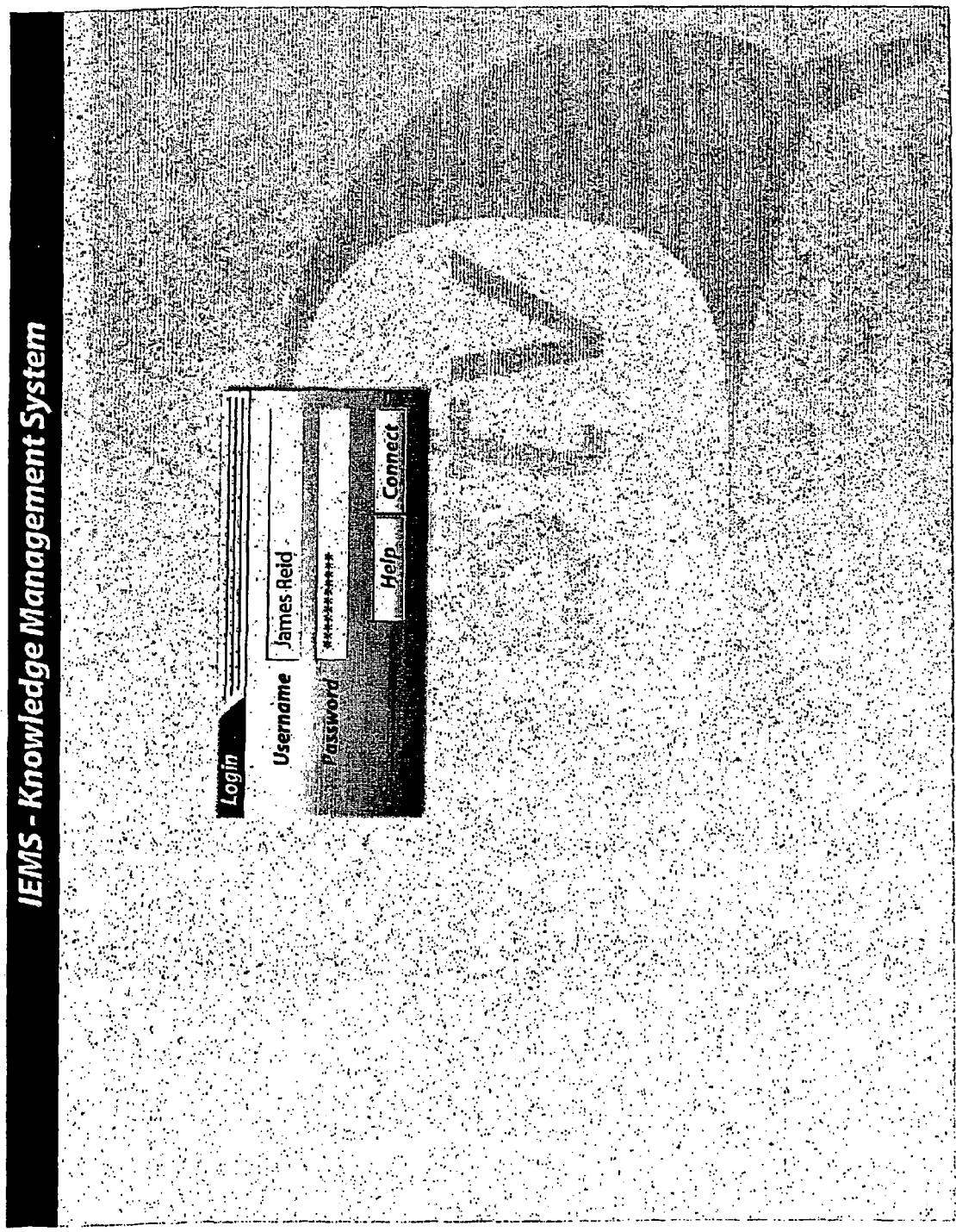
FIG. 38 shows a login screen for a user accessing the knowledge management system.
Figure 41:
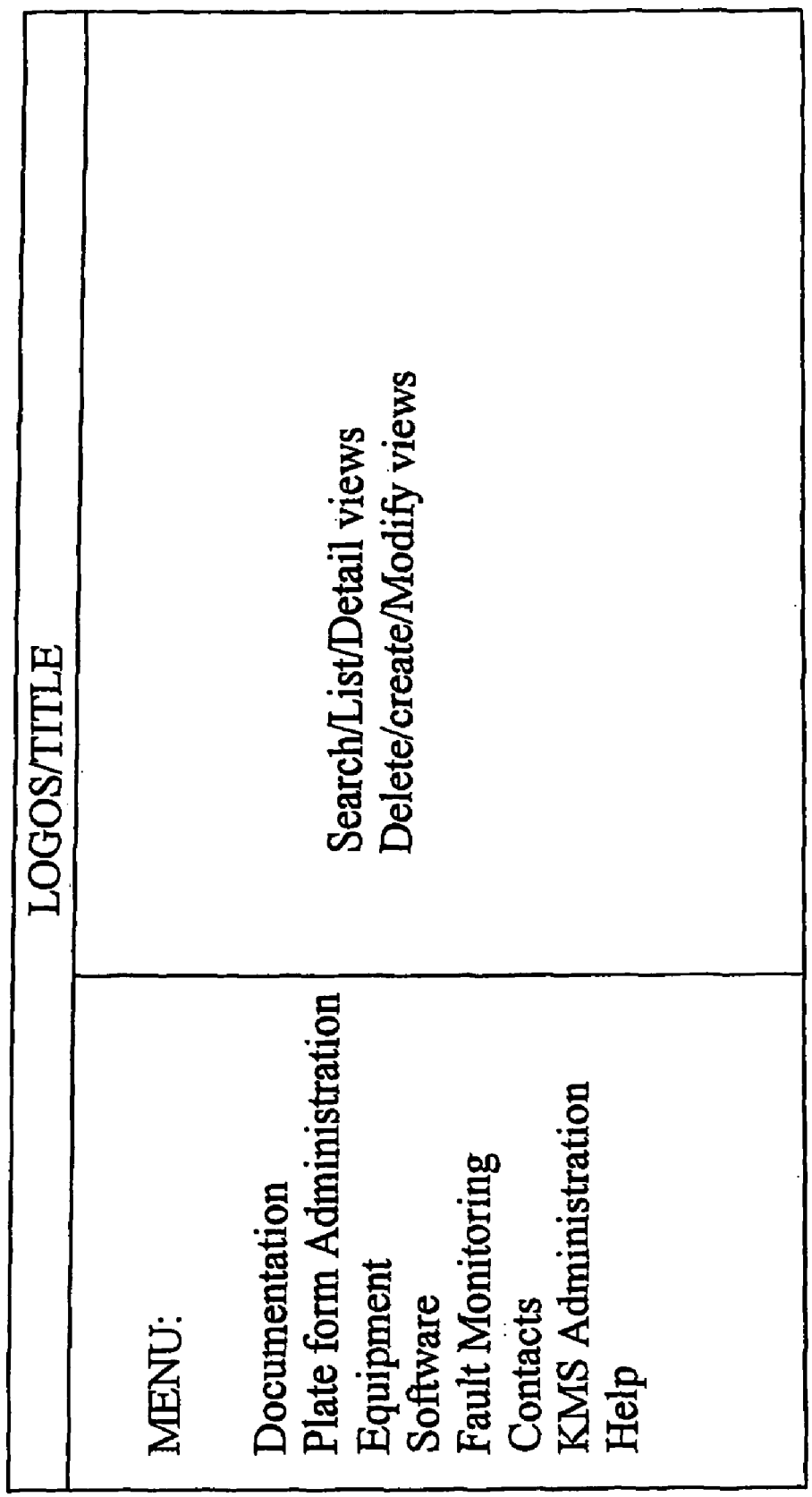
FIG. 41 shows the options available for a screen view layout as shown in FIG. 39 or 40.

FIG. 37 shows the overall layout of the Alarm screens of FIGS. 35 and 36. This is that the user has a selectable list of Service Alarms 1200 and a selectable list of Component Alarms 1205 to the left, a central view of the relevant Alarm List or Alarm Detail 1210 and KMS access 1215 to the right. A way the user can interact with these views is again via a set of pulldown menus 1220 at the top and further detail of these pulldown menus is as follows:
Menu Detail:
File
  Login
  Logout
  Quit
View
  Location Explorer
  KMS (y/n)
  Sort alarm list
    By nb user impacted
    By service impacted
    By location
Correlate
  Find root alarms
Tools
  Telnet
  MRTG
  - - -
  KMS
  Re-segmentation
  IP Address management
  IP provisioning query
  DHCP LOG
  - - -
  BMC Patrol
  HP OpenView
Settings
  KMS setup
  Inventory setup
  Correlation setup
  Others
Help
  About
  Alarm Explorer Help In the above, correlation and sorting mechanisms are mentioned. These are both further discussed below.

It is possible for a user to run the KMS 225 directly to locate information in the documentation available to the KMS. FIGS. 38 to 41 show example screens and the content of the navigation menus in this respect.
Menu Detail:
Documentation
  Vendor manual
  Engineering documents
Platform Administration
  Procedures
  Configuration files
Equipment
  Inventory
  Equipment types
  Links
Software
  Inventory
  Software types
  Links
Fault Monitoring
  Component alarm classes
  Service alarm classes
  Services
  Impact
Contacts
  People
  Sites
  Companies
KMS Administration
  Users administration
  Other tables
  SQL requests
HELP
  About
  KMS Help Correlation and Sorting From the Alarm Explorer screen, and referring back to FIG. 28, a user can launch a correlation engine 300 by choosing an appropriate menu. The goals of correlation in embodiments of the present invention are (depending on the user) to link a service alarm or a location either to impacted subscribers or to associated components. Linking to impacted subscribers can be used to give a measure of the importance of the problem and linking it to associated components can be used to put the problem right. The identification of impacted subscribers might be done in more than one way. Three examples are to:

- select all subscribers associated with a location by reviewing a list of customer premises equipment MAC addresses mapped to the location
- select some of the above subscribers according to a further selection criterion
- run an IP address management application which provides details on subscribers impacted The identification of associated components might also be done in more than one way. Two examples are to:

- generate a full list
- use correlation rules to find and display only root component alarms Once the impacted subscribers and the associated components have been identified, it is possible to sort them in various ways. For instance, the type of service affected can be sorted against location, against the number of subscribers impacted or against the type of subscribers impacted. For instance the types of subscribers might be coded as VIP, gold and the like.

Defining Rules

The rules for reporting are preferably stored in a database and preferably viewable and modifiable by means of a graphical user interface. A conventional expert system may be employed to manage and update the rules. Some rules may be general rules and others may be tailored to a particular environment.

Trouble Reporter

Referring again to FIG. 28, another Web-based application which can be provided in embodiments of the present invention, and will be accessible to users via the network operations GUI 100 and the service operations GUI 115, is a trouble reporter 305. This can provide service-related statistics for use for example in managing service level agreements. Useful data in this respect can be accumulated by day, week or month on the following:

- service impacted
- number of alarms
- localisation
- severity
- subscribers impacted in terms of number and/or type
- start/end date/time Other statistics which might be desirable via the trouble reporter 305 are the identification of recurring failures, mean time to repair, percentage availability and the like.

A series of tools 220 may be supplied in embodiments of the present invention which can be run separately by means of the GUIs but which might also support the main functions concerned with alarm and service analysis. These tools can provide a very rounded and flexible approach to service management in a complex network environment.

A first of these tools 220 for instance might be an IP address management tool which allows a number of address aspects to be reviewed as follows:

Checking an IP address by selecting a subscriber's IP address and then—
- the MAC address of the subscriber's device
    - MAC address and IP address of associated cable modem (if MAC address is different)
    - Associated DHCP server IP address
    - Associated CMTS IP address
    - Associated LDAP IP address
    - Subscriber's details (i.e., name, address, credit status . . . )
    - List of services used (HSD Gold, . . . )

Checking an IP address by selecting an infrastructure IP address and then—
- Equipment name
- Equipment location
- List of software running on it (if appropriate)
- (Optional) Details of software (e.g., login, password, . . . )
- (Optional) List of related equipments (if appropriate—e.g., CMTS—uBR)

Additionally, this tool can be used to return statistics on the utilisation of IP address scopes on a DHCP server basis. For each server the application returns the list of managed scopes. For each scope the application returns:

- Scope name
- Scope range
- Private/public
- Scope utilisation
- Associated DHCP server IP address
- Associated CMTS IP address
- Time of last update (i.e., the last time the statistics were gathered)

Lastly, this tool can be used to display a list of equipment, in terms of name, type and IP address, sorted by location.

Another of the tools 220 might be used to launch a Telnet session with specified equipment.

A DHCP server tool can be arranged to parse the DHCP log file from CNR servers in order to extract useful information such as failure of a cable modem provisioning process, and/or to automate a progressive re-provisioning process in case of outage of a complete part of the network in order to avoid flooding the DHCP servers.

A CPE manager tool can be dedicated to address a specific subscriber or end-user request:

- Find out the status of a cable modem, from an IP address or a subscriber ID (in relation with the IP Provisioning Database)
- Check status of the associated HSD Service Simulator (same HUB/same segment as the subscriber), and compare it to the subscriber's problem
- Associate subscriber with a current service outage
- Reboot subscriber's cable modem, change/update service class (gold/Silver/Bronze), IP filters
- Monitor performance A maintenance forecast tool can be dedicated to send messages/postal mails/ . . . to customers when a forecasted maintenance operation will have an impact on a specific service impacting them.

A resegmentation tool can process performance warnings (e.g. available bandwidth in a CMTS card) to propose resegmentation options.

Figure 43:
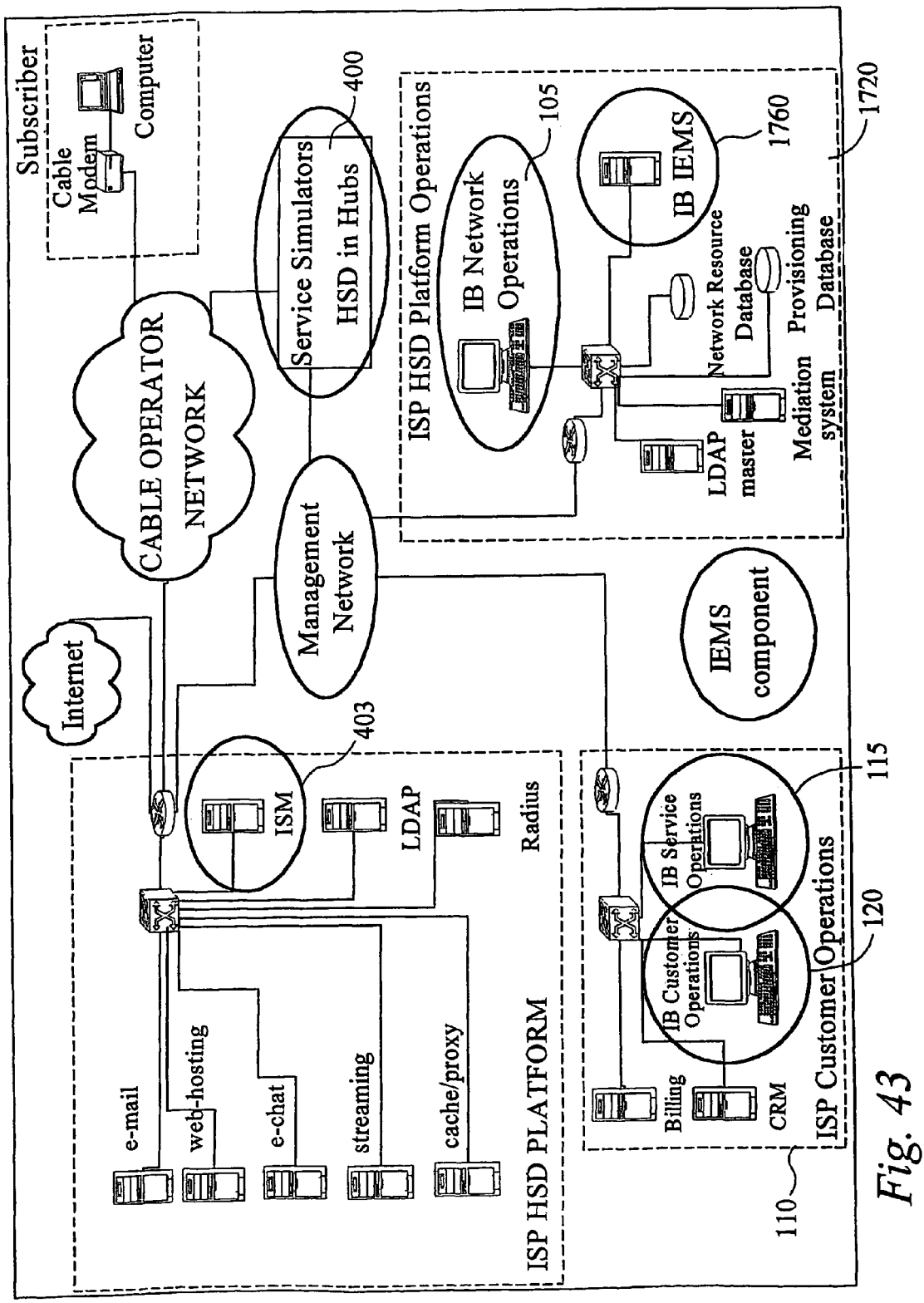
FIG. 43 shows a network context for the network management system in which a service provider uses the network management system to control the service provider's part of the network.

In FIG. 42 described above, an embodiment of the present invention is shown for the environment in which a global infrastructure provider controls the end to end network, up to the Internet Service Provider's platform. In FIG. 43, the equivalent arrangement is shown where the service provider uses an embodiment of the present invention to control the ISP part of network, but is also able to use the HSD simulator 400 installed within the hubs of the infrastructure provider.

In summary, the communications network management system is herein disclosed which can assist identification and rectification of faults on a network, particularly a broadband access network, leading to more effective service provision.

Further aspects and preferred features of the invention are further described in the following clauses:

A method of testing a broadband network, the network comprising a head end for receiving one or more communications services from service providers and transmitting the one or more services towards end user equipment, and comprising at least one node for receiving said one or more services from the head end and delivering the service(s) towards end user equipment, which method comprises launching a test signal to the network at said at least one node and monitoring a response by the network thereto.

The test signal may be launched by computing equipment provided at said at least one node. The test signal may be provided by an agent associated with the node. The method may further comprise receiving one or more control signals at said computing equipment (or agent), the control signals having been transmitted over the network to control said launch of a test signal. The test signal may be launched via a first signal path from the computing equipment (or agent) to the network and said one or more control signals may be received via a second signal path from the network to the computing equipment (or agent), said first and second signal paths being different. The first and second signal paths may differ at least in that said first signal path comprises transmission by a cable modem termination system. A selected one or more of a plurality of different test signals may be used. The agent or system may be programmed to launch one or more test signals at one or more predetermined times. One or more control signals may comprise means to trigger launch of one or more test signals by the computing equipment.

In one embodiment at least one node comprises a provisioning server, for dynamic assignment of addresses to end user equipment, and said test signal in use requires assignment of an address by said provisioning server and a monitored response comprises said assignment of an address.

One or more of said test signals may simulate a request received from user equipment for service delivery by means of the network.

The invention may provide a method of testing a broadband network, the network comprising a head end for receiving one or more communications services from service providers and transmitting the one or more services towards end user equipment, and comprising at least one node for receiving said one or more services from the head end and delivering the service(s) via a cable modem termination system towards end user equipment, which method comprises transmitting a control signal to an agent or other computing means at the node, said control signal comprising a trigger to launch a service request to the network via the cable modem termination system at said at least one node, said method further comprising monitoring a response by the network to the launched service request.

There may be provided a node of a broadband communications network, for receiving one or more communications services from service providers and transmitting the one or more services towards end user equipment, which node comprises an agent or other programmable end user simulation equipment for launching a service request to the network.

The node may further comprise a first signal path for delivering control signals to the simulation equipment and a second path for transmitting a launched service request from the simulation equipment to the network, said first and second paths being different. The second path may comprise a cable modem termination system.

There may be provided a network management system comprising a fault detector and fault processor for detecting faults in the network or services provided over the network, and for analysing detected faults with the purpose of generating solutions to the faults, wherein the system further comprises context sensitive help for providing information to the user in relation to one or more faults being analysed.

The context sensitive help may comprise a knowledge management system having a search engine and the search engine runs a search on data stored for the knowledge management system, said search being based on the one or more faults being analysed.

There may be provided a communications network management system, for receiving and processing fault reports in respect of a network and/or one or more services supported by the network, the system being provided with a data store for storing data in respect of said network and/or services and processes fault reports in the light of stored data to generate corrective solutions to received fault reports, wherein the system is further provided with at least one simulator for requesting service provision over the network such that the network and one or more services can be proactively tested. Preferably the simulator simulates user activity. The simulator may comprise an agent associated with a network component. Preferably the network is a broadband network and the simulator is provided at a node of the network.

There may be provided a communications network management system, which system comprises:
  a) an input for receiving fault reports in respect of a network and/or one or more services supported by a network,
  b) a data store for storing data in respect of said network and/or services,
  c) a fault processor for processing fault reports received via the input, using data stored in the data store, to generate corrective solutions, and
  d) a simulator for triggering a service provision response by the network wherein the simulator has an output to the network to trigger a service provision response, such that a fault report in respect of said response will be received at the input and processed by the fault processor.

The communications network management system may further comprise means to apply a generated corrective solution to the network and to trigger a service provision response by use of the simulator such as to validate the applied corrective solution.

The input for receiving fault reports may be adapted to receive both fault reports in respect of services provided by said network and component alarms from components of said network, and said fault processor comprises a correlation engine for correlating received fault reports in respect of one or more services with received component alarms.

The data store may be structured to hold one or more problem descriptions in addition to one or more fault reports and/or one or more component alarms, at least one stored problem description comprising data received in respect of historic component behaviour, said fault processor being adapted to access data received in respect of historic component behaviour for use in processing fault reports to generate one or more corrective solutions.

There may be provided a communications network management system, which system comprises:

a) an input for fault reports in respect of a network and/or one or more services supported by a network,
b) a data store structured to store data in respect of said network and services, and
c) a fault processor for processing fault reports received via the input to generate corrective solutions, wherein the data store is further structured to store customer data in relation to services and the fault processor comprises a correlation engine for correlating received fault reports in respect of one or more services with customer data, and wherein the fault processor further comprises sorting apparatus for sorting fault reports in an order determined by correlated customer data.

The systems and methods described above may further be implemented in conjunction with a Hybrid Fiber-Coax Manager, a description of which follows below. This application is described by way of example only and is not intended to be limiting in any way.

The Imagine HFC Manager (HFC-MGR) tool provides the customer service operator with different views of the HFC network to enable remote diagnosis and to reduce lead-time for problem resolution.

The resulting remote operations increase call centre efficiency and reduce manual transfers and interventions. The Imagine HFC Manager tool is designed to help customer service operators and network operators by offering visibility of various aspects of the platform from allocation of the bandwidth and packet loss, monitoring of network interfaces such as HUB and CMTS CARD, and HFC segmentation.

Figure 44:
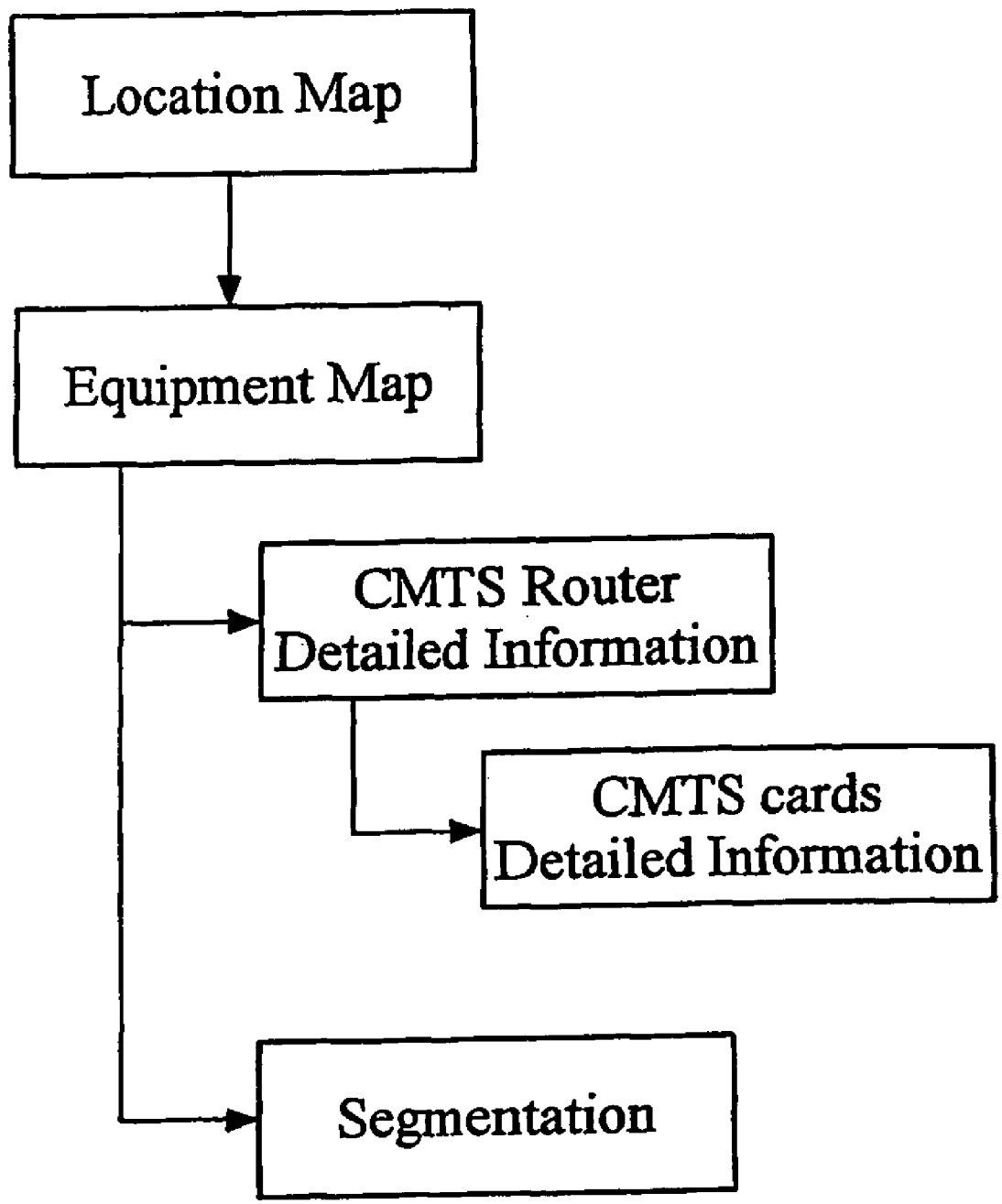
FIG. 44 shows a sample Hybrid Fibre-Coax manager deployment according to one embodiment of the systems and methods described herein.

FIG. 44 shows a sample HFC manager deployment. BFC manager is installed in a national data centre near Provisioning Database. Only infrastructure elements relative to HFC Manager are shown.

The HFC Manager application can be broken down into four main functional areas:
Location/Equipment tree.
CMTS Router Management.
CMTS Card Management.
Segmentation Management.

Figure 45:
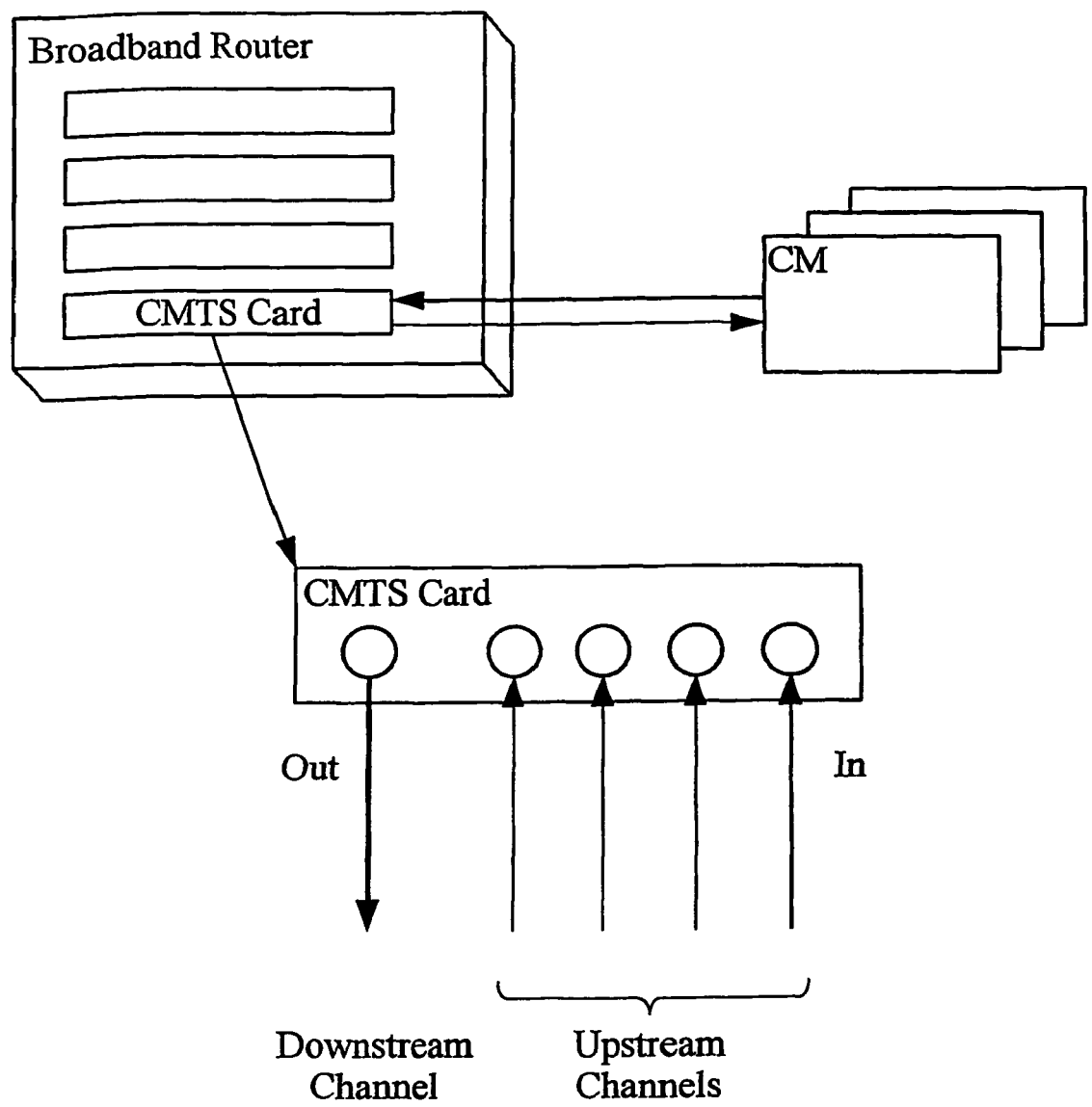
FIG. 45 illustrates CMTS router and CMTS card relationships according to one embodiment of the systems and methods described herein.

FIG. 45 illustrates CMTS router and CMTS card relationships.

Figure 46:
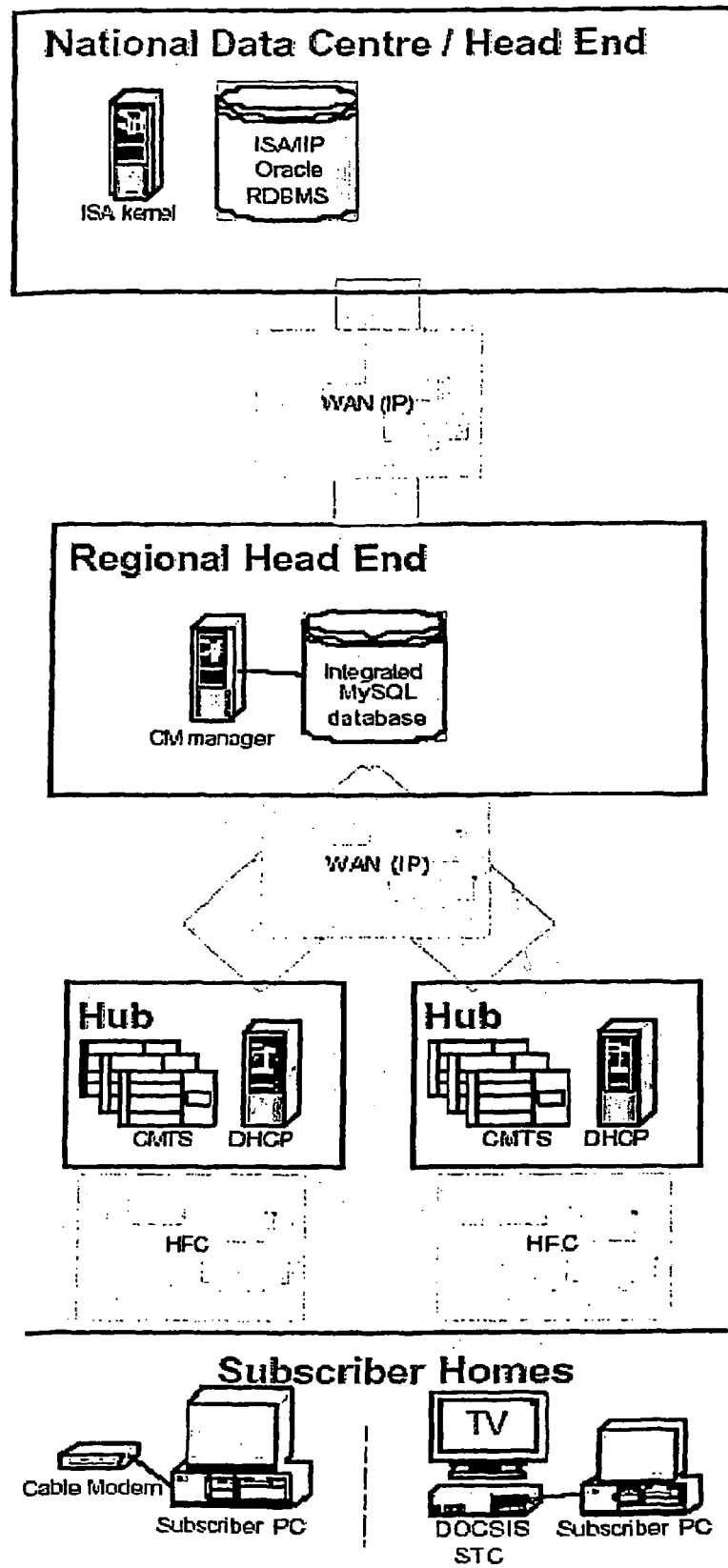
FIG. 46 shows an BFC manager user interface overview for a preferred embodiment of the systems and methods described herein.

HFC Manager will provide the user with the following views, accessible through a drill-down geographical tree:
A global National view, showing Regions information
A Regional view (National/Regional Head-End, Hubs), showing nodes information
A node view, detailing HFC segments information
FIG. 46 shows a user interface overview.

A user may drill-down through Countries, Regions or Equipments, or obtain open detailed information about CMTS router or CMTS cards.

In a first environment, the HFC manager permits a user to display different levels of the location tree and related equipment:
All Locations are attached to the country with a hierarchical tree: Region, NHE, RHE and attached HUB
All Equipment attached to any Location.
For instance all CMTS Router attached to a HUB, then all CMTS cards attached to a CMTS Router.

If a Country, region, NHE or RHE is selected in the first (location) environment, a second (display) environment displays the list of all available locations. The fields are as follows:
Location: depending on the selection in the first environment
If a Country is selected, the list of regions is displayed
If a Region is selected, the list of RHEs, NHEs and HUBs is displayed
Total HP: number of "Home passed". A "Home passed" represents the number of Cable Modems or Set-Top Boxes we can potentially connect.
Total CM-STB: number of Cable Modems or Set-Top Boxes actually connected
Penetration: Total CM-STB as a percentage of/Total HP
Bronze: number of Cable Modem or Set-Top Boxes with Bronze Quality of Service
Silver: number of Cable Modem or Set-Top Box with Silver Quality of Service
Gold: number of Cable Modem or Set-Top Box with Gold Quality of Service If a HUB is selected in the first environment, the second environment displays information on SNR, downstream/upstream bandwidth, and CM for all CMTS cards in this CMTS Router. The fields are as follows:
CMTS: CMTS card identification e.g. "Cable3/0"
CMTS Router: CMTS Router path e.g "ubr01soph.ib.sophia.com"
SNR min: in db, Signal to Noise Ratio. Minimal Signal/Noise ratio as perceived from this CMTS card.
SNR max: in db, Signal to Noise Ratio. Maximal Signal/Noise ratio as perceived from this CMTS card.
Downstream bandwidth: in bits, the bandwidth of this downstream channel.
Uptream bandwidth: in bits, the bandwidth of this upstream channel.
CM number
Registered CM number If a CMTS Router is selected, or if an CMTS Router is selected, detailed information for this CMTS Router can be displayed. Information is displayed in two main sections; one for CMTS Router detailed information and the other for CMTS downstream/upstream data.

The information displayed is as follows:
System Description: a text description of the entity. This value includes the full name and version identification of the system's hardware type, software operating system, and networking software
System Up Time:
Memory Daily Graph: graph of memory utilisation
Overall CPU 0 Load:
Current Load
Daily Graph
Interface FastEthernet 0/0
Status
Daily Graph
Interface FastEthernet I/0
Status
Daily Graph For all CMTS cards, downstream and upstream information can be displayed as follows:
CMTS CARD general information
Number of Cable Modems
Number of Cable Modems registered (online)
Number of Flapping Modems
Check Segmentation
CMTS CARD Downstream information
Total bytes OUT
Total discard OUT
Traffic Analysis/Daily Graph
CMTS CARD Upstream information
Codewords received without errors
Codewords received without correctable errors
Codewords received without uncorrectable errors Current SNR in dB
Signal Noise Ratio Analysis/Daily Graph
Traffic Analysis/Daily Graph
Total bytes IN in Mb
Total discard IN in packets It is also possible to perform a segmentation audit. The user edits segmentation parameters and the process display shows if segmentation is needed or not.

The segmentation process uses three methods that provide three different results.

Method 1: If the total number of CMs registered on the network is greater than the edited Number Max of CM/Seg parameter, then segmentation is needed Method 2: If the total number of CM registered on the network, multiplied by the Bandwidth min parameter is greater than the Bandwidth parameter, then segmentation is needed.

This means that given the available bandwidth, the pre-defined minimum QoS is not guaranteed for all the CMs.

Method 3: If the total number of CMs registered on the network, multiplied by their maximum bandwidth (defined in their configuration file) and multiplied by the Contention parameter, is greater than the Bandwidth parameter, then the segmentation is needed since, given the available bandwidth and the contention, the QoS is not guaranteed for all the CMs.

Parameters used in segmentation include:
Bandwidth in Mb:: available bandwidth.
Two possible values:
24 Mbps for USDOCSIS
34 Mbps for EURODOCSIS
Number Max of CM/Seg: maximum number of CM used only for Method 1
Bandwidth min in Kb/s: minimum bandwidth available for all the CMs, without regard to their QoS. Used only for Method 2
Contention in percentage: 100% means that the bandwidth is shared between all the CMs, at the same time. Used only for Method 3.

The three results of the segmentation process can be displayed. For each of these three results, the value can be "segmentation needed"- or "segmentation not needed".

<<NB CM=>>: result of Method1
<<MIN=>>: result of Method2
<<MAX=": result of Method3

The principles and methods described herein will now be illustrated further by the following description of a Knowledge Management System (KMS), which may be implemented in conjunction with the methods and systems described above. This application is described by way of example only and is not intended to be limiting in any way.

The KMS tool is a web-based application that allows you to instantly access a variety of documents pertaining to your network equipment and to retrieve context-sensitive help relating to component and service alarms.

Figure 47:
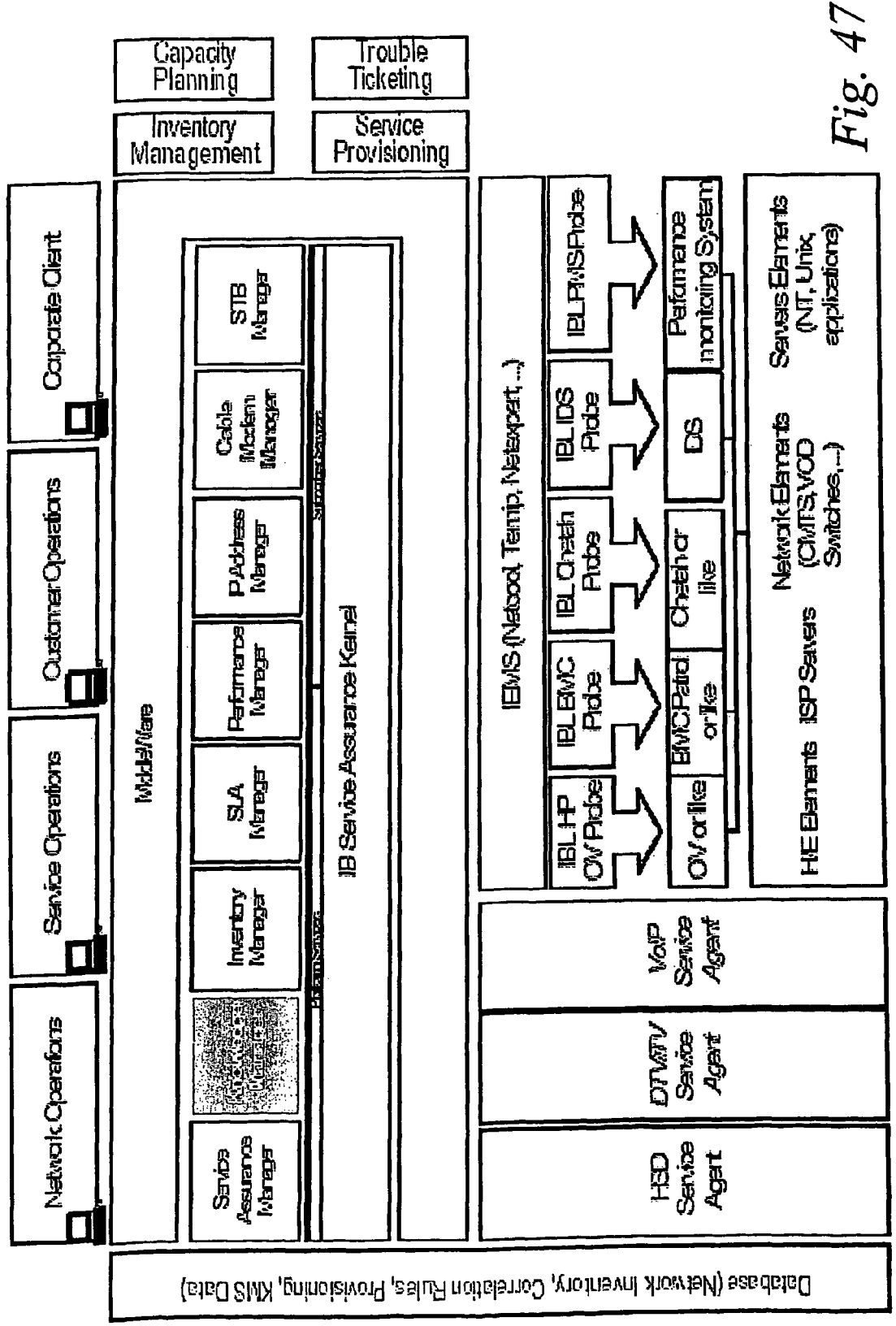
FIG. 47 illustrates a Knowledge Management System integrated with Imagine Service Emulation Agent modules according to one embodiment of the systems and methods described herein.

The Knowledge Management System can be integrated with Imagine Service Emulation Agent (ISEA) modules to simulate a subscriber access to Internet Service as shown in FIG. 47.

The following are examples of functions and associated method steps which may be performed using a KMS application:

Displays a List of Documents Based on User Input.

After selecting the type of document from the available options, for example vendor manual, engineering documents or procedures, a Document Selection display mode allows a user input corresponding to that type of document search criteria to apply can be chosen by selecting items from list boxes. If it is not desired to specify a particular type of equipment, type of software, or company name, then "All" can be chosen from the menu. This choice indicates that no specific selection has been made and provides a view of all documents corresponding to the remaining search criteria for all available types of equipment software and company names. If the exact reference for the document required is not known, it is possible to look for information according to subject. The following common information fields may be used:

Title
Author
Description
Equipment Type
Software Type
Company

The KMS screen displays a list of candidate documents from which a user can select Displays Detailed Information for a Selected Document.

Detailed information about all the documents found that correspond to an inputted search criteria may be displayed. Each document may be viewed in turn. Details include the author of the document, a description of the document, file format, version, and the document URL Manages Documents According to User Rights.

User rights define what actions a user will be able to take within the KMS tool. Possible actions include:

Adding a new document
Updating the detailed information for a document.
Deleting a document.
Views the Contents of a Document. It is Possible to View the Contents of a Document from the Document Details Display Mode by Clicking on the Document URL.

Figure 48:
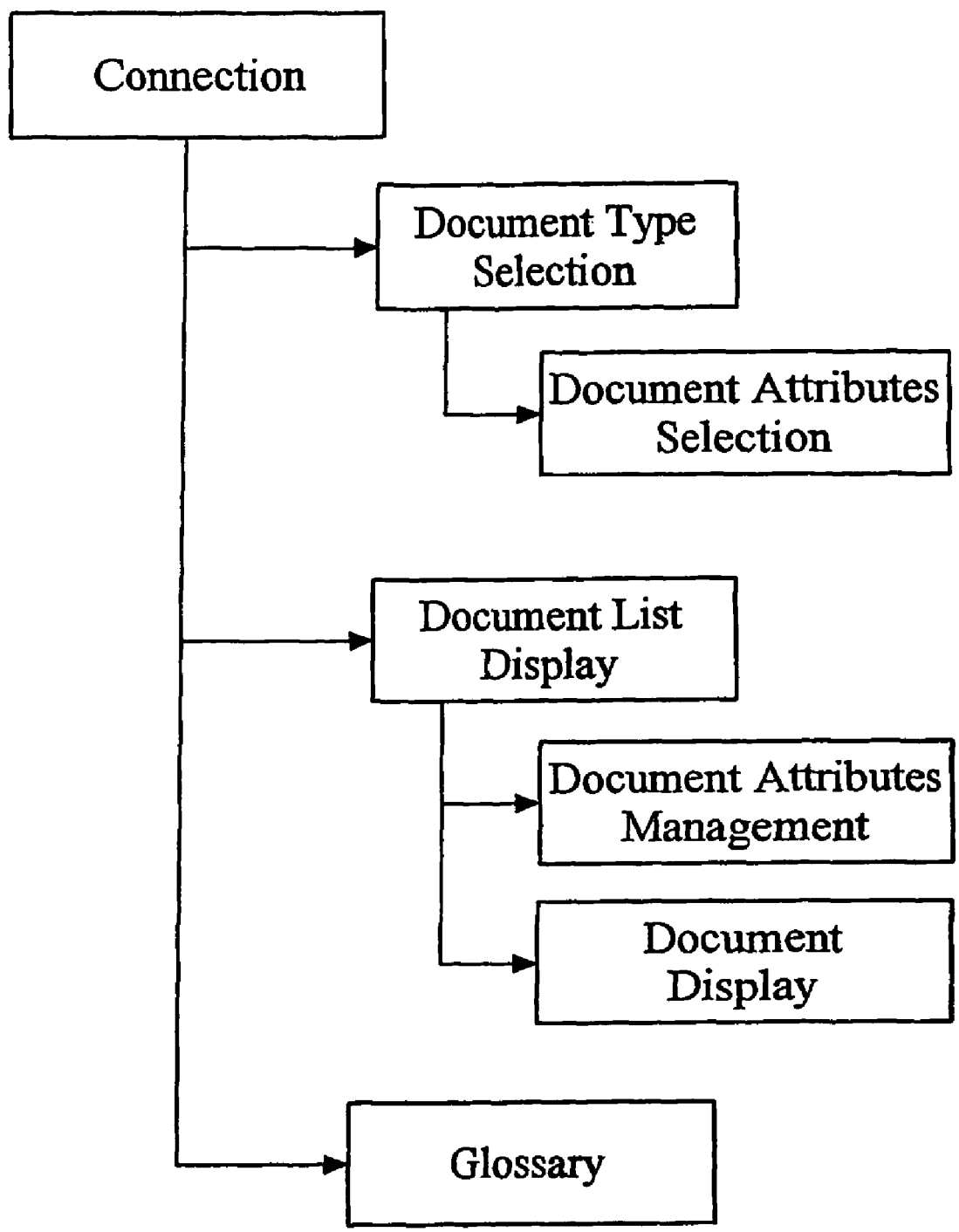
FIG. 48 illustrates a graphical User Interface structure for a preferred Knowledge Management System according to one embodiment of the systems and methods described herein.

The KMS may be operated via a Graphical User Interface architecture as shown in FIG. 48.

The principles and methods described herein may be implemented in conjunction with a Service Emulation Agents. The principles and methods described will now be illustrated further by the following description of the Service Emulation Agent (ISEA). This application is described by way of example only and is not intended to be limiting in any way.

Imagine Service Emulation Agent (ISEA) for HSD is a standalone system dedicated to monitor end-user High Speed Data Services, enabling remote diagnosis and reducing lead-time for problem resolution. It is physically located on the "last-mile" access network (typically one agent per HUB). Features provided include the following:

Sophisticated, permanently-running scenarios to simulate extensive HSD end user activity:
provisioning process
Internet access
ISP access
Security checks
Configuration of scenarios through scripting language (eg. XML).
Logging of service outages to local files.
Integrated Web Server for Service Alarms Monitoring.
Specific check on request (Dynamic Check), to provide help on failure diagnostics.
SNMP interface to an external SNMP manager (for example, HP OV, or Spectrum).
Reporting of Service Alarms to Service Manager, part of Service Assurance Product Suite.

Emulated Services Include
    Provisioning Process:
    Response time to get a new IP Address
    DHCP renew
    Alarm on timeout
    Internet Access
    Response time to access some (e.g. 20) popular web sites
    Alarm on timeout
    ISP Access (E-mail, Chat, News, etc.)
    Simulation of Mail Send and Receive
    POP/SMTP protocols
    Chat/news simulation (IRC or equivalent protocols)
    Response time
    Alarm on timeout
    Security Check
    Simulation of hacker attacks to test security holes, for instance:
        Ping on secured servers
        Open UDP/TCP sockets on secured server ports
        Alarm if successful
Dynamic checks may also be performed in much the same way as permanent monitoring, with activation through the integrated web-server on request.

Figure 55:
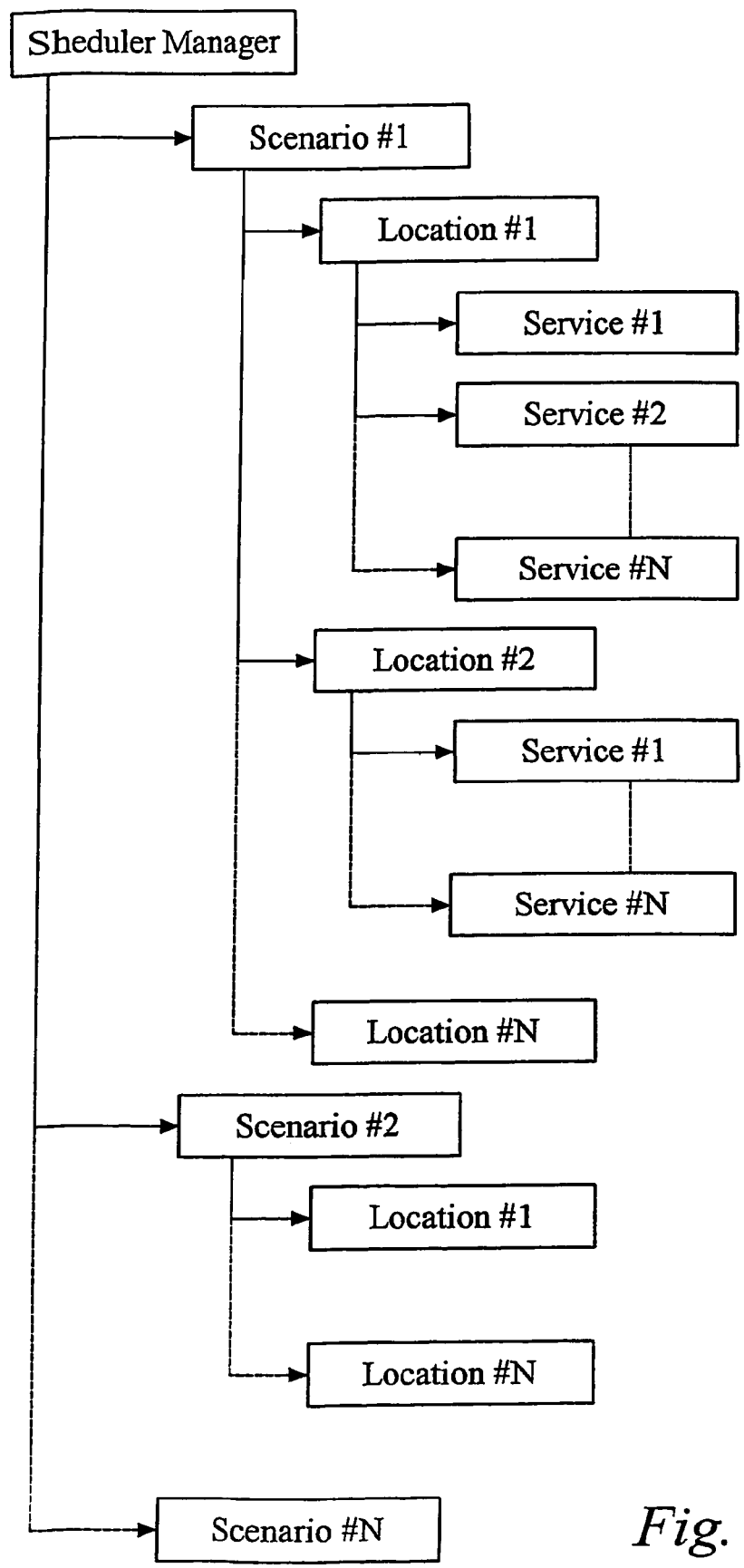
FIG. 55 illustrates scenario organization for an ISEA according to one embodiment of the systems and methods described herein.

A scenario is composed by:
    The name of the scenario
    The different locations concerned by the scenario
    The different services concerned by the scenario
FIG. 55 illustrates scenario organization.

Figure 56:
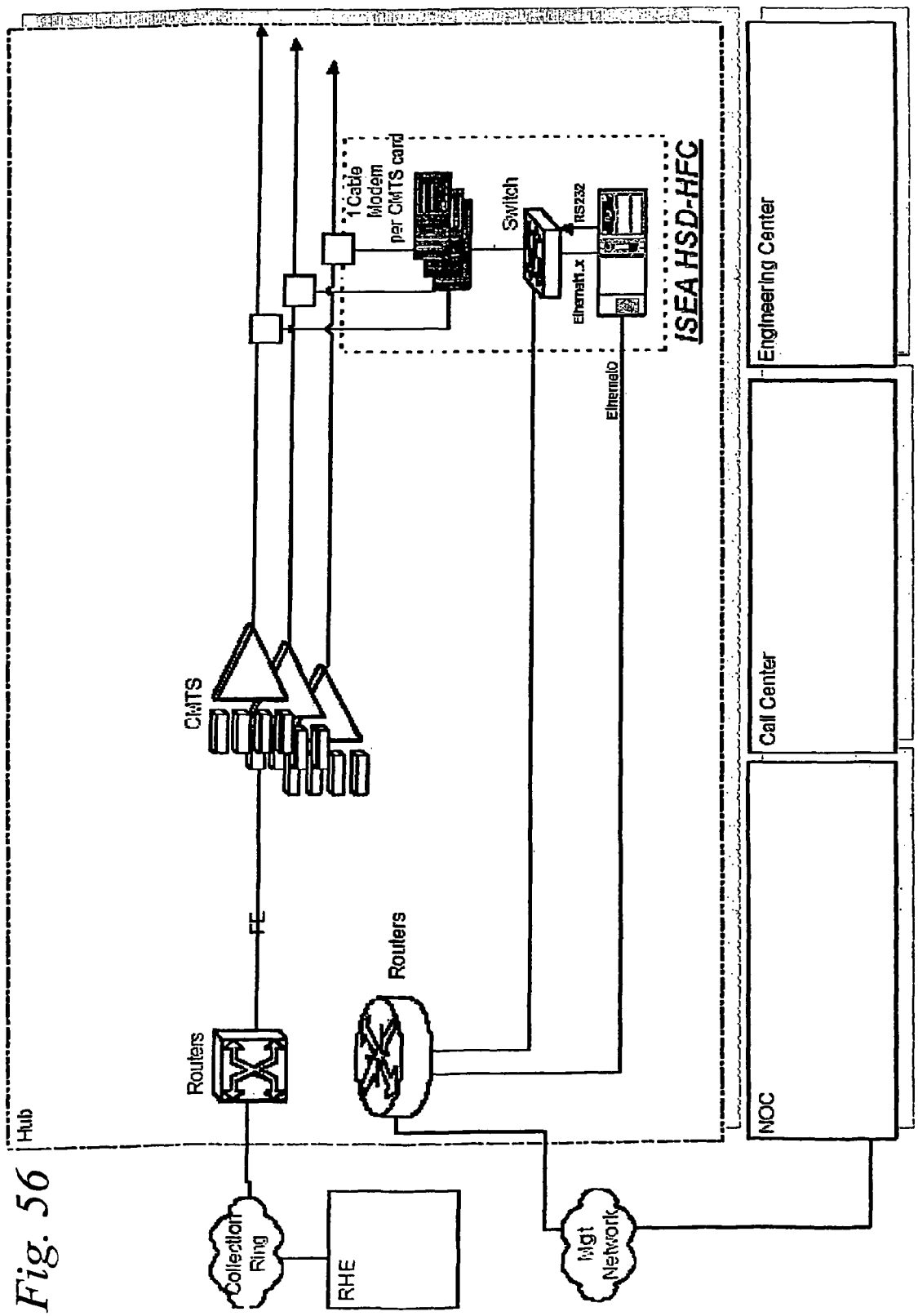
FIG. 56 shows a preferred hardware architecture for an ISEA according to one embodiment of the systems and methods described herein.

The Agent is a Java application designed to run on a Linux box. In term of hardware, the box must have at least 2 NIC cards, the first one dedicated to the management (eth0) and the second one (eth1) dedicated to perform all the required tests as shown in FIG. 56.

Figure 57:
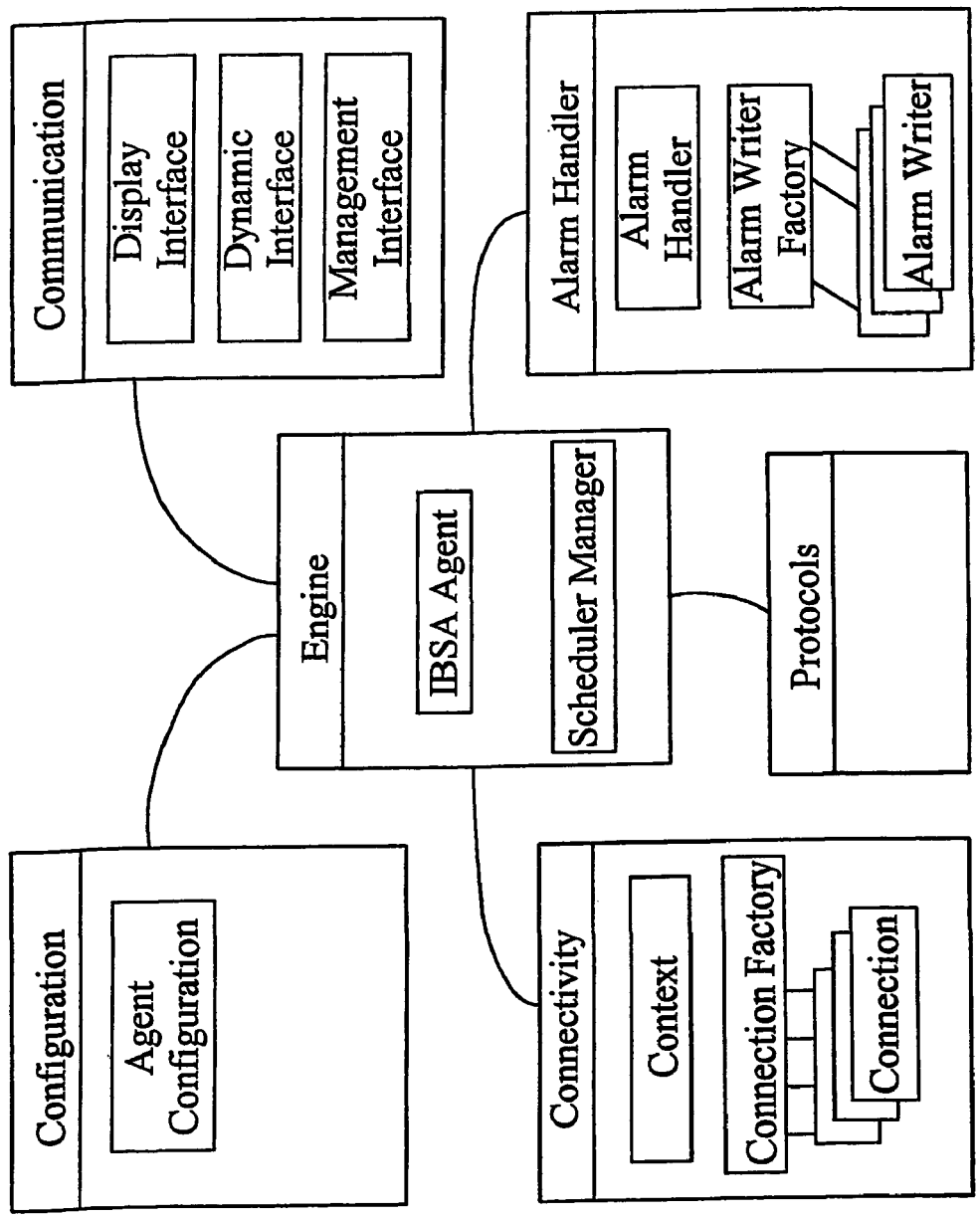
FIG. 57 illustrates the six key components comprising a preferred ISEA architecture according to one embodiment of the systems and methods described herein.

The ISEA Architecture is composed of six key components as shown in FIG. 57:
    The Imagine Service Emulator Agent Engine
    The Configuration
    The Connectivity
    The Protocol
    The Alarm Handler
Each of these components is configured in two files:
    The Agent file that contains:
        The Agent Configuration
        The Communication Configuration
        The Connectivity Configuration
        The Scheduler Manager Configuration
    The scheduler manager file that contains:
        The Alarm Handler Configuration
        The Protocols Configuration
        The Service Configuration
        The Scenarios Configuration
        The Scheduler Configuration Configuration of the Agent may be provided by a number of modular commands, and these are typically in the form of an activation script. Preferably this script is a markup language, and more preferably XML (extensible markup language) is used. A number of XML configuration sections are shown by way of example in FIGS. 49 to 54.

With reference to FIG. 52, it should be recognized that often the protocols section must only contain protocols that will be used. It is however possible to add protocols by concatenation of the protocol section into one XML file.

It will be appreciated by the skilled person that there have been described herein numerous aspects and preferred features, including independent methods, tools, agents, interfaces, particularly graphical user interfaces, services, data products for use in a variety of communications problems, including without limitation provisioning and related activities, capacity planning, service monitoring, component monitoring, device management and the like. As apparent and as discussed, some of these may combine synergistically with other features and indeed may enable provision of novel services and applications. However, for the avoidance of doubt, unless otherwise stated, all features disclosed herein, whether as aspects, clauses, features explicitly stated to be preferred, claims or simply as individually identifiable preferred features may be provided independently of other features. In particular, whilst many features have application to provisioning of services and can offer significant advantages in combination with a provisioning application or method, it will be appreciated that these may be applied independently. The examples given have included a variety of broadband communications protocols, including cable modem access, DSL, VPN purely by way of example. The features techniques and tools etc disclosed herein may be applied to other hardware configurations or communications modes, if necessary with changes as will be apparent to the skilled person. In all lists of preferred features herein, unless otherwise explicitly stated, whilst provision of the complete set of features may be advantageous, it is intended that any one of the features listed, or any sub combination may be provided independently. Whilst described and applied to advantage in a broadband context, where problems peculiar to broadband communications may be solved, aspects and features of the invention may be more generally applied.

The invention claimed is:

1. A method comprising:
   providing, by one or more provisioning servers, a web interface to a user, the web interface allowing the user to submit a request for a new service from a service provider;
   receiving, by the provisioning servers, the request for the new service submitted by the user through the web interface;
   determining, by the provisioning servers and from the request for the new service submitted by the user through the web interface, an Internet Protocol (IP) address for a user access device on a network;
   formulating, by the provisioning servers, a lease query that includes the IP address for the user access device as determined from the request for the new service submitted by the user through the web interface;
   sending, by the provisioning servers, the lease query to a Dynamic Host Configuration Protocol (DHCP) server, wherein the user access device is located at a Media Access Control (MAC) address on the network and the DHCP server has, when provisioning an existing service that is different than the new service, previously allocated the IP address to the user access device and has mapped the IP address to the MAC address of the user access device;
   receiving, by the provisioning servers, the MAC address for the user access device in response to the lease query; and
   provisioning, by the provisioning servers, the new service using the MAC address.

2. The method of claim 1, further comprising storing, by the DHCP server, the mapping of the IP address to the MAC address in a table.

3. The method of claim 1, wherein the lease query is a DHCPLEASEQUERY message.

4. The method of claim 1, further comprising validating the request for the new service.

5. The method of claim 4, wherein validating the request further comprises receiving a personal identification number (PIN) from the user through the web interface.

6. The method of claim 1, wherein the new service comprises one of a television broadcast service, a voice over IP service, a cable television service, a Wireless Local Loop (WLL) service, or a Fiber to the Home (FTTH) service.

7. The method of claim 1, further comprising using the IP address and the MAC address to determine serviceability of the new service for the user using the user access device.

8. The method of claim 1, further comprising using the IP address and the MAC address to determine if the user access device is authorized to provide the new service to the user.

9. The method of claim 1, wherein formulating, by the provisioning servers, a DHCP Lease Query that includes the IP address in the CIADDR field, that includes an IP address of one or more of the provisioning servers in the GIADDR field, and that includes zero values in the HTYPE, HLEN, and CHADDR fields.

10. The method of claim 1, further comprising:
providing, by the provisioning servers, the received MAC address for display to the user; and
receiving, by the provisioning servers, a signal indicating that the user has verified the MAC address,
wherein the new service is provisioned in response to receiving the signal indicating that the user has verified the MAC address.

11. The method of claim 1, wherein receiving the MAC address further comprises:
receiving, by the provisioning servers, a DHCPKNOWN message that includes the MAC address, from the DHCP server.

12. A system comprising:
one or more computers; and
a computer-readable medium coupled to the one or more computers having instructions stored thereon which, when executed by the one or more computers, cause the one or more computers to perform operations comprising:
providing, by one or more provisioning servers, a web interface to a user, the web interface allowing the user to submit a request for a new service from a service provider,
receiving, by the provisioning servers, the request for the new service submitted by the user through the web interface,
determining, by the provisioning servers and from the request for the new service submitted by the user through the web interface, an Internet Protocol (IP) address for a user access device on a network,
formulating, by the provisioning servers, a lease query that includes the IP address for the user access device as determined from the request for the new service submitted by the user through the web interface,
sending, by the provisioning servers, the lease query to a Dynamic Host Configuration Protocol (DHCP) server, wherein the user access device is located at a Media Access Control (MAC) address on the network and the DHCP server has, when provisioning an existing service that is different than the new service, previously allocated the IP address to the user access device and has mapped the IP address to the MAC address of the user access device,
receiving, by the provisioning servers, the MAC address for the user access device in response to the lease query, and
provisioning, by the provisioning servers, the new service using the MAC address.

13. The system of claim 12, wherein the operations further comprise storing, by the DHCP server, the mapping of the IP address to the MAC address in a table.

14. The system of claim 12, wherein the lease query is a DHCPLEASEQUERY message.

15. The system of claim 12, wherein the operations further comprise validating the request for the new service.

16. The system of claim 15, wherein validating the request further comprises receiving a personal identification number (PIN) from the user through the web interface.

17. The system of claim 12, wherein the new service comprises one of a television broadcast service, a voice over IP service, a cable television service, a Wireless Local Loop (WLL) service, or a Fiber to the Home (FTTH) service.

18. The system of claim 12, wherein the operations further comprise using the IP address and the MAC address to determine serviceability of the new service for the user using the user access device.

19. The system of claim 12, wherein the operations further comprise using the IP address and the MAC address to determine if the user access device is authorized to provide the new service to the user.

20. A non-transitory computer storage medium encoded with a computer program, the program comprising instructions that when executed by one or more computers cause the one or more computers to perform operations comprising:
providing, by one or more provisioning servers, a web interface to a user, the web interface allowing the user to submit a request for a new service from a service provider;
receiving, by the provisioning servers, the request for the new service submitted by the user through the web interface;
determining, by the provisioning servers and from the request for the new service submitted by the user through the web interface, an Internet Protocol (IP) address for a user access device on a network;
formulating, by the provisioning servers, a lease query that includes the IP address for the user access device as determined from the request for the new service submitted by the user through the web interface;
sending, by the provisioning servers, the lease query to a Dynamic Host Configuration Protocol (DHCP) server, wherein the user access device is located at a Media Access Control (MAC) address on the network and the DHCP server has, when provisioning an existing service that is different than the new service, previously allocated the IP address to the user access device and has mapped the IP address to the MAC address of the user access device;
receiving, by the provisioning servers, the MAC address for the user access device in response to the lease query; and
provisioning, by the provisioning servers, the new service using the MAC address.

21. The non-transitory computer storage medium of claim 20, further comprising storing, by the DHCP server, the mapping of the IP address to the MAC address in a table.

22. The non-transitory computer storage medium of claim 20, wherein the lease query is a DHCPLEASEQUERY message.

23. The non-transitory computer storage medium of claim 20, wherein the operations further comprise validating the request for the new service.

24. The non-transitory computer storage medium of claim 23, wherein validating the request further comprises receiving a personal identification number (PIN) from the user through the web interface.

* * * * *